US012700910B2

(12) United States Patent
Jung et al.

(10) Patent No.: US 12,700,910 B2
(45) Date of Patent: Aug. 4, 2026

(54) METHOD AND DEVICE FOR BEAM FAILURE RECOVERY OF NETWORK COOPERATIVE COMMUNICATION IN WIRELESS COMMUNICATION SYSTEM

(71) Applicant: SAMSUNG ELECTRONICS CO., LTD., Suwon-si (KR)

(72) Inventors: Euichang Jung, Suwon-si (KR); Youngrok Jang, Suwon-si (KR); Suha Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 234 days.

(21) Appl. No.: 18/486,911

(22) Filed: Oct. 13, 2023

(65) Prior Publication Data

US 2024/0039612 A1 Feb. 1, 2024

Related U.S. Application Data

(63) Continuation of application No. PCT/KR2022/004486, filed on Mar. 30, 2022.

(30) Foreign Application Priority Data

May 10, 2021 (KR) ........................ 10-2021-0060160

(51) Int. Cl.
*H04B 7/024* (2017.01)
*H04B 7/06* (2006.01)
*H04L 5/00* (2006.01)

(52) U.S. Cl.
CPC ....... *H04B 7/06964* (2023.05); *H04L 5/0048* (2013.01)

(58) Field of Classification Search
CPC ... H04B 7/024; H04B 7/06964; H04L 5/0023; H04L 5/0048; H04L 5/0053;
(Continued)

(56) References Cited

U.S. PATENT DOCUMENTS 10,587,363 B2 3/2020 Zhou et al.
10,588,148 B2 3/2020 Akoum et al.
(Continued)

FOREIGN PATENT DOCUMENTS

CN 110798864 B 3/2021
KR 10-2156286 B1 9/2020
(Continued)

OTHER PUBLICATIONS

3GPP TSG RAN WG1 Meeting #104-e. (2021) "Enhancements on beam management for multi-TRP," R1-2100288.
(Continued)

*Primary Examiner* — Frank Duong
(74) *Attorney, Agent, or Firm* — NIXON & VANDERHYE P.C.

(57) ABSTRACT

The disclosure relates to a 5G or 6G communication system for supporting a higher data transmission rate. A method by a terminal in a wireless communication system is provided. The method includes obtaining information about at least one reference signal for beam failure detection; determining whether a beam failure is detected with respect to the at least one reference signal including a first reference signal set, a second reference signal set and a third reference signal set; and in a case that the beam failure is detected with respect to at least one of the first, second, or third reference signal set, transmitting beam failure recovery request information for the at least one reference signal. The first and second reference signal sets correspond to first and second CORE-SET pools, respectively, and the third reference signal set corresponds to a cell associated with the first and second CORESET pools.

19 Claims, 23 Drawing Sheets

(58) Field of Classification Search
CPC . H04W 24/04; H04W 24/08; H04W 72/1268;
H04W 72/21; H04W 72/23; H04W
72/231; H04W 72/0457; H04W 74/004;
H04W 74/0833; H04W 76/19
See application file for complete search history.

(56) References Cited

U.S. PATENT DOCUMENTS

| | | | | |
|---|---|---|---|---|
| 10,784,950 | B2 | 9/2020 | Kang et al. | |
| 11,152,998 | B2 * | 10/2021 | Wang | H04B 7/088 |
| 11,229,081 | B2 | 1/2022 | Ahn et al. | |
| 11,245,465 | B2 | 2/2022 | Zhou et al. | |
| 11,438,215 | B2 * | 9/2022 | Zhou | H04B 7/06964 |
| 11,539,423 | B2 | 12/2022 | Kang et al. | |
| 11,647,404 | B2 | 5/2023 | Ji et al. | |
| 11,770,173 | B2 * | 9/2023 | Deghel | H04W 72/53 |
| | | | | 370/329 |
| 11,877,166 | B2 * | 1/2024 | Kang | H04W 24/04 |
| 12,200,513 | B2 * | 1/2025 | Zhou | H04B 7/0695 |
| 2020/0350972 | A1 * | 11/2020 | Yi | H04B 7/088 |
| 2021/0013950 | A1 | 1/2021 | Yang et al. | |
| 2021/0153074 | A1 | 5/2021 | Yang et al. | |
| 2021/0328651 | A1 | 10/2021 | Kung et al. | |
| 2021/0376909 | A1 * | 12/2021 | Khoshnevisan | H04W 36/305 |
| 2022/0295589 | A1 * | 9/2022 | Tsai | H04W 76/19 |
| 2023/0006727 | A1 * | 1/2023 | Jang | H04B 7/06964 |
| 2023/0144010 | A1 * | 5/2023 | Kwak | H04L 5/0053 |
| | | | | 370/329 |
| 2023/0156845 | A1 * | 5/2023 | Khoshnevisan | H04W 76/19 |
| | | | | 370/216 |

FOREIGN PATENT DOCUMENTS

| | | | |
|---|---|---|---|
| KR | 10-2182601 | B1 | 11/2020 |
| KR | 10-2021-0022461 | A | 3/2021 |
| KR | 10-2333960 | B1 | 12/2021 |
| KR | 10-2513660 | B1 | 3/2023 |
| KR | 10-2514416 | B1 | 3/2023 |
| WO | 2021/034672 | | 2/2021 |

OTHER PUBLICATIONS

Extended European Search Report for EP 22807614.7 by European Patent Office dated Sep. 10, 2024.
International Search Report & Written Opinion for PCT/KR2022/004486 by Korean Intellectual Property Office dated Jul. 6, 2022.
Nokia et al. (2021). "Enhancements on Beam Management for Multi-TRP/Panel Transmission", 3GPP TSG RAN WG1 #104bis-e, R1-2103368.
Oppo (2021). "Enhancements on beam management for multi-TRP", 3GPP TSG RAN WG1 #104bis-e, R1-2102381.
Nokia et al. (2021). "Enhancements on Beam Management for Multi-TRP/Panel Transmission", 3GPP TSG RAN WG1 #104-e, R1-2101008.
Futurewei (2021). "Enhancement on multi-beam operation", 3GPP TSG RAN WG1 Meeting #104bis-e, R1-2102767.
3GPP TS 38.133 V15.13.0 (2021) 3rd Generation Partnership Project; Technical Specification Group Radio Access Network; NR; Requirements for support of radio resource management (Release 15).
Korean office action dated Jun. 25, 2026 in corresponding Korean patent application 10-2021-0060160(with English language translation).

* cited by examiner

Type C

Figure 12:
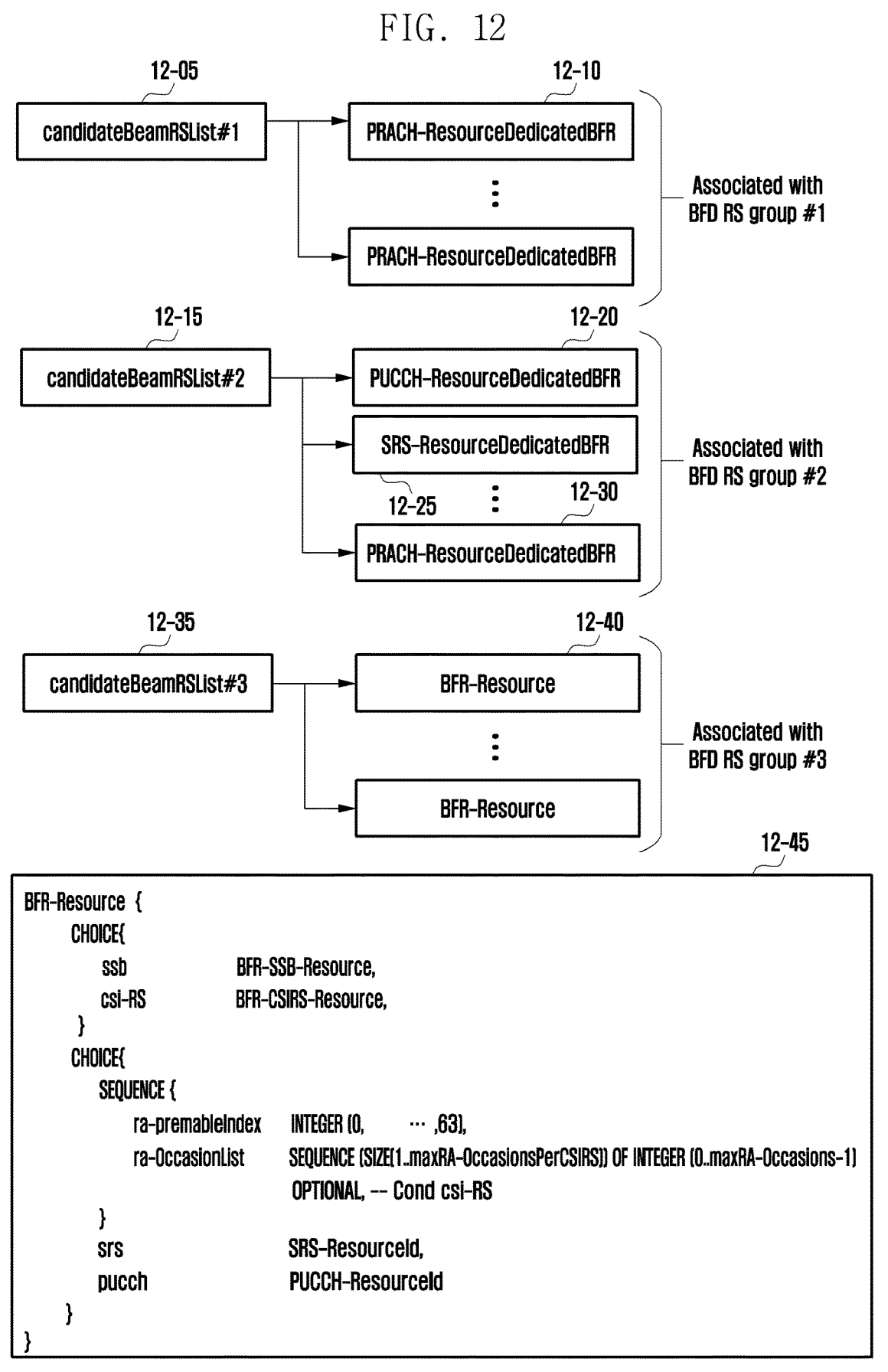

| candidateBeamRSList#1 |

12-10

| PRACH-ResourceDedicatedBFR |

⋮

| PRACH-ResourceDedicatedBFR |

Associated with BFD RS group #1

12-15

| candidateBeamRSList#2 |

12-20

| PUCCH-ResourceDedicatedBFR |

| SRS-ResourceDedicatedBFR |

12-25          ⋮          12-30

| PRACH-ResourceDedicatedBFR |

Associated with BFD RS group #2

12-35

| candidateBeamRSList#3 |

12-40

| BFR-Resource |

⋮

| BFR-Resource |

Associated with BFD RS group #3

12-45

```
BFR-Resource {
    CHOICE{
        ssb              BFR-SSB-Resource,
        csi-RS           BFR-CSIRS-Resource,
    }
    CHOICE{
        SEQUENCE {
            ra-premableIndex    INTEGER (0,      ⋯ ,63),
            ra-OccasionList     SEQUENCE (SIZE(1..maxRA-OccasionsPerCSIRS)) OF INTEGER (0..maxRA-Occasions-1)
                                OPTIONAL, -- Cond csi-RS
        }
        srs                     SRS-ResourceId,
        pucch                   PUCCH-ResourceId
    }
}
```

FIG. 16A
Alt 1. some RSs from BFD-RS set1 & set2
Alt 2. BFD-RSs in set1, set2 and set3 are mutually exclusive

BFD-RS Set ID-1
CSI-RS #1
CSI-RS #2
CSI-RS #5

TRP-A

TRP-B

BFD-RS Set ID-2
CSI-RS #3
CSI-RS #4
CSI-RS #6

1-1. BFD from TRP-A
1-2. BFRQ to TRP-A
1-3. BFRS from TRP-A 2-1. BFD from TRP-A
2-2. BFRQ to TRP-B
2-3. BFRS from TRP-B 3-1. BFD from TRP-A and TRP-B
3-2. BFRQ to TRP-A and TRP-B
3-3. BFRS from TRP-A and TRP-B 4-1. BFD from TRP-A and TRP-B
4-2. BFRQ to TRP-A or TRP-B
4-3. BFRS from TRP-A or TRP-B 17-00

1

METHOD AND DEVICE FOR BEAM FAILURE RECOVERY OF NETWORK COOPERATIVE COMMUNICATION IN WIRELESS COMMUNICATION SYSTEM

CROSS-REFERENCE TO RELATED APPLICATION

This application is a continuation application of International Application No. PCT/KR2022/004486, filed on Mar. 30, 2022, which claims priority from and derives the benefit of Korean Patent Application No. 10-2021-0060160, filed on May 10, 2021, the entire contents of each of these applications is hereby incorporated in their entirety, by reference.

TECHNICAL FIELD

The present disclosure relates to a wireless communication system and, more particularly, to a method and a device for efficiently performing beam failure recovery (BFR) operations.

BACKGROUND 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadB and (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Meanwhile, with the recent advances in communication systems, various studies have been conducted to improve the beam failure recovery procedure.

DISCLOSURE

Various embodiments of the disclosure are to provide a method and a device for flexibly and efficiently performing beam failure recovery (BFR) operations in a wireless communication system, more particularly, in a network cooperative communication scenario.

A method by a terminal in a wireless communication system according to an embodiment of the disclosure is provided. The method includes obtaining information about at least one reference signal for beam failure detection, identifying whether a beam failure is detected with respect to each of a first reference signal set, a second reference signal set, and a third reference signal set included in the at least one reference signal, and in the case that the beam failure is detected with respect to at least one of the first reference signal set, the second reference signal set, and the third reference signal set, transmitting beam failure recovery request information for the reference signal set for which the beam failure has been detected, wherein the first reference signal set corresponds to a first control resource set (CORE-SET) pool, the second reference signal set corresponds to a second CORESET pool, and the third reference signal set corresponds to a cell associated with the first CORESET pool and the second CORESET pool.

Further, according to an embodiment of the disclosure, a method by a base station in a wireless communication system is provided. The method includes transmitting information about at least one reference signal for beam failure detection to a terminal, and in the case that a beam failure is detected with respect to at least one of a first reference signal set, a second reference signal set, and a third reference signal set included in the at least one reference signal, receiving, from the terminal, beam failure recovery request information for the reference signal set for which the beam failure has been detected, wherein the first reference signal set corresponds to a first control resource set (CORESET) pool, the second reference signal set corresponds to a second CORESET pool, and the third reference signal set corresponds to a cell associated with the first CORESET pool and the second CORESET pool.

In addition, according to an embodiment of the disclosure, a terminal of a wireless communication system is provided. The terminal includes a transceiver, and a controller configured to obtain information about at least one reference signal for beam failure detection, identify whether a beam failure is detected with respect to each of a first reference signal set, a second reference signal set, and a third reference signal set included in the at least one reference signal, and in the case that the beam failure is detected with respect to at least one of the first reference signal set, the second reference signal set, and the third reference signal set, control the transceiver to transmit beam failure recovery request information for the reference signal set for which the beam failure has been detected, wherein the first reference signal set corresponds to a first control resource set (CORE-SET) pool, the second reference signal set corresponds to a second CORESET pool, and the third reference signal set corresponds to a cell associated with the first CORESET pool and the second CORESET pool.

In addition, according to an embodiment of the disclosure, a base station of a wireless communication system is provided. The base station includes a transceiver, and a controller configured to control the transceiver to transmit information about at least one reference signal for beam failure detection to a terminal, and control the transceiver to, in the case that a beam failure is detected with respect to at least one of a first reference signal set, a second reference signal set, and a third reference signal set included in the at least one reference signal, receive, from the terminal, beam failure recovery request information for the reference signal set for which the beam failure has been detected, wherein the first reference signal set corresponds to a first control resource set (CORESET) pool, the second reference signal set corresponds to a second CORESET pool, and the third reference signal set corresponds to a cell associated with the first CORESET pool and the second CORESET pool.

According to an embodiment of the disclosure, a method for efficiently performing a beam failure recovery (BFR) operation in a wireless communication system is proposed to improve the transmission efficiency of a transmission reception point (TRP) and the reception performance of a terminal in a network cooperative communication scenario.

BRIEF DESCRIPTION OF DRAWINGS

FIG. 12 illustrates multiple candidateBeamRSLists each defined (or configured) according to an embodiment of the disclosure;

FIG. 16A illustrates a BFD-RS set(s) configuration according to an embodiment of the disclosure;

MODE FOR THE INVENTION

Figure 1:
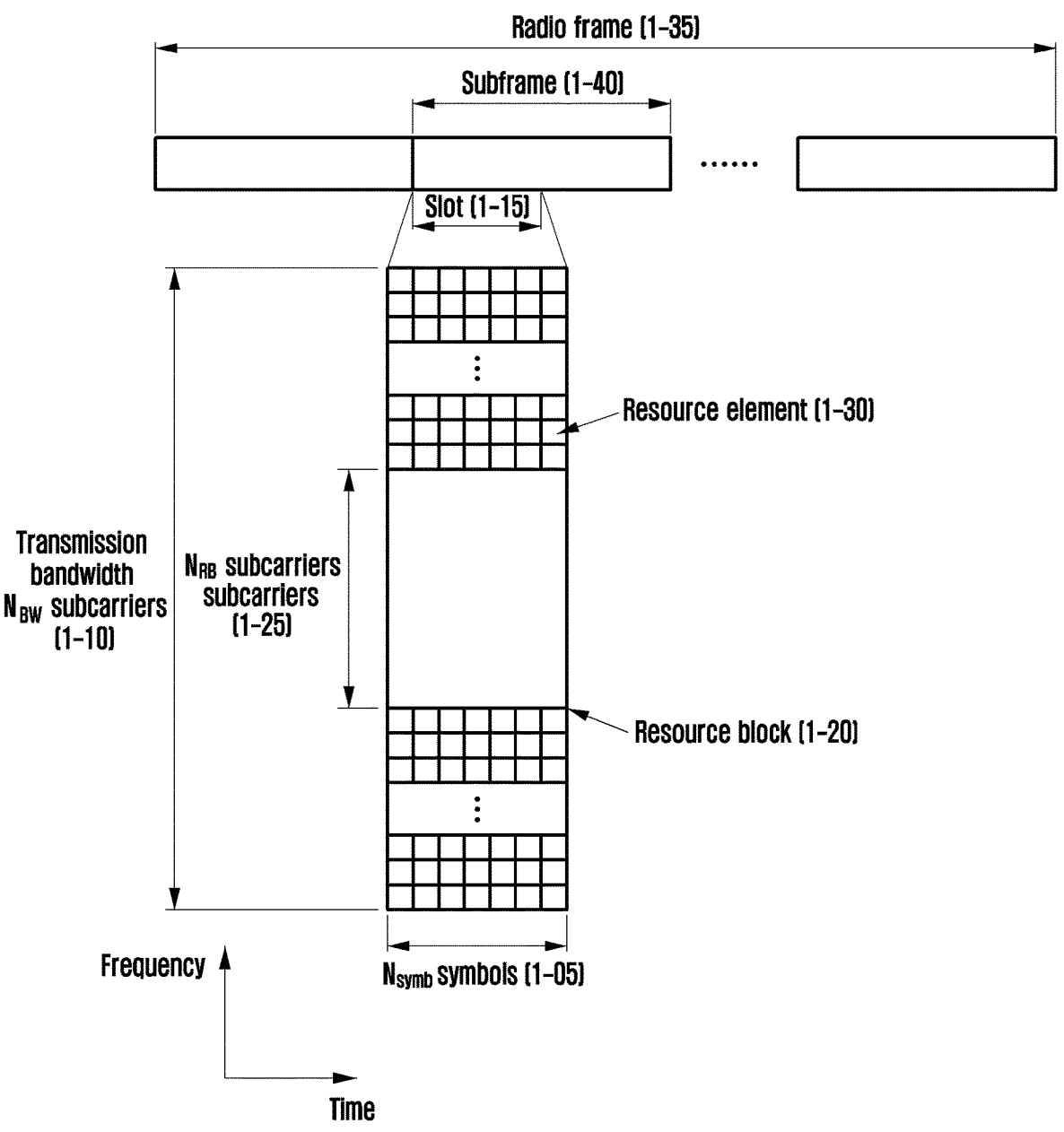
FIG. 1 illustrates a time-frequency domain transmission structure of a long-term evolution (LTE), LTE-advanced (LTE-A), new radio (NR) (5G), or a wireless communication system similar thereto according to the disclosure.

Hereinafter, embodiments of the disclosure will be described in detail with reference to the accompanying drawings.

In describing the embodiments, descriptions related to technical contents well-known in the relevant art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

It should be appreciated that an embodiment of the disclosure and the terms used therein are not intended to limit the technological features set forth herein to a particular embodiment and include various changes, equivalents, or replacements for an embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Furthermore, according to some embodiments, the "unit" may include one or more processors.

Hereinafter, the operation principle of the disclosure will be described in detail with reference to the accompanying drawings. In describing the disclosure below, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, a node on a network, and a transmission and reception point (TRP). A terminal may include a user equipment (UE), a mobile station (MS), a cellular phone, a smartphone, a computer, or a multimedia system capable of performing communication functions. Of course, examples of the base station and the terminal are not limited thereto.

Hereinafter, technology for receiving broadcast information from a base station by a terminal will be described. The disclosure relates to a communication technique for converging IoT technology with 5G communication systems designed to support a higher data transfer rate beyond 4G systems, and a system therefor. The disclosure may be applied to intelligent services (e.g., smart homes, smart buildings, smart cities, smart cars or connected cars, healthcare, digital education, retail business, security and safety-related services, etc.) on the basis of 5G communication technology and IoT-related technology.

In the following description, terms referring to broadcast information, terms referring to control information, terms related to communication coverage, terms referring to state changes (e.g., an event), terms referring to network entities, terms referring to messages, terms referring to device elements, and the like are illustratively used for the sake of descriptive convenience. Therefore, the disclosure is not limited by the terms as used below, and other terms referring to subjects having equivalent technical meanings may be used.

In the following description, some of terms and names defined in the 3rd generation partnership project (3GPP) long term evolution (LTE) or 3GPP new radio (NR) standards may be used for the sake of descriptive convenience. However, the disclosure is not limited by these terms and names, and may be applied in the same way to systems that conform other standards.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) {or a mobile station (MS)} transmits data or control signals to a base station (BS) (eNode B), and the downlink indicates a radio link through which the base station transmits data or control signals to the UE. The above multiple access scheme separates data or control information of respective users by allocating and operating time-frequency resources for transmitting the data or control information for each user so as to avoid overlapping each other, that is, so as to establish orthogonality.

Since a 5G communication system, which is a post-LTE communication system, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like.

According to some embodiments, eMBB aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the Internet of Things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time, such as 10 to 16 years, because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 ms, and also requires a packet error rate of 10−5 or less. Therefore, for the services supporting URLLC, a 5G system requires designs to provide a transmit time interval (TTI) shorter than those of other services, and also assign a large number of resources in a frequency band in order to secure reliability of a communication link. However, the above-described mMTC, URLLC, and eMBB are merely examples of different types of services, and the types of services to which the disclosure is applied are not limited to the above examples.

The above-described services considered in the 5G communication system must be converged with each other so as to be provided based on one framework. That is, the respective services are preferably integrated into a single system and controlled and transmitted in the integrated single system, instead of being operated independently, for efficient resource management and control.

Furthermore, in the following description of embodiments of the disclosure, LTE, LTE-A, LTE Pro, or NR systems will be described by way of example, but the embodiments of the disclosure may also be applied to other communication systems having similar technical backgrounds or channel types. In addition, based on determinations by those skilled in the art, the embodiments of the disclosure may also be applied to other communication systems through some modifications without significantly departing from the scope of the disclosure. Hereinafter, a frame structure of LTE, LTE-A, and 5G systems will be described with reference to the drawings, and the direction of 5G system design will be described.

FIG. 1 illustrates a time-frequency domain transmission structure of an LTE, LTE-A, NR (5G), or a wireless communication system similar thereto according to the disclosure.

FIG. 1 illustrates a basic structure of a time-frequency resource domain that is a wireless resource region in which data or a control channel of LTE, LTE-A, and NR systems based on cyclic prefix (CP) orthogonal frequency division multiplexing (OFDM) (CP-OFDM) or single carrier-frequency division multiple access (SC-FDMA) waveforms is transmitted.

In FIG. 1, the horizontal axis indicates a time domain, and the vertical axis indicates a frequency domain. Uplink (UL) may imply a wireless link through which a terminal transmits data or a control signal to a base station, and downlink (DL) may imply a wireless link through which a base station transmits data or a control signal to a terminal.

A minimum transmission unit in a time domain of LTE, LTE-A, and NR systems is an OFDM symbol or an SC-FDMA symbol, and $N_{symb}$ symbols 1-05 may configure one slot 115. In a case of LTE and LTE-A, two slots each including seven symbols ($N_{symb}=7$) may configure a single subframe 1-40. In addition, according to an embodiment of the disclosure, may support two types of slot structures which are a slot and a mini-slot (or a non-slot). In a case of a 5G slot, $N_{symb}$ may have a value of 14, in a case of a 5G mini-slot, $N_{symb}$ may be configured as one of values of 1, 2, 3, 4, 5, 6, or 7. In LTE and LTE-A, the length of the slot is 0.5 ms, and the length of the subframe is fixed to be 1.0 ms. However, in NR systems, the length of the slot or the mini-slot may be flexibly changed according to a subcarrier spacing. In LTE and LTE-A, a radio frame 1-35 is a time domain unit including 10 subframes. In LTE and LTE-A, a minimum transmission unit in a frequency domain is a subcarrier in units of 15 kHz (subcarrier spacing=15 kHz), and a bandwidth of the entire system transmission bandwidth includes a total of $N_{BW}$ subcarriers 1-10. A flexible extended frame structure of NR systems will be described later.

A basic unit of resources in the time-frequency domain is a resource element RE 1-30 which may be represented by an OFDM symbol or SC-FDMA symbol index and a subcarrier index. A resource block (RB) (or a physical resource block PRB) 1-20 may be defined as $N_{symb}$ number of consecutive OFDM symbols or SC-FDMA symbols 1-05 in the time domain, and $N_{RB}$ number of consecutive subcarriers 1-25 in the frequency domain. Therefore, the one RB 1-20 is configured by $N_{symb} \times N_{RB}$ number of REs 1-30. In LTE and LTE-A systems, data is mapped in units of RBs, and a base station performs scheduling for a predetermined terminal in units of RB-pairs each configuring a single subframe. $N_{symb}$, which is the number of SC-FDMA symbols or OFDM symbols, is determined according to the length of a cyclic prefix (CP) added to each of the symbols to prevent interference between the symbols. For example, when a normal CP is applied, $N_{symb}$ is 7, and when an extended CP is applied, $N_{symb}$ is 6. An extended CP is applied to a system having a relatively larger radio transmission distance, compared to a normal CP, so as to maintain orthogonality between symbols.

According to an embodiment, subcarrier spacing, CP length, and the like are essential information for OFDM transmission/reception, and are required to be recognized as the same value by a base station and a terminal, so that smooth transmission or reception is possible.

A frame structure of LTE and LTE-A systems, as described above, is designed by considering common voice/data communication. Therefore, the expandability of the frame structure is constrained and insufficient to satisfy various services and requirements as in NR systems. Therefore, NR systems are required to flexibly define a frame structure and operate the frame structure by considering various services and requirements.

Figure 2:
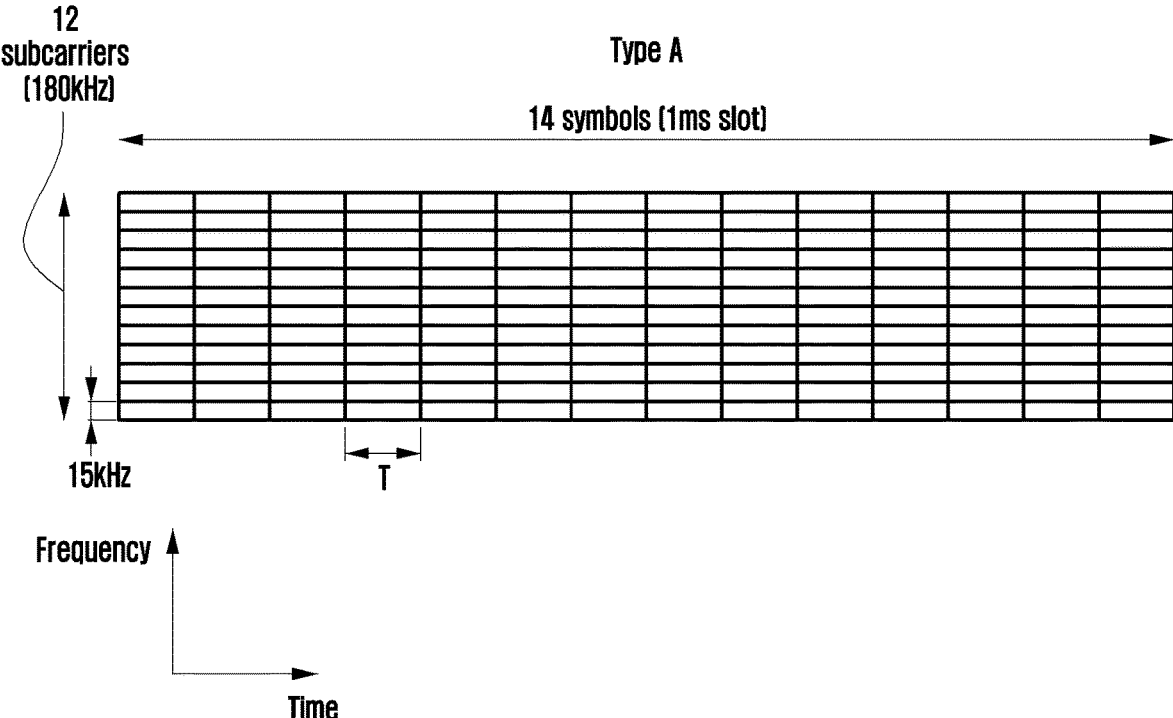
FIG. 2 illustrates an extended frame structure according to an embodiment of the disclosure.
Figure 3:
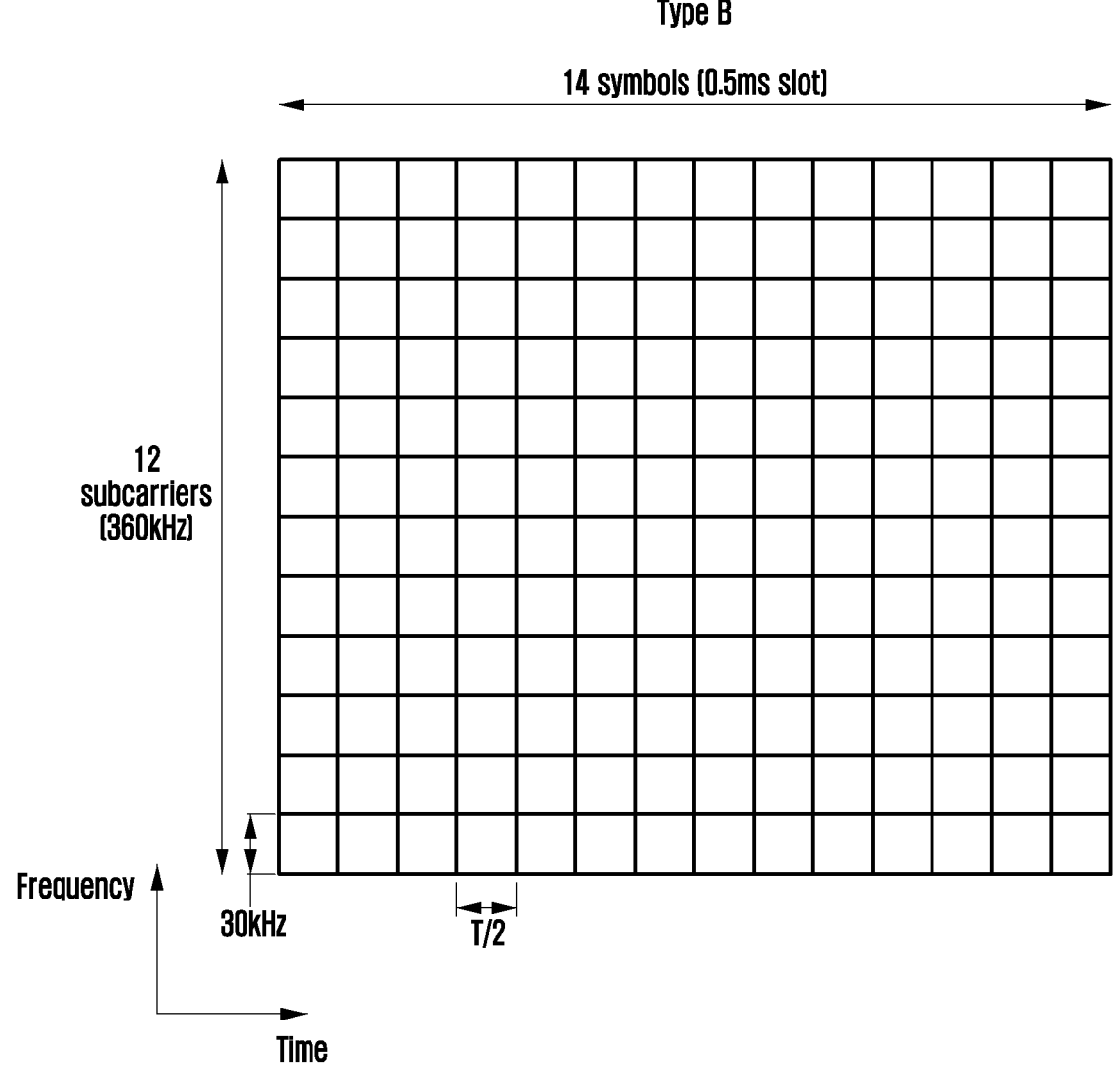
FIG. 3 illustrates an extended frame structure according to an embodiment of the disclosure.
Figure 4:
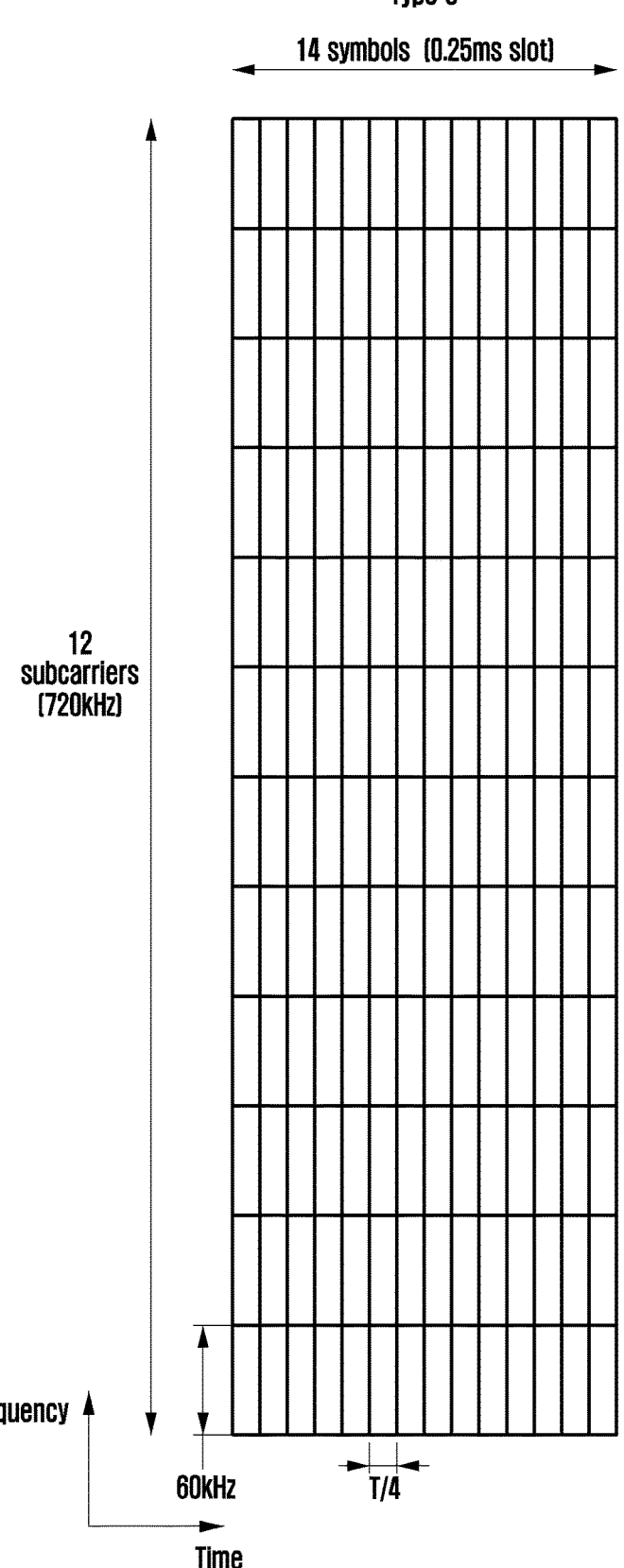
FIG. 4 illustrates an extended frame structure according to an embodiment of the disclosure.

FIGS. 2 to 4 illustrate an extended frame structure according to an embodiment of the disclosure.

In the examples illustrated in FIGS. 2 to 4, subcarrier spacing, CP length, slot length, etc. may be included as an essential parameter set defining an extended frame structure.

In the initial stage of introducing a 5G system in the future, at least one of the coexistence of the 5G system with a conventional LTE/LTE-A system, or a dual mode operation is expected. Through the coexistence or dual mode operation, the conventional LTE/LTE-A system may provide a stable system operation, and the 5G system may function to provide an enhanced service. Therefore, an extended frame structure of a 5G system is required to include at least one of an LTE/LTE-A frame structure or an essential parameter set. FIG. 2 illustrates a 5G frame structure that is identical to an LTE/LTE-A frame structure, or an essential parameter set. In frame structure type A illustrated in FIG. 2, the subcarrier spacing is 15 kHz, 14 symbols constitute a 1 ms slot, and a physical resource block (PRB) includes 12 subcarriers (=180 kHz=12×15 kHz).

Referring to FIG. 3, in frame structure type B illustrated in FIG. 3, the subcarrier spacing is 30 kHz, 14 symbols constitute a 0.5 ms slot, and a PRB includes 12 subcarriers (=360 kHz=12×30 kHz). That is, in frame structure type B, the subcarrier spacing and the PRB size are 2 times bigger and the slot length and the symbol length are 2 times smaller, compared to frame structure type A.

Referring to FIG. 4, in frame structure type C illustrated in FIG. 4, the subcarrier spacing is 60 kHz, 14 symbols constitute a 0.25 ms slot, and a PRB includes 12 subcarriers (=720 kHz=12×60 kHz). That is, in frame structure type C, the subcarrier spacing and the PRB size are 4 times bigger and the slot length and the symbol length are 4 times smaller, compared to frame structure type A.

That is, the frame structure types are generalized such that each of subcarrier spacing, CP length, slot length, etc., which are included in an essential parameter set, has an integer multiple relationship between the frame structure types, so as to provide high expandability. Furthermore, in order to express a reference time unit regardless of the frame structure types, a subframe having a fixed length of 1 ms may be defined. Therefore, in frame structure type A, one subframe is configured by one slot, in frame structure type B, one subframe is configured by two slots, and in frame structure type C, one subframe is configured by four slots. An extensible frame structure is naturally not limited to frame structure types A, B, and C described above, and may also be applied to another subcarrier spacing, such as 120 kHz and 240 kHz, and may have a different structure.

According to some embodiments, the frame structure types described above may be applied to correspond to various scenarios. In view of cell sizes, the longer the CP length, the larger the cell that may be supported. Therefore, frame structure type A is able to support a relatively larger cell compared to frame structure types B and C. In view of operating frequencies, the larger the subcarrier spacing, the more advantageous the restoration of phase noise in a high frequency band is. Therefore, frame structure type C is able to support a relatively higher operating frequency compared to frame structure types A and B. In view of services, a short subframe length is advantageous to support ultra-low latency services, such as URLLC. Therefore, frame structure type C is relatively more suitable for URLLC service compared to frame structure types A and B.

In addition, several frame structure types may be multiplexed in a single system so as to be integrally operated.

In NR, one component carrier (CC) or serving cell may be configured by a maximum of 250 or more RBs. Therefore, when a terminal always receives the entire serving cell bandwidth as in LTE, the power consumption of the terminal may be substantial. In order to solve the problem, a base station may configure one or more bandwidth parts (BWPs) for the terminal to support the terminal to change a reception region in a cell. In NR, a base station may configure "an initial BWP", which is a bandwidth of control resource set (CORESET) #0 (or a common search space (CSS)), for a terminal through a master information block (MIB). After the configuration, the base station may configure a first BWP of the terminal through Radio Resource Control (RRC) signaling, and may notify of at least one piece of BWP configuration information which may be indicated through Data Center Interconnec (DCI) later. After the notification, the base station may notify of a BWP ID through DCI to indicate a band which the terminal is to use. When the terminal fails to receive DCI in a currently allocated BWP for a specific time interval or longer, the terminal returns to "a default BWP" and then attempts to receive DCI.

Figure 5:
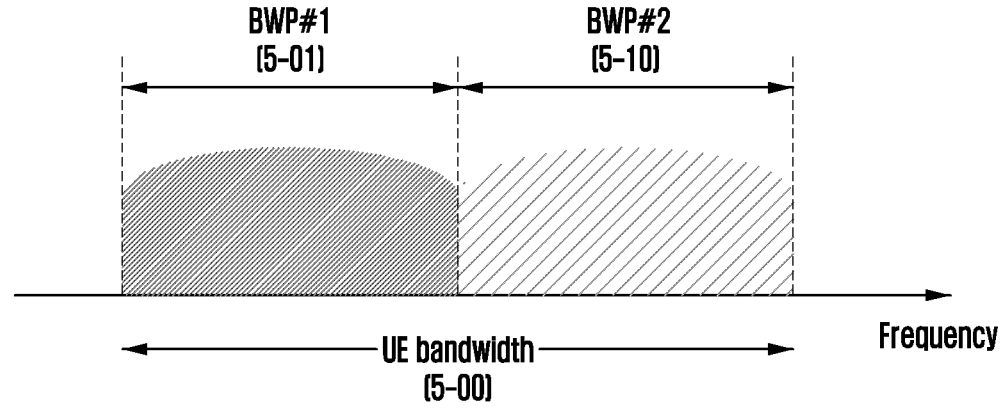
FIG. 5 illustrates an example of a configuration relating to a bandwidth part in a 5G communication system according to an embodiment of the disclosure.

FIG. 5 illustrates an example of a configuration relating to a bandwidth part in an NR (5G) communication system according to an embodiment of the disclosure.

Referring to FIG. 5, a terminal (UE) bandwidth 5-00 may be configured as two bandwidth parts, that is, bandwidth part #1 5-01 and bandwidth part #2 5-10. A base station may configure one bandwidth part or multiple bandwidth parts for a terminal and may configure pieces of information below for each bandwidth part.

TABLE 1

Configuration information 1: the bandwidth of a bandwidth part (the number of PRBs constituting a bandwidth part)
Configuration information 2: the frequency position of a bandwidth part (this information is represented as an offset value relative to a reference point, wherein the reference point may include, for example, the center frequency of a carrier, a synchronization signal, a synchronization signal raster, etc.)
Configuration information 3: the numerology of a bandwidth part (e.g., subcarrier spacing, CP length, etc.)
Others In addition to the pieces of configuration information shown in Table 1, various parameters related to a bandwidth part may be configured for a terminal. Pieces of configuration information may be transferred by a base station to a terminal through higher layer signaling, for example, RRC signaling. At least one bandwidth part among the configured one bandwidth part or plurality of bandwidth parts may be activated. Whether the configured bandwidth part is activated may be dynamically transferred through a media access control address (MAC) control element (CE) or DCI, or semi-statically transferred through RRC signaling by a base station to a terminal.

A configuration relating to a bandwidth part supported in a 5G communication system may be used for various purposes. For example, when a bandwidth supported by a terminal is smaller than a system bandwidth, the terminal may be supported through a bandwidth part configuration. For example, the frequency position (configuration information 1) of a bandwidth part in Table 1 may be configured for the terminal so that the terminal transmits or receives data at a specific frequency position in a system bandwidth.

As another example, a base station may configure multiple bandwidth parts for a terminal in order to support different numerologies. For example, in order to support, for a terminal, data transmission/reception using both a subcarrier spacing of 15 KHz and a subcarrier spacing of 30 KHz, a base station may configure the terminal to use two bandwidth parts having a subcarrier spacing of 15 KHz and a subcarrier spacing of 30 KHz, respectively. Different bandwidth parts may be frequency-division-multiplexed (FDMed), and when data is to be transmitted or received at a specific subcarrier spacing, a bandwidth part configured to have the subcarrier spacing may be activated.

As another example, a base station may configure bandwidth parts having different bandwidths for a terminal in order to reduce the power consumption of the terminal. For example, when the terminal supports a very wide bandwidth, for example, a bandwidth of 100 MHz, and always transmits or receives data through the bandwidth, the terminal may consume a very large quantity of power. In particular, in a situation where there is no traffic, it is very inefficient, in terms of power consumption, for the terminal to monitor an unnecessary downlink control channel for a large bandwidth of 100 MHz. Therefore, in order to reduce the power consumption of a terminal, a base station may configure a bandwidth part having a relatively small bandwidth, for example, a bandwidth part having 20 MHz for the terminal. In the situation where there is no traffic, a terminal may perform monitoring in the bandwidth part of 20 MHz, and when data is generated, the terminal may transmit or receive the data by using the bandwidth part of 100 MHz according to an indication of the base station.

Figure 6:
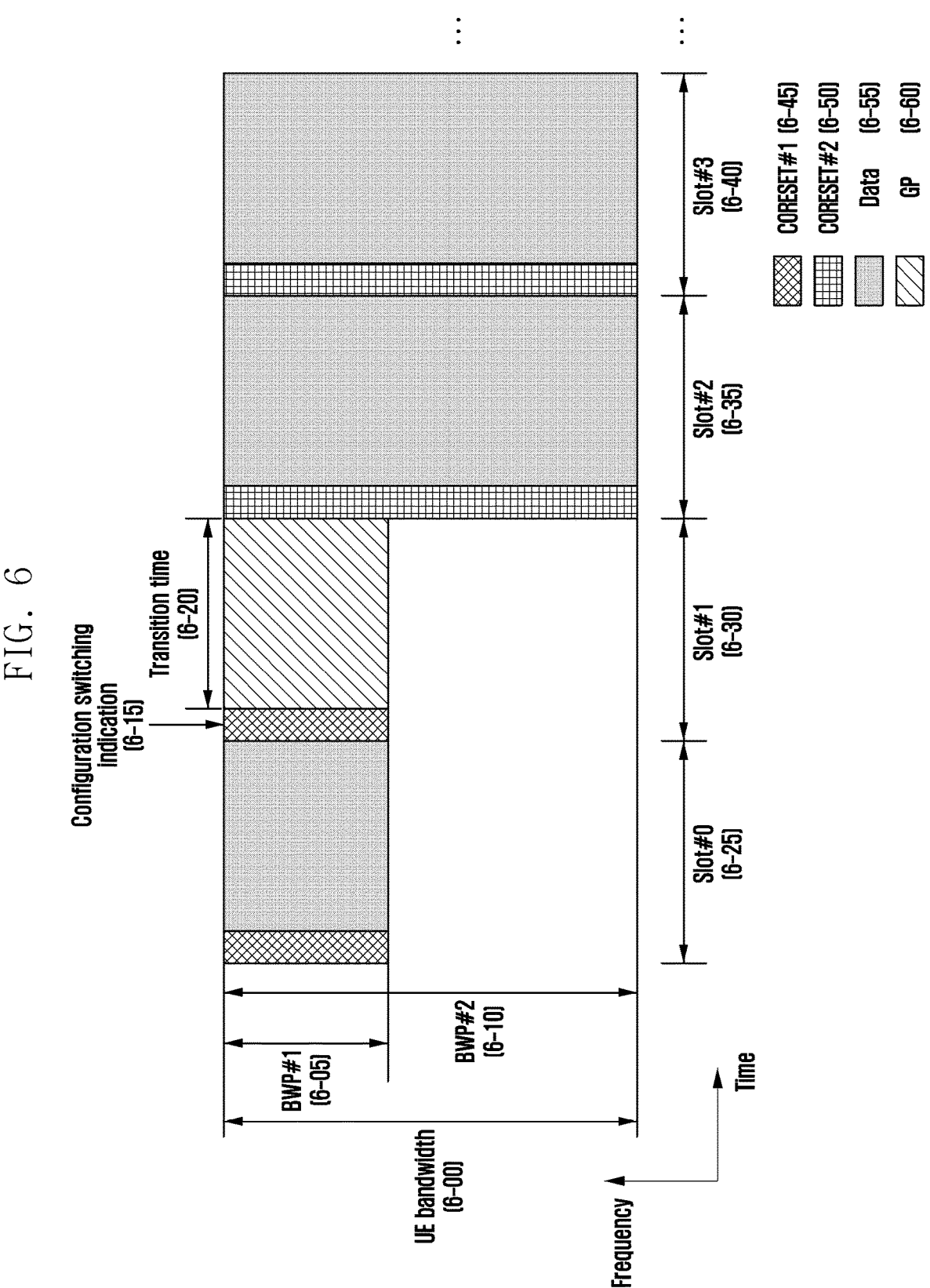
FIG. 6 illustrates a method for indicating and changing a bandwidth part according to an embodiment of the disclosure.

FIG. 6 illustrates a method for indicating and changing a bandwidth part according to an embodiment of the disclosure.

As described with reference to Table 1, a base station may configure one or multiple bandwidth parts for a terminal, and may notify the terminal of information relating to the bandwidth, frequency position, and numerology of each bandwidth part as a configuration relating to each bandwidth part. Referring to FIG. 6, two bandwidth parts including bandwidth part #1 (BPW #1) 6-05 and bandwidth part #2 (BWP #2) 6-10 may be configured for a terminal in a UE bandwidth 600. One or multiple bandwidth parts may be activated in a configured bandwidth, and FIG. 6 illustrates an example in which one bandwidth part is activated. As illustrated in FIG. 6, bandwidth part #1 6-05 among the bandwidth parts configured in slot #0 6-25 has been activated, and the terminal may monitor a downlink control channel (a physical downlink control channel (PDCCH)) in a control region (CORESET) #1 6-45 configured in bandwidth part #1 6-05, and may transmit or receive data 6-55 in bandwidth part #1 6-05. A CORESET in which the terminal receives a PDCCH may differ according to a bandwidth part activated among the configured bandwidth parts, and a bandwidth in which the terminal monitors a PDCCH may differ accordingly.

The base station may additionally transmit an indicator for changing a configuration relating to a bandwidth part to the terminal. Changing of a configuration relating to a bandwidth part may be considered to be identical to an operation (e.g., an activation change from bandwidth part A to bandwidth part B) of activating a specific bandwidth part. The base station may transmit a configuration switching indicator to the terminal in a specific slot, and the terminal may receive the configuration switching indicator from the base station and then apply a changed configuration according to the configuration switching indicator from a specific time point, so as to determine a bandwidth part to be activated, and monitor a PDCCH in a CORESET configured in the activated bandwidth part.

In FIG. 6, the base station may transmit, to the terminal, the configuration switching indicator 6-15 that indicates switching of the activated bandwidth part from existing bandwidth part #1 6-05 to bandwidth part #2 6-10, in slot #1 6-30. After receiving the corresponding indicator, the terminal may activate bandwidth part #2 6-10 according to the contents of the indicator. At this time, a transition time 6-20 for switching the bandwidth part may be required, and accordingly, a time point at which an activated bandwidth part is switched and applied may be determined. FIG. 6 illustrates a case in which, after reception of the configuration switching indicator 6-15, the transition time 6-20 of one slot is taken. Data transmission or reception may not be performed during the transition time 6-20, and this may be understood as a guard period (GP) 6-60. Accordingly, bandwidth part #2 6-10 is activated in slot #2 6-35 so that the terminal may transmit or receive a control channel and data via the corresponding bandwidth part.

The base station may preconfigure one or multiple bandwidth parts for the terminal via higher layer signaling (e.g., RRC signaling), and the configuration switching indicator 6-15 may indicate activation, by mapping to one of the bandwidth part configurations preconfigured by the base station. For example, an indicator of log₂N bits may select and indicate one of N preconfigured bandwidth parts. Table 2 below shows an example of indicating configuration information for a bandwidth part by using a 2-bit indicator.

TABLE 2

| Indicator value | Bandwidth part configuration |
|---|---|
| 00 | Bandwidth configuration A configured by higher layer signaling |
| 01 | Bandwidth configuration B configured by higher layer signaling |
| 10 | Bandwidth configuration C configured by higher layer signaling |
| 11 | Bandwidth configuration D configured by higher layer signaling |

The configuration switching indicator 6-15 relating to a bandwidth part described above may be transferred from the base station to the terminal in a type of medium access control (MAC) control element (CE) signaling or L1 signaling (e.g., common DCI, group-common DCI, UE-specific DCI).

A time point, at which bandwidth part activation is to be applied according to the configuration switching indicator 6-15 for the bandwidth part described above, is as follows. The time point at which a configuration switch is to be applied may be based on a predefined value (for example, applied after N slots (N(≥1) after the configuration switching indicator is received), may be configured by the base station for the terminal via higher layer signaling (e.g., RRC signaling), or may be partially included in the content of the configuration switching indicator 6-15 and transmitted. Alternatively, the time point may be determined by a combination of the above methods. After receiving the configuration switching indicator 6-15 for the bandwidth part, the terminal may apply the switching configuration from the time point obtained by the above method.

In the NR system, the following detailed frequency axis resource allocation methods (frequency domain resource allocation (FD-RA)) are provided in addition to frequency axis resource candidate allocation via the bandwidth part indication.

Figure 7:
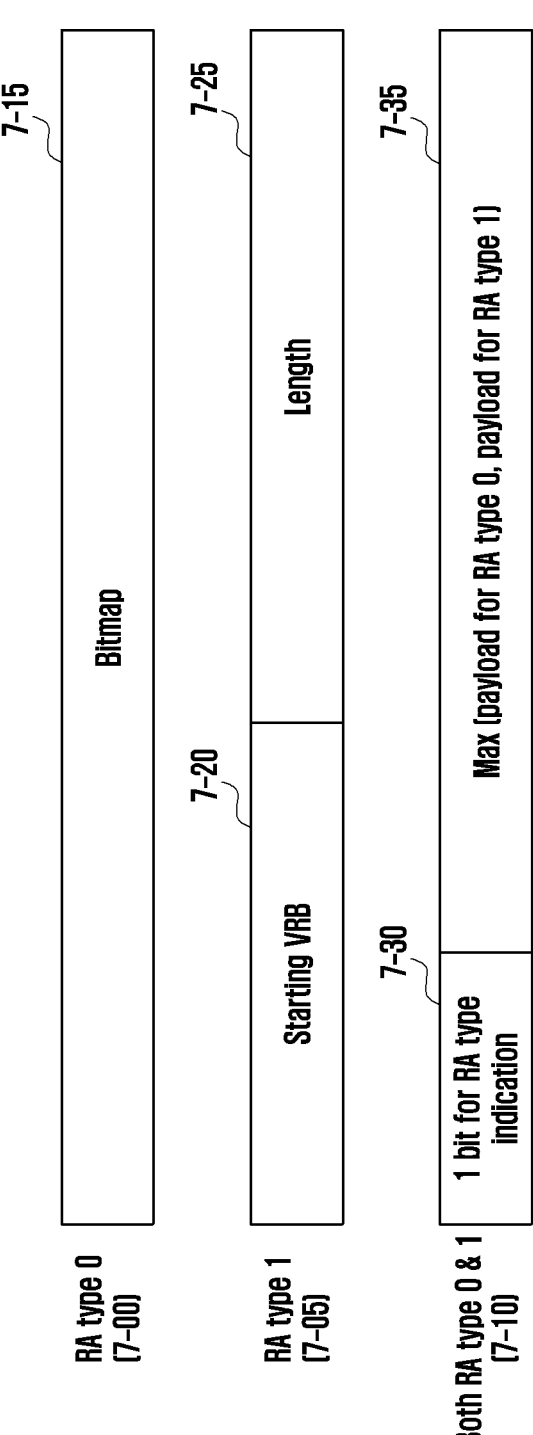
FIG. 7 illustrates an example of allocating frequency domain resources for a physical downlink shared channel (PDSCH) according to an embodiment of the disclosure.

FIG. 7 illustrates an example of allocating frequency domain resources for a physical downlink shared channel (PDSCH) or a physical uplink shared channel (PUSCH) according to an embodiment of the disclosure.

FIG. 7 illustrates three frequency domain resource allocation methods including type 0 7-00, type 1 7-05, and a dynamic switch 7-10 which may be configured via a higher layer in NR.

If a terminal is configured to use only resource type 0 through higher layer signaling (as indicated by reference numeral 7-00), partial downlink control information (DCI) allocating a PDSCH or a PUSCH to the terminal has a bitmap configured by NRBG number of bits. The conditions for the same will be described later. NRBG implies the number of resource block groups (RBGs) determined, as shown in Table 3 below, according to an rbg-Size, which is a higher layer parameter, and a BWP size allocated by a BWP indicator, and data is transmitted on a RBG indicated by number 1 through the bitmap.

TABLE 3

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

In the case that a terminal is configured to use only resource type 1 through higher layer signaling (as indicated by reference numeral 7-05), partial downlink control information (DCI) allocating a PDSCH or a PUSCH to the terminal has frequency domain resource allocation information configured by $$\lceil \log_2(N_{RB}^{DL,BWP}(N_{RB}^{DL,BWP}+1)/2) \rceil$$

number of bits. The conditions for the same will be described later. A base station is able to configure, through the information, a starting VRB 7-20 and the length 7-25 of a frequency domain resource continuously allocated from the starting VRB 7-20.

In the case that a terminal is configured to use both resource type 0 and resource type 1 through higher layer signaling (as indicated by reference numeral 7-10), partial DCI allocating a PDSCH or a PUSCH to the terminal has frequency domain resource allocation information configured by bits of a bigger value 7-35 among a payload 7-15 for configuring resource type 0 and a payload 7-20, 7-25 for configuring resource type 1. The conditions for the same will be described later. A bit 7-30 is added to the foremost part (an MSB) of the frequency domain resource allocation information in the DCI, and the bit indicates that resource type 0 is used when the bit is 0, and resource type 1 is used when the bit is 1.

Figure 8:
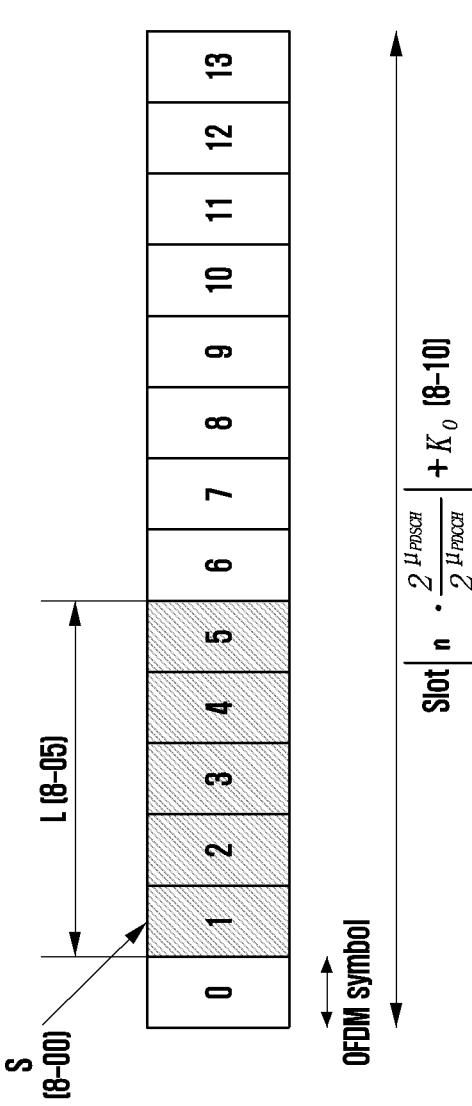
FIG. 8 illustrates an example of allocating time domain resources for a PDSCH according to an embodiment of the disclosure.

FIG. 8 illustrates an example of allocating time domain resources for a PDSCH or a PUSCH according to an embodiment of the disclosure.

Referring to FIG. 8, a base station may dynamically indicate the time-axis position of PDSCH resources according to subcarrier spacings of a data channel and a control channel that are configured via higher layer signaling, a scheduling offset ($K_0$ or $K_2$) value, and a starting position 8-00 and a length 8-05 in OFDM symbols of one slot through DCI.

The NR system provides various DCI formats as shown in Table 4 according to purposes in order for a terminal to efficiently receive a control channel.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

For example, a base station may use DCI format 1_0 or DCI format 1_1 in order to allocate (schedule) a PDSCH in one cell.

When DCI format 1_0 is transmitted together with a CRC scrambled by a cell radio network temporary identifier (C-RNTI), a configured scheduling RNTI (CS-RNTI), or an MCS-C-RNTI, DCI format 1_0 includes at least pieces of information as below.

Identifier for DCI formats (1 bits): the information is always configured to be 1 as a DCI format indicator.

Frequency domain resource assignment $$\left( \lceil \log_2\left( N_{RB}^{DL,BWP} \left( N_{RB}^{DL,BWP} + 1 \right)/2 \right) \rceil \text{ bits} \right):$$

the information indicates frequency domain resource allocation, and when DCI format 1_0 is monitored in a UE-specific search space, $$N_{RB}^{DL,BWP}$$

is the size of an active DL BWP, and otherwise, $$N_{RB}^{DL,BWP}$$

is the size of an initial DL BWP. For the detailed methods, see the frequency domain resource allocation described above.

Time domain resource assignment (4 bits): the information indicates time domain resource allocation according to the description described above.

VRB-to-PRB mapping (1 bit): when the information is 0, non-interleaved VRP-to-PRB mapping is indicated, and when the information is 1, interleaved VRB-to-PRB mapping is indicated.

Modulation and coding scheme (5 bits): the information indicates a modulation order and a coding rate used for PDSCH transmission.

New data indicator (1 bit): the information indicates whether a PDSCH corresponds to initial transmission or retransmission, according to whether the indicator has been toggled.

Redundancy version (2 bits): the information indicates a redundancy version used for PDSCH transmission.

HARQ process number (4 bits): the information indicates an HARQ process number used for PDSCH transmission.

Downlink assignment index (2 bits): a DAI indicator.

TPC command for scheduled PUCCH (2 bits): a PUCCH power control indicator.

PUCCH resource indicator (3 bits): the information is a PUCCH resource indicator, and indicates one of eight types of resources configured through a higher layer.

PDSCH-to-HARQ_feedback timing indicator (3 bits): the information is an HARQ feedback timing indicator, and indicates one of eight types of feedback timing offsets configured through a higher layer.

When DCI format 1_1 is transmitted together with a CRC scrambled by a C-RNTI, a CS-RNTI, or an MCS-C-RNTI, DCI format 1_1 includes at least pieces of information as below.

Identifier for DCI formats (1 bit): the information is always configured to be 1 as a DCI format indicator.

Carrier indicator (0 or 3 bits): the information indicates a CC (or a cell) in which a PDSCH allocated by corresponding DCI is transmitted.

Bandwidth part indicator (0, 1, or 2 bits): the information indicates a BWP in which a PDS CH allocated by corresponding DCI is transmitted.

Frequency domain resource assignment (a payload is determined according to the frequency domain resource assignment); the information indicates frequency domain resource allocation, and $$N_{RB}^{DL,BWP}$$

is the size of an active DL BWP. For the detailed methods, see the frequency domain resource allocation described above.

Time domain resource assignment (4 bits): the information indicates time domain resource allocation according to the description described above.

VRB-to-PRB mapping (0 or 1 bit): when the information is 0, non-interleaved VRP-to-PRB mapping is indicated, and when the information is 1, interleaved VRP-to-PRB mapping is indicated. When frequency domain resource allocation is configured to be resource type 0, the information is 0 bits.

PRB bundling size indicator (0 or 1 bit): when prb-BundlingType, which is a higher layer parameter, is not configured, or configured to be "static", the information is 0 bits, and when prb-BundlingType is configured to be "dynamic", the information is 1 bit.

Rate matching indicator (0, 1, or 2 bits): the information indicates a rate matching pattern.

ZP CSI-RS trigger (0, 1, or 2 bits); an indicator triggering an aperiodic ZP CSI-RS.

For transport block 1,

Modulation and coding scheme (5 bits): the information indicates a modulation order and a coding rate used for PDSCH transmission.

New data indicator (1 bit): the information indicates whether a PDSCH corresponds to initial transmission or retransmission, according to whether the indicator has been toggled.

Redundancy version (2 bits): the information indicates a redundancy version used for PDSCH transmission.

For transport block 2,

Modulation and coding scheme (5 bits): the information indicates a modulation order and a coding rate used for PDSCH transmission.

New data indicator (1 bit): the information indicates whether a PDSCH corresponds to initial transmission or retransmission, according to whether the indicator has been toggled.

Redundancy version (2 bits): the information indicates a redundancy version used for PDSCH transmission.

HARQ process number (4 bits): the information indicates an HARQ process number used for PDSCH transmission.

Downlink assignment index (0, 2, or 4 bits): a DAI indicator.

TPC command for scheduled PUCCH (2 bits); a PUCCH power control indicator.

PUCCH resource indicator (3 bits): the information is a PUCCH resource indicator, and indicates one of eight types of resources configured through a higher layer.

PDSCH-to-HARQ_feedback timing indicator (3 bits): the information is an HARQ feedback timing indicator, and indicates one of eight types of feedback timing offsets configured through a higher layer.

Antenna port (4, 5, or 6 bits): the information indicates a DMRS port and a CDM group without data.

Transmission configuration indication (0 or 3 bits): a TCI indicator.

SRS request (2 or 3 bits): an SRS transmission request indicator.

CBG transmission information (0, 2, 4, 6, or 8 bits): the information is an indicator informing of whether to transmit code block groups in an allocated PDSCH. Number 0 refers that a corresponding CBG is not transmitted, and number 1 refers that a corresponding CBG is transmitted.

CBG flushing out information (0 or 1 bits): the information is an indicator informing of whether previous CBGs are corrupted, and when the information is 0, the CBGs may be corrupted, and when the information is 1, the CBGs are usable (combinable) at the time of receiving retransmission.

DMRS sequence initialization (0 or 1 bit): a DMRS scrambling ID selection indicator.

The maximum number of pieces of DCI having different sizes, which can be received per slot in a corresponding cell by a terminal, is 4. The maximum number of pieces of DCI having different sizes and scrambled by a C-RNTI, which can be received per slot in a corresponding cell by the terminal, is 3.

In NR, the terminal performs blind decoding in a specific time/frequency region to receive a PDCCH including DCI. A base station may configure a control resource set (CORE-SET) and a search space for the terminal through higher layer signaling to provide a time/frequency region in which the terminal is to perform blind decoding, and a mapping method. The base station may configure a maximum of three CORESETs and a maximum of search spaces for each of BWPs configured for the terminal. For example, the base station and the terminal may exchange signaling information described as shown in Table 5 below to transfer information relating to a CORESET.

TABLE 5

| ControlResourceSet information element |
| --- |

```
-- ASN1START-- TAG-CONTROLRESOURCESET-START
ControlResourceSet ::=                            SEQUENCE {
    controlResourceSetId                          ControlResourceSetId,
    frequencyDomainResources                      BIT STRING (SIZE (45)),
    duration                                      INTEGER (1..maxCoReSetDuration),
    cce-REG-MappingType                           CHOICE {
        interleaved                               SEQUENCE {
            reg-BundleSize                                ENUMERATED {n2, n3,
n6},
            interleaverSize                               ENUMERATED {n2, n3, n6},
            shiftIndex
INTEGER(0..maxNrofPhysicalResourceBlocks-1)               OPTIONAL -- Need S
        },
        nonInterleaved                            NULL
    },
    precoderGranularity                           ENUMERATED {sameAsREG-bundle,
allContiguousRBs},
    tci-StatesPDCCH-ToAddList                     SEQUENCE(SIZE (1..maxNrofTCI-
StatesPDCCH)) OF TCI-StateId OPTIONAL, -- Cond NotSIB1-initialBWP
    tci-StatesPDCCH-ToReleaseList                 SEQUENCE(SIZE (1..maxNrofTCI-
StatesPDCCH)) OF TCI-StateId OPTIONAL, -- Cond NotSIB1-initialBWP
    tci-PresentInDCI                              ENUMERATED {enabled}
OPTIONAL, -- Need S
```

TABLE 5-continued

| ControlResourceSet information element |
|---|
| pdcch-DMRS-ScramblingID                   INTEGER (0..65535)<br>OPTIONAL, -- Need S<br>   ...<br>}<br>-- TAG-CONTROLRESOURCESET-STOP<br>-- ASN1STOP |

The signaling information ControlResourceSet includes information relating to each CORESET. The information included in the signaling information ControlResourceSet may have meanings as below.

controlResourceSetId: the information indicates a CORESET index.

frequencyDomainResources: the information indicates frequency resource information of a CORESET. With respect to all PRB s included in a BWP, RB groups each including 6 RB s are made, and whether each of the RB groups is included in a CORESET frequency resource is indicated by 1 bit. (1: included in CORESET, 0: not included in CORESET)

duration: symbol level time resource information of a CORESET. The information has one value of 1, 2, or 3.

cce-REG-MappingType: the information indicates whether control channel elements (CCEs) mapped to a CORESET are interleaved. When a CCE is interleaved, additional information (reg-BundleSize, interleaverSize, and shiftIndex) relating to interleaving is provided.

precoderGranularity: the information indicates information relating to precoding of frequency resources of a CORESET. The size of a precoder may be the same as a resource element group (REG) bundle size, or the size of all frequency resources of a CORESET.

tci-StatePDCCH-ToAddList, tci-StatePDCCH-ToReleaseList: the information indicates an activatable transmission configuration indication (TCI) state set of a CORESET. One in an activatable transmission configuration indication (TCI) state set of a CORESET may be activated through higher layer signaling (e.g., MAC CE). When a CORESET is configured in an initial access process, a TCI state may not be configured. A description of TCI states will be given later.

tci-PresentInDCI: the information indicates whether an indicator indicating a TCI state of a PDSCH is included in DCI transmitted through a PDCCH included in a CORESET.

Pdcch-DMRS-ScramblingID: a sequence scrambling index of a DMRS transmitted in a PDCCH included in a CORESET.

A terminal may perform blind decoding for receiving a PDCCH by referring to information relating to a CORESET, described above.

In NR, a base station may transfer, to a terminal, information relating to a quasi-co-location (QCL) relationship between antenna ports (e.g., a DMRS port of a PDSCH, a PDCCH DMRS port, or a CSI-RS port of a CSI-RS) transmitting a downlink channel, so that the terminal smoothly receives a downlink channel (e.g., a PDCCH or PDSCH) and decodes the downlink channel. A QCL relationship between antenna ports may have one of a total of four QCL types.

"QCL-typeA": {Doppler shift, Doppler spread, average delay, delay spread}

"QCL-typeB": {Doppler shift, Doppler spread}

"QCL-typeC": {Doppler shift, average delay}

"QCL-typeD": {Spatial RX parameter}

If two different antenna ports share a part of the QCL types described above, or one antenna port refers to a part of the QCL type of the other antenna port, a terminal may assume that the two antenna ports share a parameter supported in a QCL type, which is shared or referenced by the two antenna ports, and thus have the same values.

A base station may configure a TCI state to transfer information relating to a QCL relationship between antenna ports to a terminal. The TCI state includes information relating to one or two downlink RS s and supported QCL types. For example, the base station and the terminal may exchange signaling information described as shown in [Table 6] below to transfer information relating to a TCI state.

TABLE 6

| TCI-State information element |
|---|
| -- ASN1START-- TAG-TCI-STATE-START<br>TCI-State ::=            SEQUENCE {<br>  tci-StateId             TCI-StateId,<br>  qcl-Type1             QCL-Info,<br>  qcl-Type2                     QCL-Info<br>OPTIONAL,   -- Need R<br>  ...<br>}<br>QCL-Info ::=            SEQUENCE {<br>  cell                    ServCellIndex<br>OPTIONAL,   -- Need R<br>  bwp-Id                  BWP-Id<br>OPTIONAL, -- Cond CSI-RS-Indicated<br>  referenceSignal        CHOICE {<br>    csi-rs               NZP-CSI-RS-ResourceId,<br>    ssb                SSB-Index<br>  },<br>  qcl-Type             ENUMERATED {typeA, typeB,<br>typeC, typeD},<br>  ...<br>}<br>-- TAG-TCI-STATE-STOP<br>-- ASN1STOP |

"TCI-state" of the signaling information includes information relating to each TCI state. According to the signaling information, each TCI state includes information relating to a TCI state index and one or two types of QCL-Info (qcl-Type 1 and qcl-Type2). Qcl-Type1 or qcl-Type2 provides information relating to the index of a cell in which an RS is configured, the index of a BWP in which an RS is included, an RS for providing information relating to a parameter supported in a QCL type according to QCL types, and one of a total of four QCL types. Qcl-Type1 may have a QCL type among "QCL-typeA", "QCL-typeB", or "QCL-typeC" in the total of four QCL types, and qcl-Type2 may have "QCL-typeD". By referring to an activated TCI state of an antenna port transmitting a downlink channel, a terminal may receive and decode a downlink channel, based on an RS referenced in the activated TCI state and a QCL type supported in same.

NR has a CSI framework for indicating, by a base station, measurement and reporting of channel state information (CSI) to a terminal. The CSI framework of NR may be configured by at least two elements including resource setting and report setting. Report setting may have a connection relationship with resource setting by referring to at least one ID of the resource setting.

According to an embodiment of the disclosure, resource setting may include information related to a reference signal (RS) for measuring channel state information by a terminal. A base station may configure at least one resource setting for a terminal. For example, the base station and the terminal may exchange signaling information described as shown in Table 7 below to transfer information relating to resource setting.

TABLE 7

| CSI-ResourceConfig information element |
|---|
| -- ASN1START-- TAG-CSI-RESOURCECONFIG-START<br>CSI-ResourceConfig ::=                        SEQUENCE {<br>    csi-ResourceConfigId                    CSI-ResourceConfigId,<br>    csi-RS-ResourceSetList                  CHOICE {<br>        nzp-CSI-RS-SSB                          SEQUENCE {<br>            nzp-CSI-RS-ResourceSetList              SEQUENCE (SIZE (1..maxNrofNZP-CSI-RS-<br>ResourceSetsPerConfig)) OF NZP-CSI-RS-ResourceSetId<br>OPTIONAL, -- Need R<br>            csi-SSB-ResourceSetList                 SEQUENCE (SIZE (1..maxNrofCSI-SSB-<br>ResourceSetsPerConfig)) OF CSI-SSB-ResourceSetId<br>OPTIONAL -- Need R<br>        },<br>        csi-IM-ResourceSetList                  SEQUENCE (SIZE (1..maxNrofCSI-IM-<br>ResourceSetsPerConfig)) OF CSI-IM-ResourceSetId<br>    },<br>    bwp-Id                                  BWP-Id,<br>    resourceType                            ENUMERATED { aperiodic, semiPersistent, periodic },<br>    ...<br>}<br>-- TAG-CSI-RESOURCECONFIG-STOP<br>-- ASN1STOP |

The signaling CSI-ResourceConfig may include information relating to each resource setting. According to the signaling information, each resource setting may include a resource setting index (csi-ResourceConfigId), a BWP index (bwp-ID), time domain transmission configuration of resources (resourceType), or a resource set list (csi-RS-ResourceSetList) including at least one resource set. Time domain transmission configuration of resources may be configured as aperiodic transmission, semi-persistent transmission, or periodic transmission. A resource set list may be a set including resource sets for channel measurement, or a set including resource sets for interference measurement. When a resource set list is a set including resource sets for channel measurement, each resource set may include at least one resource, and the at least one resource may correspond to an index of a CSI reference signal (CSI-RS) resource or a synchronization/broadcast channel block (SS/PBCH block, SSB). When a resource set list is a set including resource sets for interference measurement, each resource set may include at least one interference measurement resource (CSI interference measurement, CSI-IM). For example, when a resource set includes a CSI-RS, a base station and a terminal may exchange signaling information described as shown in Table 8 below to transfer information relating to the resource set.

TABLE 8

| NZP-CSI-RS-ResourceSet information element |
|---|
| -- ASN1START-TAG-NZP-CSI-RS-RESOURCESET-START<br>NZP-CSI-RS-ResourceSet ::=            SEQUENCE {<br>    nzp-CSI-ResourceSetId                NZP-CSI-RS-ResourceSetId,<br>    nzp-CSI-RS-Resources                 SEQUENCE (SIZE (1..maxNrofNZP-CSI-RS-<br>ResourcesPerSet)) OF NZP-CSI-RS-ResourceId, |

TABLE 8-continued

| NZP-CSI-RS-ResourceSet information element |
| --- |

```
    repetition                    ENUMERATED { on, off }
OPTIONAL,   -- Need S
    aperiodicTriggeringOffset         INTEGER(0..6)
OPTIONAL,   -- Need S
    trs-Info                      ENUMERATED {true}
OPTIONAL,   -- Need R
    ...
}
-- TAG-NZP-CSI-RS-RESOURCESET-STOP
-- ASN1STOP
```

The signaling information NZP-CSI-RS-ResourceSet includes information relating to each resource set. According to the signaling information, each resource set may include at least information relating to a resource set index (nzp-CSI-ResourceSetId) or a CSI-RS indexset (nzp-CSI-RS-Resources). Further, each resource set may include a part of information (repetition) relating to a spatial domain transmission filter of a CSI-RS resource, or information (trs-Info) relating to whether a CSI-RS resource has a tracking purpose.

A CSI-RS may be the most representative reference signal included in a resource set. A base station and a terminal may exchange signaling information described as shown in Table 9 below to transfer information relating to a CSI-RS resource.

TABLE 9

| NZP-CSI-RS-Resource information element |
| --- |

```
-- ASN1START-TAG-NZP-CSI-RS-RESOURCE-START
NZP-CSI-RS-Resource ::=    SEQUENCE {
    nzp-CSI-RS-ResourceId      NZP-CSI-RS-ResourceId,
    resourceMapping               CSI-RS-ResourceMapping,
    powerControlOffset          INTEGER (–8..15),
    powerControlOffsetSS           ENUMERATED{db-3, db0, db3,
                                    db6}
OPTIONAL,   -- Need R
    scramblingID                ScramblingId,
    periodicityAndOffset             CSI-ResourcePeriodicityAndOffset
OPTIONAL,   -- Cond PeriodicOrSemiPersistent
    qcl-InfoPeriodicCSI-RS            TCI-StateId
OPTIONAL,   -- Cond Periodic
    ...
}
```

TABLE 9-continued

| NZP-CSI-RS-Resource information element |
| --- |

```
-- TAG-NZP-CSI-RS-RESOURCE-STOP
-- ASN1STOP
```

The signaling information NZP-CSI-RS-Resource includes information relating to each CSI-RS. The information included in the signaling information NZP-CSI-RS-Resource may have meanings as below.

nzp-CSI-RS-ResourceId: the index of a CSI-RS resource resourceMapping: resource mapping information of a CSI-RS resource powerControlOffset: a ratio between PDSCH EPRE (Energy Per RE) and CSI-RS EPRE powerControlOffsetSS: a ratio between SS/PBCH block EPRE and CSI-RS EPRE scramblingID: the scrambling index of a CSI-RS sequence periodicityAndOffset: the transmission period and the slot offset of a CSI-RS resource qcl-InfoPeriodicCSI-RS: TCI-state information when a corresponding CSI-RS is a periodic CSI-RS.

"resourceMapping" included in the signaling NZP-CSI-RS-Resource may indicate resource mapping information of a CSI-RS resource, and the resource mapping information may include resource element (RE) mapping for frequency resources, the number of ports, symbol mapping, CDM type, frequency resource density, and frequency band mapping information. Each of the number of ports, frequency resource density, CDM type, and time-frequency domain RE mapping, which may be configured through the resource mapping information, may have a determined value in one of the rows shown in Table 10.

TABLE 10

| Row | Ports X | Density $\rho$ | cdm-Type | $(\bar{k}, \bar{l})$ | CDM group index j | k' | l' |
| --- | --- | --- | --- | --- | --- | --- | --- |
| 1 | 1 | 3 | noCDM | $(k_0, l_0), (k_0 + 4, l_0),$ $(k_0 + 8, l_0)$ | 0, 0, 0 | 0 | 0 |
| 2 | 1 | 1, 0.5 | noCDM | $(k_0, l_0),$ | 0 | 0 | 0 |
| 3 | 2 | 1, 0.5 | fd-CDM2 | $(k_0, l_0),$ | 0 | 0, 1 | 0 |
| 4 | 4 | 1 | fd-CDM2 | $(k_0, l_0), (k_0 + 2, l_0)$ | 0, 1 | 0, 1 | 0 |
| 5 | 4 | 1 | fd-CDM2 | $(k_0, l_0), (k_0, l_0 + 1)$ | 0, 1 | 0, 1 | 0 |
| 6 | 8 | 1 | fd-CDM2 | $(k_0, l_0), (k_1, l_0), (k_2, l_0),$ $(k_3, l_0)$ | 0, 1, 2, 3 | 0, 1 | 0 |
| 7 | 8 | 1 | fd-CDM2 | $(k_0, l_0), (k_1, l_0), (k_0, l_0 +$ $1), (k_1, l_0 + 1)$ | 0, 1, 2, 3 | 0, 1 | 0 |
| 8 | 8 | 1 | cdm4-FD2-TD2 | $(k_0, l_0), (k_1, l_0)$ | 0, 1 | 0, 1 | 0, 1 |

TABLE 10-continued

| Row | Ports X | Density ρ | cdm-Type | $(\bar{k}, \bar{l})$ | CDM group index j | k' | l' |
|---|---|---|---|---|---|---|---|
| 9 | 12 | 1 | fd-CDM2 | $(k_0, l_0)$, $(k_1, l_0)$, $(k_2, l_0)$, $(k_3, l_0)$, $(k_4, l_0)$, $(k_5, l_0)$ | 0, 1, 2, 3, 4, 5 | 0, 1 | 0 |
| 10 | 12 | 1 | cdm4-FD2-TD2 | $(k_0, l_0)$, $(k_1, l_0)$, $(k_2, l_0)$ | 0, 1, 2 | 0, 1 | 0, 1 |
| 11 | 16 | 1, 0.5 | fd-CDM2 | $(k_0, l_0)$, $(k_1, l_0)$, $(k_2, l_0)$, $(k_3, l_0)$, $(k_0, l_0 + 1)$, $(k_1, l_0 + 1)$, $(k_2, l_0 + 1)$, $(k_3, l_0 + 1)$ | 0, 1, 2, 3, 4, 5, 6, 7 | 0, 1 | 0 |
| 12 | 16 | 1, 0.5 | cdm4-FD2-TD2 | $(k_0, l_0)$, $(k_1, l_0)$, $(k_2, l_0)$, $(k_3, l_0)$ | 0, 1, 2, 3 | 0, 1 | 0, 1 |
| 13 | 24 | 1, 0.5 | fd-CDM2 | $(k_0, l_0)$, $(k_1, l_0)$, $(k_2, l_0)$, $(k_0, l_0 + 1)$, $(k_1, l_0 + 1)$, $(k_2, l_0 + 1)$, $(k_0, l_1)$, $(k_1, l_1)$, $(k_2, l_1)$, $(k_0, l_1 + 1)$, $(k_1, l_1 + 1)$, $(k_2, l_1 + 1)$ | 0, 1, 2, 3, 4, 5, 6, 7, 8, 9, 10, 11 | 0, 1 | 0 |
| 14 | 24 | 1, 0.5 | cdm4-FD2-TD2 | $(k_0, l_0)$, $(k_1, l_0)$, $(k_2, l_0)$, $(k_0, l_1)$, $(k_1, l_1)$, $(k_2, l_1)$ | 0, 1, 2, 3, 4, 5 | 0, 1 | 0, 1 |
| 15 | 24 | 1, 0.5 | cdm8-FD2-TD4 | $(k_0, l_0)$, $(k_1, l_0)$, $(k_2, l_0)$ | 0, 1, 2 | 0, 1 | 0, 1, 2, 3 |
| 16 | 32 | 1, 0.5 | fd-CDM2 | $(k_0, l_0)$, $(k_1, l_0)$, $(k_2, l_0)$, $(k_3, l_0)$, $(k_0, l_0 + 1)$, $(k_1, l_0 + 1)$, $(k_2, l_0 + 1)$, $(k_3, l_0 + 1)$, $(k_0, l_1)$, $(k_1, l_1)$, $(k_2, l_1)$, $(k_3, l_1)$, $(k_0, l_1 + 1)$, $(k_1, l_1 + 1)$, $(k_2, l_1 + 1)$, $(k_3, l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | cdm4-FD2-TD2 | $(k_0, l_0)$, $(k_1, l_0)$, $(k_2, l_0)$, $(k_3, l_0)$, $(k_0, l_1)$, $(k_1, l_1)$, $(k_2, l_1)$, $(k_3, l_1)$ | 0, 1, 2, 3, 4, 5, 6, 7 | 0, 1 | 0, 1 |
| 18 | 32 | 1, 0.5 | cdm8-FD2-TD4 | $(k_0, l_0)$, $(k_1, l_0)$, $(k_2, l_0)$, $(k_3, l_0)$ | 0, 1, 2, 3 | 0, 1 | 0, 1, 2, 3 |

Table 10 shows a frequency resource density configurable according to the number (X) of CSI-RS ports, a CDM type, frequency and time domain starting positions $(\bar{k}, \bar{l})$ of a CSI-RS component RE pattern, and the number (k') of frequency domain Res and the number (l') of time domain Res of a CSI-RS component RE pattern. The CSI-RS component RE pattern described above may be a basic unit for configuring a CSI-RS resource. A CSI-RS component RE pattern may be configured by YZ number of Res through Y=1+max(k') number of frequency domain Res and Z=1+max(l') number of time domain Res. When the number of CSI-RS ports is 1, the position of a CSI-RS RE may be designated in a physical resource block (PRB) without restriction on subcarriers, and may be designated by a bitmap having 12 bits. When the number of CSI-RS ports is {2, 4, 8, 12, 16, 24, 32}, and Y is equal to 2, the position of a CSI-RS RE may be designated at every two subcarriers in a PRB, and may be designated by a bitmap of 6 bits. When the number of CSI-RS ports is 4, and Y is equal to 4, the position of a CSI-RS RE may be designated at every four subcarriers in a PRB, and may be designated by a bitmap of 3 bits. Similarly, the position of a time domain RE may be designated by a bitmap having a total of 14 bits. Here, according to a Z value shown in Table 10, the length of a bitmap can be changed like a frequency position designation. However, the principle of the change is similar to the description above, and therefore, a duplicate description will be omitted hereinafter.

Unlike the conventional system, an NR system can support all services including a service having very short transmission latency and a service requiring high connection density, as well as a service requiring high data rate. In a wireless communication network including multiple cells, transmission and reception points (TRPs), or beams, coordinated transmission between cells, TRPs, and/or beams is one of the elementary technologies for increasing the intensity of a signal received by a terminal, or efficiently performing interference control between cells, TRPs, and/or beams, to satisfy the various service requirements.

Joint transmission (JT) is a representative transmission technology for coordinated transmission described above, and through the technology, one terminal is supported through different cells, TRPs, and/or beams to increase the intensity of a signal received by the terminal. The characteristics of channels between a terminal and each cell, TRP, and/or beam may be largely different from each other. Therefore, different precoding, MCS, and resource allocation are required to be applied to links between a terminal and each cell, TRP, and/or beam. Especially, in a case of a non-coherent joint transmission (NC-JT) supporting non-coherent precoding between cells, TRPs, and/or beams, individual downlink transmission information configurations for the cells, TRPs, and/or beams are important.

Figure 9:
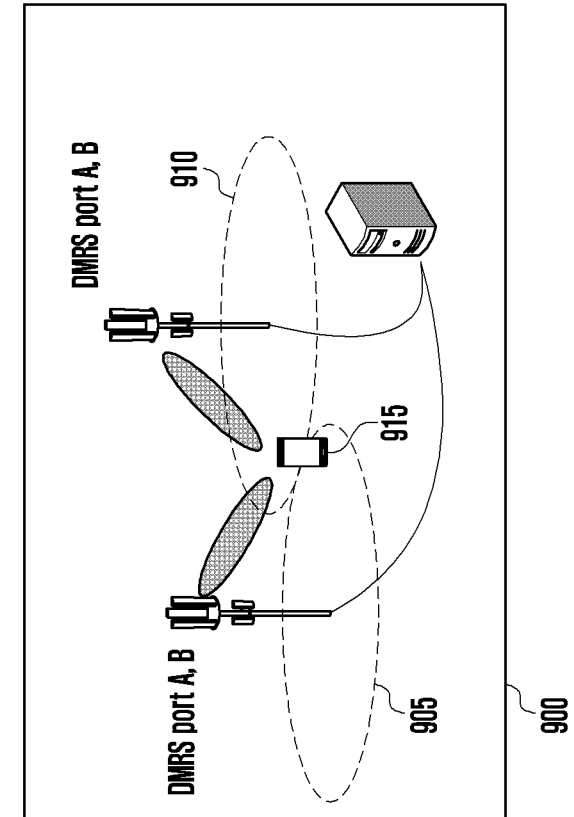
FIG. 9 illustrates examples of wireless resource allocation for each TRP according to joint transmission (JT) techniques and situations according to an embodiment the disclosure.

FIG. 9 illustrates examples of wireless resource allocation for each TRP according to joint transmission (JT) techniques and situations according to an embodiment the disclosure.

In FIG. 9, a part 9-00 is a diagram illustrating coherent joint transmission (C-JT) supporting coherent precoding between cells, TRPs, and/or beams. In C-JT, TRP A 9-05 and TRP B 9-10 transmit identical data (PDSCH), and joint precoding is performed in multiple TRPs. This refers to that TRP A 9-05 and TRP B 9-10 transmit the same DMRS ports (e.g., DMRS ports A and B from each of the two TRPs) for reception of an identical PDSCH. In this case, a terminal 9-15 may receive one piece of DCI information for receiving one PDSCH demodulated through DMRS ports A and B.

In FIG. 9, a part 9-20 is a diagram illustrating non-coherent joint transmission (NC-JT) supporting non-coherent precoding between cells, TRPs, and/or beams. In a case of NC-JT, different PDSCHs are transmitted from the cells, TRPs, and/or beams, and individual precoding may be applied to each PDSCH. This refers to that TRP A 9-25 and TRP B 9-30 transmit different DMRS ports (e.g., DMRS port A from TRP A, and DMRS port B from TRP B) for transmission of different PDSCHs. In this case, a terminal 9-35 may receive two types of DCI information for receiving PDSCH A demodulated through DMRS port A, and PDSCH B demodulated through DMRS port B.

In embodiments of the disclosure, "a case of NC-JT" or "a case in which NC-JT is applied" may be variously interpreted in accordance with a situation, to be "a case where a terminal receives one or more PDSCHs simultaneously in one BWP", "a case where a terminal receives a PDSCH, based on two or more TCI indications simultaneously, in one BWP", and "a case where a PDSCH received by a terminal is associated with one or more demodulation reference signal (DM-RS) port groups". However, for convenience of explanation, the expressions described above are used.

In embodiments of the disclosure, a terminal in a coordinated communication environment may receive information by multiple TRPs having various channel qualities, and a TRP among the TRPs, which has the best channel quality and thus provides pieces of main control information, is named a main TRP, and the remaining TRPs are named coordinated TRPs.

Further, in embodiments of the disclosure, a "TRP" may be replaced by various terms, such as, a "panel" or a "beam" in practical application.

A terminal is required to normally receive a PDCCH transmitted by a base station, so as to enable smooth downlink transmission between the base station and the terminal. When the terminal is unable to normally receive a PDCCH, this may imply that beam failure has occurred between the terminal and the base station. A criterion and a method for identifying whether a terminal is able to normally receive a PDCCH will be described later. An NR system supports a beam failure recovery (BFR) procedure for coping with dynamic beam failure between a base station and a terminal so as to enable smooth downlink transmission.

A BFR procedure in an NR system may be divided into four main processes. The first process is a process of detecting beam failure. Hereinafter, the first process may be called a beam failure detection (BFD) process, and a detailed description will be given below. In the BFD process, a terminal determines whether to receive a PDCCH normally, and when the terminal is determined to be unable to normally receive a PDCCH, a lower layer (e.g., a physical layer) of the terminal reports a beam failure indication (or beam failure instance indication) to a higher layer (e.g., MAC layer). The higher layer of the terminal may detect beam failure by the reporting, and may determine whether to perform the next process of BFR. A criterion of identifying whether a terminal can normally receive a PDCCH corresponds to a hypothetical PDCCH reception block error rate (BLER) of the terminal, and the terminal may determine the same by comparing the block error rate with a predetermined threshold. The terminal requires a reference signal (RS) set for BFD in order to calculate the hypothetical PDCCH reception BLER, and hereinafter, the RS set will be referenced as a BFD RS set. The BFD RS set may include a maximum of two RSs, and each of the RSs may be a periodic CSI-RS transmitted through a single port, or a synchronization/broadcast channel block (SS/PBCH block, SSB). The BFD RS set may be configured via higher layer signaling (e.g., RRC signaling) of a base station. When the BFD RS set is not configured through higher layer signaling, the BFD RS set may include a part or all of RSs referenced in an activated TCI state of a CORESET(s) configured for PDCCH monitoring of the terminal. When there are two or more RSs referenced in a TCI state, the BFD RS set may include an RS referenced for "QCL-typeD" including beam information. A terminal may calculate a hypothetical PDCCH reception BLER, based on only an RS referenced in an activated TCI state of a CORESET(s) configured for PDCCH monitoring, among the RSs included in a BFD RS set. The terminal may calculate the hypothetical PDCCH reception BLER by referring to Table 11 below.

TABLE 11

| Attribute | Value for BLER |
| --- | --- |
| DCI format | 1-0 |
| Number of control OFDM symbols | Same as the number of symbols of CORESET QCLed with respective CSI-RS for BFD |
| Aggregation level (CCE) | 8 |
| Ratio of hypothetical PDCCH RE energy to average CSI-RS RE energy | 0 dB |
| Ratio of hypothetical PDCCH DMRS energy to average CSI-RS RE energy | 0 dB |
| Bandwidth (MHz) | Same as the number of PRBs of CORESET QCLed with respective CSI-RS for BFD |
| Sub-carrier spacing (kHz) | Same as the SCS of CORESET QCLed with respective CSI-RS for BFD |
| DMRS precoder granularity | REG bundle size |
| REG bundle size | 6 |
| CP length | Same as the CP length of CORESET QCLed with respective CSI-RS for BFD |
| Mapping from REG to CCE | Distributed |

Table 11 provides a configuration relating to a hypothetical PDCCH referenced by a terminal when the terminal calculates a hypothetical PDCCH reception BLER. Referring to Table 11, the terminal may calculate a hypothetical PDCCH reception BLER under an assumption of the number of OFDM symbols of a CORESET(s) having an activated TCI state referring to an RS included in a BFD RS set, a bandwidth, subcarrier spacing, and a cyclic prefix (CP) length. The terminal calculates a hypothetical PDCCH reception BLER of each of all CORESETs each having an activated TCI state referring to an RS included in a BFD RS set, and when the hypothetical PDCCH reception BLER of each of all CORESETs exceeds a configured threshold, the terminal reports a beam failure indication to a higher layer. When receiving beam failure indication reporting, the higher layer of the terminal may increase a beam failure instance count, and when the count value reaches a configured maximum value, the higher layer may determine whether to perform the next process of BFR, and may refer to the parameters below configured for a higher layer operation process.

beamFailureInstanceMaxCount: the maximum number of times of beam failure indication reporting of a terminal, required for performing the next process of BFR.

beamFailureDetectionTimer: a timer configuration for initializing the number of times of beam failure indication reporting of a terminal.

The second process in the BFR procedure of the NR system is a process for searching for a new beam having a good channel state, and hereinafter, the second process may be called a new candidate beam identification process. When the higher layer of the terminal detects beam failure and determines to proceed with a process of searching for a new beam, the higher layer may request the lower layer of the terminal to report information relating to a new candidate beam, for example, L1-reference signal received power (RSRP). The base station may configure a candidate beam RS set through higher layer signaling so as to allow the terminal to calculate information relating to a new candidate beam. The candidate beam RS set may include a maximum of 16 RSs, and each of the RSs may be a periodic CSI-RS or an SSB. When the higher layer of the terminal requests the lower layer of the terminal to report information relating to a new candidate beam, the lower layer of the terminal reports index information and L1-RSRP measured values of RSs each having an L1-RSRP value larger than an RSRP threshold configured through higher layer signaling, among the RSs included in a candidate beam RS set. The higher layer of the terminal may obtain information relating to new beams having a good channel state through reporting.

When the higher layer of the terminal obtains information relating to new beams having a good channel state, the higher layer selects one of the new beams and notifies a physical layer of the selected one, and the terminal transmits a request signal for BFR to the base station. The process described above corresponds to the third process of the BFR procedure, and hereinafter, the third process will be described as a BFR request process. The higher layer of the terminal selects, in a candidate beam RS set, a new RS to be referenced by the terminal for a BFR request based on information relating a new beam, and notifies the physical layer of the selected new RS. The terminal may obtain configuration information relating to transmission of a physical random access channel (PRACH) through which a BFR request is to be transmitted, through new RS information for the BFR request and BFR request resource information configured through higher layer signaling. For example, the base station and the terminal may exchange higher layer signaling information described in Table 12 below to transfer configuration information relating to PRACH transmission through which a BFR request is to be transmitted.

TABLE 12

| BeamFailureRecoveryConfig information element |
| --- |
| -- ASN1START-TAG-BEAMFAILURERECOVERYCONFIG-START |
| BeamFailureRecoveryConfig ::=  SEQUENCE { |
|   rootSequenceIndex-BFR  INTEGER (0..137) |
|   OPTIONAL, -- Need M |
|   rach-ConfigBFR  RACH-ConfigGeneric |
|   OPTIONAL, -- Need M |
|   rsrp-ThresholdSSB  RSRP-Range |
|   OPTIONAL, -- Need M |
|   candidateBeamRSList  SEQUENCE |
| (SIZE(1..maxNrofCandidateBeams)) OF PRACH-ResourceDedicatedBFR  OPTIONAL, -- |
| Need M |
|   ssb-perRACH-Occasion  ENUMERATED {oneEighth, oneFourth, |
| oneHalf, one, two, |
|                four, eight, sixteen} |
|   OPTIONAL, -- Need M |
|   ra-ssb-OccasionMaskIndex  INTEGER (0..15) |
|   OPTIONAL, -- Need M |
|   recoverySearchSpaceId  SearchSpaceId |
|   OPTIONAL, -- Need R |
|   ra-Prioritization  RA-Prioritization |
|   OPTIONAL, -- Need R |
|   beamFailureRecoveryTimer  ENUMERATED {ms10, ms20, ms40, ms60, |
| ms80, ms100, ms150, ms200}  OPTIONAL, -- Need M |
|   ..., |
|   [[ |
|   msg1-SubcarrierSpacing-v1530  SubcarrierSpacing |
|   OPTIONAL  -- Need M |
|   ]] |
| } |
| PRACH-ResourceDedicatedBFR ::=  CHOICE { |
|   ssb  BFR-SSB-Resource, |
|   csi-RS  BFR-CSIRS-Resource |
| } |
| BFR-SSB-Resource ::=  SEQUENCE { |
|   ssb  SSB-Index, |
|   ra-PreambleIndex  INTEGER (0..63), |
|   ... |
| } |

TABLE 12-continued

| BeamFailureRecoveryConfig information element |
| --- |

```
BFR-CSIRS-Resource ::=                    SEQUENCE {
    csi-RS                                   NZP-CSI-RS-ResourceId,
    ra-OccasionList                          SEQUENCE (SIZE(1..maxRA-
OccasionsPerCSIRS)) OF INTEGER (0..maxRA-Occasions-1)    OPTIONAL,  -- Need R
    ra-PreambleIndex                                        INTEGER (0..63)
OPTIONAL, -- Need R
    ...
}
-- TAG-BEAMFAILURERECOVERYCONFIG-STOP
-- ASN1STOP
```

The higher layer signaling information BeamFailureRecoveryConfig includes information relating to PRACH transmission through which a BFR request is to be transmitted. Information included in BeamFailureRecoveryConfig may have the same meaning as the following, i.e., a BeamFailureRecoveryConfig may include the following information.

rootSequenceIndex-BFR: the root sequence index of a sequence used for PRACH transmission rach-ConfigBFR: this includes a PRACH configuration index, the number of frequency resources, a frequency resource starting point, a response monitoring window, and a parameter for adjustment of the strength of PRACH transmission, among parameters for PRACH transmission rsrp-ThresholdSSB: an RSRP threshold allowing a new beam to be selected among the RSs included in a candidate beam RS set candidateBeamRSList: a candidate beam RS set ssb-perRACH-Occasion: the number of SSBs connected to a random access channel (RACH) transmission occasion ra-ssb-OccasionMaskIndex: a PRACH mask index for random access resource selection of a terminal recoverySearchSpaceId: a search space index for receiving a PDCCH used for transmission of a random access response (RAR) signal by a base station in response to a BFR request ra-Prioritization: a parameter set used in a random access process having priority beamFailureRecoveryTimer: a timer for initializing a configuration relating to a PRACH resource on which a BFR request is to be transmitted msg1-SubcarrierSpacing-v1530: a subcarrier spacing for PRACH transmission through which a BFR request is to be transmitted The terminal may transmit a BFR request signal to the base station by referring to configuration information for relating to PRACH transmission through which a BFR request is to be transmitted.

The fourth process of the BFR procedure in the NR system is a process in which the base station having received a BFR request signal of the terminal transmits a response signal to the terminal. Hereinafter, the fourth process may be called a gNB response process. The above-described signaling information BeamFailureRecoveryConfig among configuration parameters for BFR includes a search space index for receiving a PDCCH used for transmitting a random access response signal by the base station in response to a BFR request. The base station may transmit a PDCCH by using resources in a search space configured for response. When the terminal receives a PDCCH through a search space for receiving the PDCCH, the terminal determines that the BFR procedure is complete. When the terminal receives a PDCCH through a search space for receiving the PDCCH, the base station may indicate, to the terminal, a new beam configuration for PDCCH or physical uplink control channel (PUCCH) transmission.

The disclosure provides a BFR method and process by a simplified procedure in an NR system considering network cooperative communication, and the method and process will be described hereinafter as a partial BFR. Partial BFR may be defined as performing BFR using only some of the existing BFR procedures of the NR system, or partially performing the existing BFR by simplifying some of the procedures, according to various embodiments of the disclosure as described hereinafter.

Currently, the NR system may include the maximum two RSs in the BFD RS set, and the terminal may receive a configuration of information relating to the RSs included in the BFD RS set via higher layer signaling, and in the case that the BFD RS set is not established via higher layer signaling, the terminal may include, in the BFD RS set, up to two of a part or all of RSs referenced in the activated TCI state of the CORESET(s) established for PDCCH monitoring. In this case, the base station may not have information about the BFD RS set determined by the terminal, and therefore may have a poor understanding of a BFR request signal of the terminal.

As another problem, while the BFD RS set may include up to two RSs, CORESETs configured for PDCCH monitoring of the terminal may be configured up to three CORESETs in the current NR system. In addition, in the Release 16 NR system, the maximum number of CORESETs per bandwidth part has been increased to five in a case of multiple PDCCH-based multi-TRP transmission, and in Release 16 NR-U, there has been discussion about increasing the maximum number of CORESETs per bandwidth part to support wideband operation. Therefore, in the case that a hypothetical PDCCH reception BLER is calculated for all RSs in the BFD RS (see Table 11 above) and all BLER values should exceed a threshold to report a beam failure indication to the higher layer as in the existing BFD operation, the latency to proceed to the rest of the BFR process may increase, and it is not possible to detect situations where only the BLER value for a specific RS in the BFD RS set exceeds the threshold. Therefore, in the case that the BFD RS set is not configured for the terminal through higher layer signaling, it may be possible to establish a beam failure indication using only a partial RS among the RSs in the BFD RS set, selected from among the RSs referenced by the activated TCI state of the CORESET(s) configured for PDCCH monitoring of the terminal, configure multiple BFD RS sets for the terminal via higher layer signaling, or indicate, by the base station, a method for voluntarily selecting multiple BFD RS sets, to the terminal, the base station can increase the efficiency of the BFD process to determine whether smooth downlink transmission between the base station and the terminal is possible, thereby enabling a low-latency BFR procedure to be performed.

Furthermore, in the current NR system, when the base station has configured a BFD RS set for the terminal via higher layer signaling to the terminal, the RS s within the configured BFD RS set cannot be changed. The terminal may detect beam failure, based on only an RS referenced in an activated TCI state of a CORESET(s) configured for PDCCH monitoring, among the RSs included in the BFD RS set. Therefore, according to the contents described above, in a case where a BFD RS set is configured through higher layer signaling, when there is an RS not corresponding to an RS referenced in an activated TCI state of a CORESET(s) configured for PDCCH monitoring of the terminal, among the RSs included in the BFD RS set configured through higher layer signaling, the terminal does not use the RS to detect beam failure. Therefore, when there occurs a mismatch between an RS referenced in an activated TCI state of a CORESET(s) configured for PDCCH monitoring of a terminal, and a BFD RS set configured through higher layer signaling, it is hard to expect stable detection of beam failure by the terminal, and this leads to deterioration of downlink reception performance. For example, a base station may configure a BFD RS set through RRC signaling for a terminal, but the base station activates the TCI state of a CORESET through MAC CE signaling. Therefore, a mismatch between the BFD RS set and an RS of the TCI state may occur due to the difference between latency times according to the signaling methods. In order to solve the problem described above, a method of selecting a part of RSs referenced in an activated TCI state of a CORESET(s) configured for PDCCH monitoring of the terminal is indicated to the terminal. Therefore, the base station may recognize information relating to a BFD RS set selected by the terminal. Through the solution, the base station can have an enhanced understanding of a BFR request signal of the terminal. Alternatively, the efficiency of a BFD process of identifying whether smooth downlink transmission is possible between a base station and the terminal is increased, so that the BFR procedure may be performed with low latency time. Alternatively, a suitable RS is indicated to be included in a BFD RS set, so that a BFD process of effectively determining beam failure between the base station and the terminal may be performed. The same issue can be applied to a set of candidate beam RSs used during a process of identifying new candidate beams.

In addition, since the BFR procedure of the current NR system is designed without considering the operation of multi-TRP/panel of the base station, the BFR procedure may be performed efficiently in the case that each link between the multi-TRP/panel of the base station and the terminal is used rather than following the existing BFR procedure when the multi-TRP/panel of the base station is operated. For example, in the case that a link between a terminal and a TRP or panel that is not experiencing a beam failure among the multi-TRP/panel connected to the terminal is used, the BFR for the link between a terminal and a TRP or panel that is experiencing a beam failure may be recovered within low latency time. The above simplified BFR procedure considering multiple links of the multi-TRP/panel is not limited to multi-TRP/panel, but is equally applicable in a single-TRP/panel situation where multiple BFD RS sets are defined and BFR is performed for each BFD RS set.

Hereinafter, an embodiment of the disclosure will be described in detail with reference to the accompanying drawings. In the following description of the disclosure, a detailed description of related functions or configurations incorporated herein will be omitted when it may make the subject matter of the disclosure rather unclear. The terms as described below are defined by considering the functions in the disclosure, and the meaning of the terms may vary according to the intention of a user or operator, convention, or the like. Therefore, the definitions of the terms should be made based on the contents throughout the specification.

Hereinafter, in the disclosure, the examples described above will be explained through multiple embodiments. However, the embodiments are not necessarily independent, and one or more embodiments may be applied simultaneously or in combination.

First Embodiment: Method for Configuring and Providing a BFD RS Set and a BFD RS Group for a Partial BFR In an embodiment of the disclosure, a terminal may receive a configuration of one or more BFD RS sets via higher layer signaling from a base station. The number of RSs within each BFD RS set may include up to two or more RSs. In addition, in order to enable a base station and a terminal to perform partial BFR, the RSs defined in the BFD RS set are grouped so that for each group, a physical layer of the terminal may transmit a beam failure indication to the higher layer when all the RS s in the BFD RS group experience a beam failure. In this case, the unit of grouped RSs may have one of various names such as, BFD RS group, BFD RS subset, BFD RS subgroup, BFD RS subset, BFD RS subgroup, etc., and will be referred to as BFD RS group hereinafter. Regardless of whether there is one or more BFD RS sets, there may be one or more BFD RS groups within each BFD RS set defined to perform a partial BFR. Each of the elements listed below, or a combination of them, may be used as a basis for grouping and prioritizing the RSs within each BFD RS set to configure each BFD RS group.

Operation method of RS on the time axis: There may be three types of RS: periodic, semi-periodic, and aperiodic. For example, a method in which RSs are placed (or included) in RS groups in the order of periodic→semi-periodic→aperiodic RSs, or a method in which periodic RSs are preferentially placed in each RS group (one in each RS group) and then semi-periodic RSs and aperiodic RSs are placed.

CORESET index value: Each RS may be placed in an RS group according to the magnitude of the index value of a CORESET configured with a TCI state used as a reference. For example, a method in which, for each RS group, an RS corresponding to the lowest CORESET index is placed first, or an RS corresponding to the highest CORESET index is placed first, may be used.

CORESETPoolIndex value: A CORESET may include an index, such as CORESETPoolIndex, that can be used to determine a TRP from which transmission occurs. A method, in which reference RSs of TCI states configured in CORESETs having the same index are grouped together by referring to the corresponding index, may be used.

QCL Type: a method in which RSs configured as a specific QCL-Type (e.g., QCL-TypeD) in the TCI state of a CORESET are placed in groups each including one RS, or RSs configured as a specific QCL-Type (e.g., QCL-TypeD) are configured in one group may be used.

The above method of configuring and providing a BFD RS set may also be applied when the terminal does not receive a BFD RS set from the base station via higher layer signaling, when the terminal voluntarily configures a BFD RS set, or when the base station indicates a method for configuring a BFD RS set to the terminal.

Figure 10:
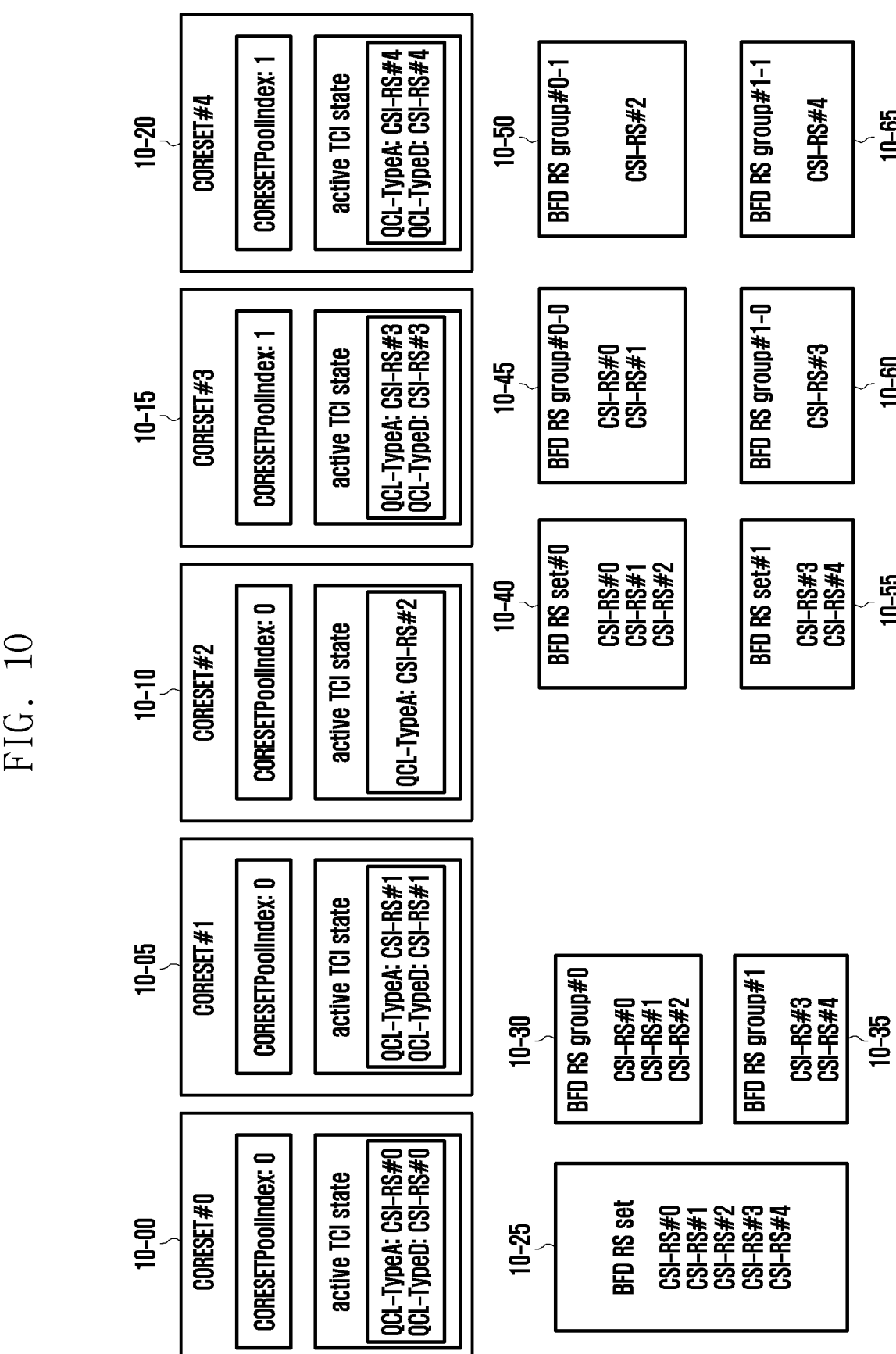
FIG. 10 illustrates an example of a beam failure detection (BFD) reference signal (RS) set configuration and a BFD RS group configuration for performing partial BFR according to an embodiment of the disclosure.

FIG. 10 illustrates an example of a BFD RS set configuration and a BFD RS group configuration for performing partial BFR according to an embodiment of the disclosure.

In FIG. 10, for example, it is assumed that five CORE-SETs are configured between a base station and a terminal with respect to a specific bandwidth part, and that the activated TCI state, reference RS, and QCL Type for each CORESET are shown as indicated by reference numerals 10-00, 10-05, 10-10, 10-15, and 10-20, respectively. However, this is an example for illustrative purposes only and the disclosure is not limited thereto.

When the base station configures one BFD RS set 10-25 {CSI-RS #0, CSI-RS #1, CSI-RS #2, CSI-RS #3, CSI-RS #4} for the terminal, two BFD RS groups in the BFD RS set may be configured as a BFD RS group #0 10-30 {CSI-RS #0, CSI-RS #1, CSI-RS #2} and BFD RS Group #1 10-35 {CSI-RS #3, CSI-RS #4}, respectively, as shown in FIG. 10, and the BFD RS set is determined based on the same CORESETPoolIndex value. In other words, RSs belonging to a CORESET having the same CORESETPoolIndex among RSs belonging in the BFD RS set may belong to the same BFD RS group. In another example, with respect to a case in which a base station configures two BFD RS sets for a terminal, that is, BFD RS set #0 10-40 {CSI-RS #0, CSI-RS #1, CSI-RS #2} and BFD RS set #1 10-55 {CSI-RS #3, CSI-RS #4}, BFD RS Set #0 may be grouped into BFD RS Group #0-0 10-45 {CSI-RS #0, CSI-RS #1} and BFD RS Group #0-1 10-50 {CSI-RS #2}, and BFD RS Set #1 may be grouped into BFD RS Group #1-0 10-60 {CSI-RS #3} and BFD RS Group #1-1 10-65 {CSI-RS #4}. In this case, the criterion for dividing BFD RS group #0-0 and BFD RS group #0-1 may be QCL-Type. In FIG. 10, RSs configured as QCL-TypeD are preferentially grouped. Therefore, CSI-RS #0 configured as a reference RS of QCL-TypeA, QCL-TypeD in CORESET #0 10-00 and CSI-RS #1 configured as a reference RS of QCL-TypeA, QCL-TypeD in CORESET #1 10-05 are preferentially grouped into BFD RS group #0-0, and the remaining CSI-RS #2 may be grouped into BFD RS group #0-1. Further, the criterion for dividing BFD RS group #1-0 and BFD RS group #1-1 may be a CORESET index value. For example, CSI-RS #3 configured as the QCL reference RS of CORESET #3, which has the lower index value among CORESET #3 and CORESET #4 configured as an activated TCI state for the RSs in BFD RS set #1, may be preferentially configured as BFD RS group #1-0, and CSI-RS #4 configured as the QCL reference RS of CORESET #4, which has the next lower index value, may be configured in BFD RS group #1-1. In addition to the example illustrated in FIG. 10, any of the criteria listed above or a combination of the criteria listed above may be used by the base station to configure information about the BFD RS set or BFD RS group for the terminal via higher layer signaling, or by the terminal to configure the BFD RS set or BFD RS group when there is no configuration information from the base station about the BFD RS set or BFD RS group.

Second Embodiment: a Configuration and a Method for BFD Process According to Partial BFR In an embodiment of the disclosure, a terminal may be configured with a BFD RS set and a BFD RS group from a base station via higher layer signaling, and may be configured with information required for the BFD process according to information of the BFD RS set and the BFD RS group. The pieces of information required in the BFD process may include information such as beamFailureInstanceMaxCount, which refers to the maximum indication value of the beam failure indication, and beamFailureDetectionTimer, which refers to the value at which the beam failure detection timer is reset. For example, as shown in reference numerals 10-25 to 10-35 of FIG. 10, if the terminal is configured with one BFD RS set and two BFD RS groups, information such as beamFailureInstanceMaxCount and beamFailureDetection-Timer required for the BFD process may be configured for each BFD RS group. In another example, as shown in reference numerals 10-40 to 10-65 of FIG. 10, if the terminal is configured with two BFD RS sets and two BFD RS groups for each BFD RS set, information such as beamFailureIn-stanceMaxCount and beamFailureDetectionTimer required in the BFD process may be configured for each BFD RS group for each BFD RS set, or the same information such as beamFailureInstanceMaxCount and beamFailureDetection-Timer may be configured for all BFD RS groups within each BFD RS set. In another example, in the case that the terminal configures a BFD RS set and a BFD RS group without receiving the configuration of the BFD RS set and the BFD RS group from the base station via higher layer signaling, the base station may configure the information required in the BFD process for each BFD RS set and each BFD RS group via higher layer signaling.

Figure 11:
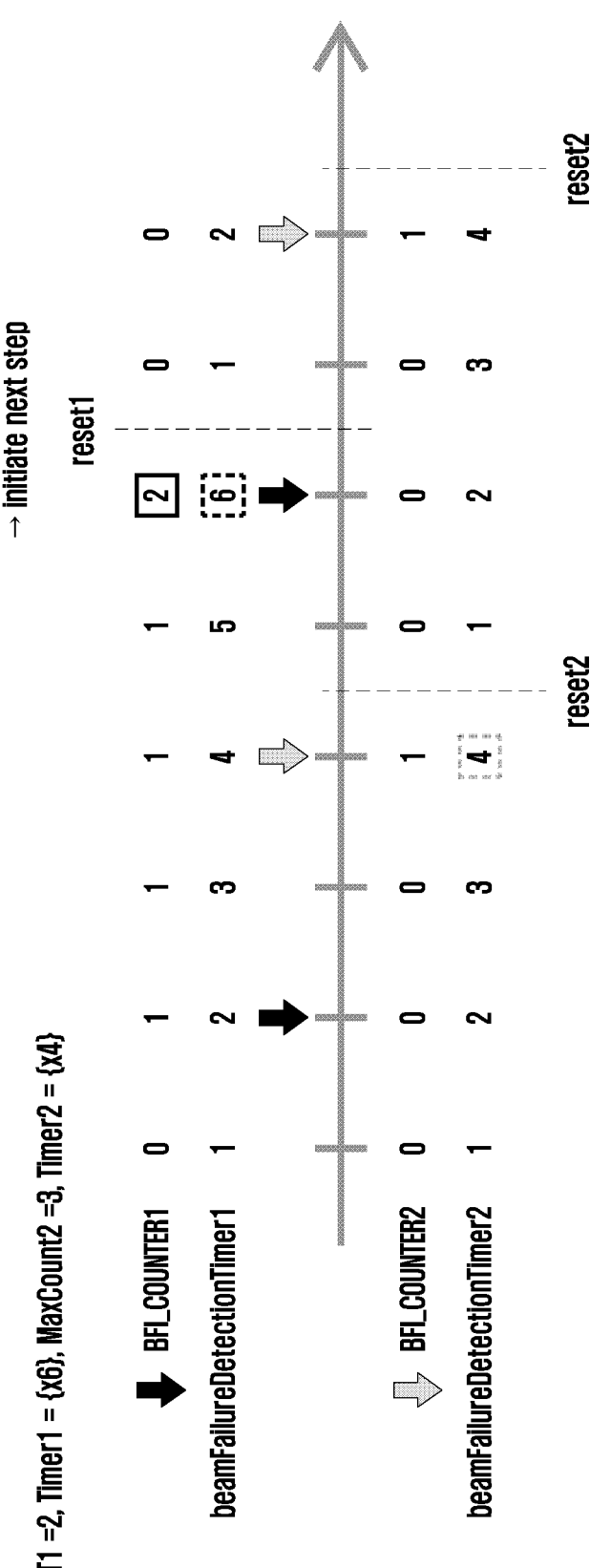
FIG. 11 illustrates an example in which multiple pieces of information required in a BFD process, such as beamFailureInstanceMaxCount and beamFailureDetectionTimer, are configured according to an embodiment of the disclosure.

FIG. 11 illustrates an example in which multiple pieces of information required in a BFD process, such as beamFail-ureInstanceMaxCount and beamFailureDetectionTimer, are configured according to an embodiment of the disclosure.

In FIG. 11, MaxCount1 and MaxCount2 are assumed to be individual beamFailureInstanceMaxCount and have values of 2 and 3, respectively. In addition, Timer1 and Timer2 are assumed to be individual beamFailureDetectionTimer and have values of 6 and 4, respectively. Each configuration information in FIG. 11 may be applied when two BFD RS groups exist within a single BFD RS set, when two BFD RS sets have no BFD RS groups, or when each of two BFD RS sets includes two BFD RS groups or more and information required in the BFD process such as beamFailureIn-stanceMaxCount and beamFailureDetectionTimer are configured for each BFD RS set.

In FIG. 11, the value of beamFailureDetectionTimer1 is incremented by one for every beam failure indication cycle and is reset when the value reaches 6, and the value of beamFailureDetectionTimer2 is incremented by one for every beam failure indication cycle and is reset when the value reaches 4. BFI_COUNTER1 is a counter that is incremented when a beam failure indication occurs in a BFD process with MaxCount1 and beamFailureDetectionTimer1 configured, and in the BFD process, depending on a group or set to which the BFD process is applied as described above, a case in which a beam failure occurs for all BFD RSs in the group or set is considered as a beam failure indication. BFI_COUNTER2 is a counter that is incremented when a beam failure indication occurs in a BFD process with MaxCount2 and beamFailureDetectionTimer2 configured, and the same description of BFI_COUNTER1 may be applied to the BFD process of BFI_COUNTER2. BFI_COUNTER1 and BFI_COUNTER2 are reset when beamFailureDetectionTimer1 and beamFailureDetection-Timer2 reach their maximum values, respectively. In FIG. 11, a beam failure indication corresponding to BFI_COUNTER1 occurs when beamFailureDetection-Timer1 is 2 and 6, and BFI_COUNTER1 is incremented by one for each beam failure indication. At this time, Max- Count1 has a value of 2, and thus when BFI_COUNTER1 reaches MaxCount, it will proceed to the next stage of the BFR, as shown in FIG. 11. In addition, the beam failure indication corresponding to BFI_COUNTER2 occurs when the value of beamFailureDetectionTimer2 is 4. It may be seen that BFI_COUNTER2 is incremented by one when this beam failure indication occurs. However, since the value of BFI_COUNTER2 has not reached MaxCount2 until the value of beamFailureDetectionTimer2 reaches 4, beamFailureDetectionTimer2 is reset to 1 after being reached the value of 4, and at this time, BFI_COUNTER2 is also reset to 0. Then, when the value of beamFailureDetectionTimer2 is 4, a beam failure indication occurs and BFI_COUNTER2 is incremented by one, but the value of beamFailureDetectionTimer2 has already reached 4 and thus in the next cycle, beamFailureDetectionTimer2 is reset to 1 again and BFI_COUNTER2 is also reset to 0. On the other hand, the above-mentioned examples are provided for convenience in describing an embodiment of the disclosure, and the disclosure is not limited thereto.

Third Embodiment: a Configuration and a Method for a New Candidate Beam Indication Process According to Partial BFR In an embodiment of the disclosure, a terminal may perform a process of replacing a beam with a new beam to overcome a beam failure that occurs during a BFR process. A method of indicating a new beam candidate determined in this process may be defined as a new candidate beam indication. The terminal may receive one or more candidateBeamRSLists from a base station via higher layer signaling. The one or more candidateBeamRSLists may correspond to the BFD RS set or multiple BFD RS groups in the BFD RS set, respectively, described in the first embodiment above, and may be defined as a list of new beam candidates that should be replaced due to a beam failure. In order to derive new beam candidates for each BFD RS set or BFD RS group connected to the configured one or more candidateBeamRSLists, the terminal measures the L1-RSRP of the new beam candidates in the candidateBeamRSLists and compare the measured L1-RSRP with a reference value. In this case, the reference value may be configured separately for one or multiple candidateBeamRSLists or the same value may be configured therefor. The higher layer of the terminal selects one of the new beam candidates having an L1-RSRP higher than a reference value (threshold) and transfers the selected new beam candidate to the physical layer of the terminal, and the physical layer of the terminal transfers the information about the new beam candidate to the base station through an uplink physical channel connected to the received new beam candidate.

For example, the candidateBeamRSList may include multiple new beam candidates, each new beam candidate having an SSB index or a CSI-RS resource index, and the uplink physical channel connected to the new beam candidate may include one of a PRACH, a sounding reference signal (SRS), and a PUCCH resource. One new beam candidate may be connected to (or associated with) one uplink physical channel. In another example, a candidateBeamRSList may include multiple uplink physical channels, and each uplink physical channel may be associated with an SSB index or a CSI-RS resource index indicative of a new beam candidate. In this case, the candidateBeamRSList may include only one type of uplink physical channel among PRACH, SRS, and PUCCH, or it may include two or more types of uplink physical channels. Similarly in this case, one uplink physical channel may be associated with one new beam candidate.

FIG. 12 illustrates multiple candidateBeamRSLists each defined (or configured) according to an embodiment of the disclosure.

FIG. 12 illustrates three candidateBeamRSLists 12-05, 12-15, and 12-35 each defined (or configured) according to an embodiment of the disclosure. CandidateBeamRSList#1 12-05 may include multiple PRACH resources 12-10, each of which may have an associated new beam candidate. In this case, only one type of PRACH resource is used for the uplink physical channel used by the terminal when the new beam candidate is determined. CandidateBeamRSList#2 12-15 may include multiple physical channel resources, for example, PRACH resource(s) 12-30, SRS resource(s) 12-25, and PUCCH resource(s) 12-20, and each PRACH, SRS, and PUCCH resource may have an associated new beam candidate. In this case, there are three types of uplink physical channels, such as PRACH, SRS, and PUCCH resource, used by the terminal when a new beam candidate is determined. CandidateBeamRSList#3 12-35 may include multiple new beam candidates 12-40, and each new beam candidate may include information as shown in reference numeral 12-45. For example, a specific new beam candidate may have an SSB index and an SRS resource as an associated uplink physical channel. CandidateBeamRSList#1, #2, and #3 may be associated with BFD RS groups #1, #2, and #3, respectively, and when a beam failure occurs in a specific BFD RS group, a new beam candidate may be determined from the associated candidateBeamRSList and used in a subsequent BFR process.

Fourth Embodiment: a Configuration and a Method for a BFRQ and a Base Station Response Process According to Partial BFR In an embodiment of the disclosure, according to the first to third embodiments described above, a terminal may perform a BFR process for multiple BFD RS sets or groups, and then, in the case that a beam failure indication has reached the maximum value with respect to one of the multiple BFD RS sets or groups as described above, the terminal may notify a base station of a beam failure situation and transfer a determined new beam candidate to the base station so as to perform a beam failure recovery request (BFRQ) process for requesting a beam failure recovery. The terminal may determine a new beam candidate in a candidateBeamRSList associated with a BFD RS set or group that has reached the maximum value of the beam failure indication, and perform the BFRQ by using an uplink physical channel associated with the determined new beam candidate. Here, the subsequent base station response process may differ according to an uplink physical channel used by a terminal.

Figure 13:
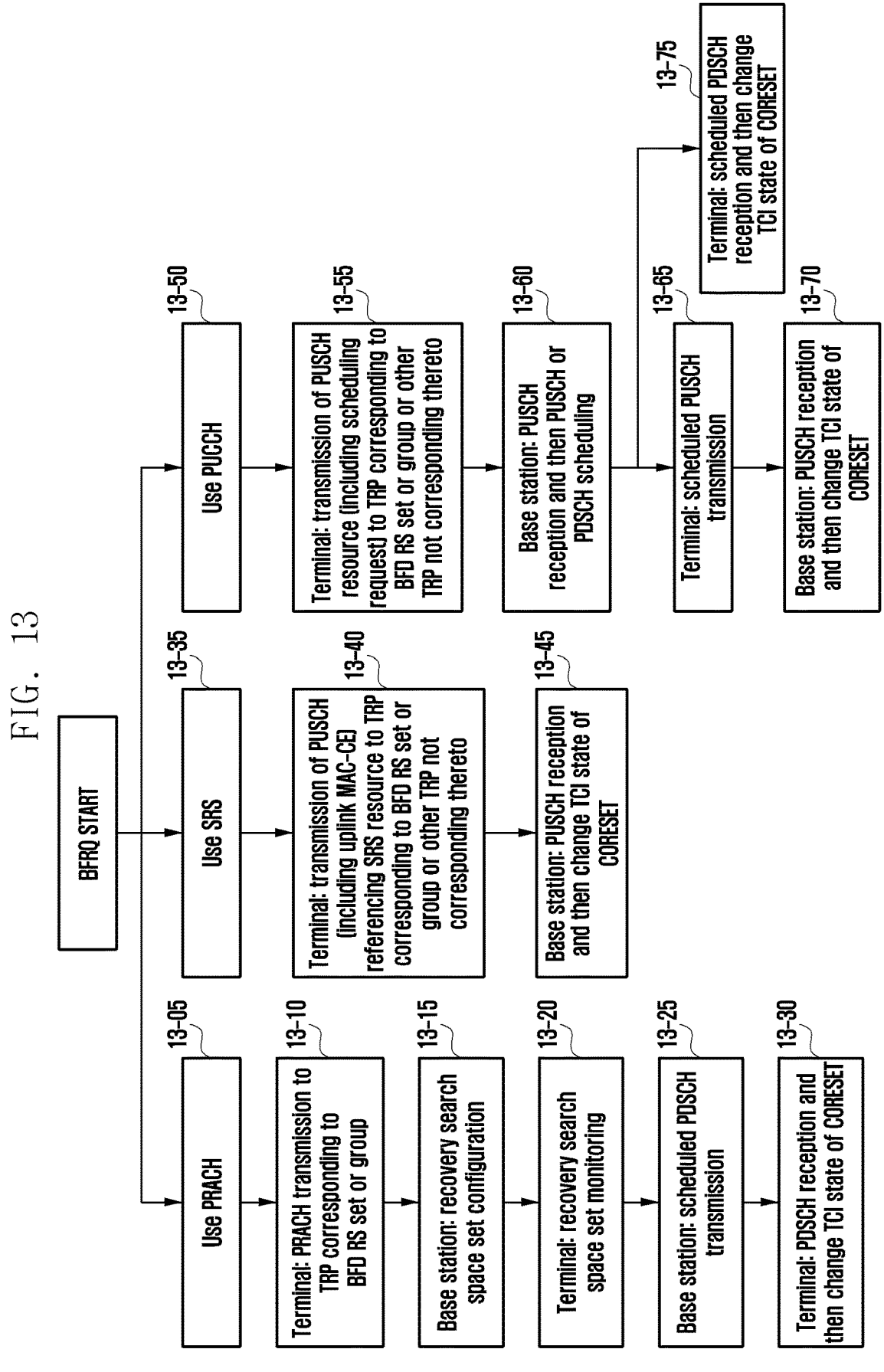
FIG. 13 is a sequence diagram illustrating a configuration and a method for a beam failure recovery request (BFRQ) of a terminal and a base station response process according to an embodiment of the disclosure.

FIG. 13 illustrates a configuration and a method for BFRQ of a terminal and a base station response process according to an embodiment of the disclosure.

For example, if an uplink physical channel associated with a determined new beam candidate is a PRACH (indicated by reference numeral 13-05) and the new beam candidate includes an SSB index, the terminal performs PRACH transmission on a RACH occasion associated with the SSB by using a preamble index configured in the PRACH transmission. If the uplink physical channel associated with the determined new beam candidate is a PRACH and the new beam candidate includes a CSI-RS resource index, the terminal performs PRACH transmission in the corresponding RACH occasion by using RACH occasion information and the preamble index configured in the PRACH transmission. In the case that a BFD RS set or group corresponds to each TRP, i.e., in the case that the BFD RS set or group is determined based on the CORESETPoolIndex, the terminal transmits the PRACH to a TRP corresponding to the CORESETPoolIndex of the BFD RS set or group (indicated by reference numeral 13-10). That is, the terminal transmits the PRACH to a TRP in which a beam failure has occurred. On the other hand, as described above, in the case that the candidateBeamRSList to which the new beam candidate belongs corresponds to (or is associated with) a specific BFD RS set or BFD RS group, and that the corresponding BFD RS set or BFD RS group corresponds to, for example, a CORESETPoolIndex value of 0, the new beam candidate may also correspond to a CORESETPoolIndex value of 0. Therefore, transmitting a PRACH to a TRP in which a beam failure has occurred may be understood as, for example, in the case that a CORESETPoolIndex value corresponding to the BFD RS set or BFD RS group in which a beam failure has occurred is zero, transmitting a PRACH associated with a new beam candidate that corresponds to the CORESETPoolIndex value of 0. In this case, the transmitted PRACH may also correspond to a CORESETPoolIndex value of 0. After transmitting the PRACH, the base station establishes a recovery search space set (indicated by reference numeral 13-15), and the terminal monitors PDCCHs in the recovery search space set (indicated by reference numeral 13-20) to receive scheduling of a PDSCH including a MAC-CE that changes the TCI state of a CORESET in which a beam failure has occurred (indicated by reference numeral 13-25). In reception of the corresponding PDCCH or PDSCH, the terminal may assume that the PDCCH and PDSCH are QCLed with the determined new beam candidate. The terminal receives the PDSCH and changes (updates) the TCI state of the CORESET by using a TCI state activation MAC-CE in the PDSCH (indicated by reference numeral 13-30).

In another example, in the case that the uplink physical channel associated with the determined new beam candidate is an SRS (indicated by reference numeral 13-35), the terminal may perform a BFRQ via a PUSCH transmission referencing the corresponding SRS resource. In this case, the terminal may include, in the PUSCH transmission, the information of the new beam candidate and the BFD RS set and group, and may transmit a MAC-CE activation signal indicating whether to change a reference RS of a TCI state of a CORESET. Further, in the case that a BFD RS set or group corresponds to each TRP, i.e., when the BFD RS set or group has been determined based on the CORESETPoolIndex, the terminal may transmit a scheduled PUSCH to the remaining TRPs except for a TRP corresponding to the CORESETPoolIndex of the BFD RS set or group (indicated by reference numeral 13-40). That is, the terminal may transmit a scheduled PUSCH to other TRPs (e.g., TRPs in which no beam failure occurs) except for the TRP in which the beam failure has occurred. On the other hand, as described above, in the case that the candidateBeamRSList to which the new beam candidate belongs corresponds to (or is associated with) a specific BFD RS set or BFD RS group, and that the BFD RS set or BFD RS group corresponds to, for example, a CORESETPoolIndex value of 0, the new beam candidate may also correspond to a CORESETPoolIndex value of 0. Therefore, transmitting a PUSCH scheduled for a TRP other than the TRP in which the beam failure has occurred may be understood as, for example, in the case that the CORESETPoolIndex value corresponding to the BFD RS set or BFD RS group in which the beam failure has occurred is zero, transmitting a PUSCH associated with a new beam candidate corresponding to a CORESETPoolIndex value of 1. In this case, the PUSCH being transmitted may also correspond to a CORESETPoolIndex value of 1. Accordingly, a BFR between the TRP in which the beam failure has occurred and the terminal may be performed through the TRP in which no beam failure occurs. On the other hand, the terminal may also transmit a scheduled PUSCH to the TRP corresponding to the CORESETPoolIndex of the BFD RS set or group (indicated by reference numeral 13-40). That is, the terminal may transmit a scheduled PUSCH to the TRP in which the beam failure has occurred. On the other hand, as described above, in the case that the candidateBeamRSList to which the new beam candidate belongs corresponds to (or is associated with) a specific BFD RS set or BFD RS group, and that the BFD RS set or BFD RS group corresponds to, for example, a CORESETPoolIndex value of 0, the new beam candidate may also correspond to a CORESETPoolIndex value of 0. Therefore, transmitting the scheduled PUSCH to the TRP in which the beam failure has occurred may also be understood, for example, in the case that the BFD RS set or BFD RS group in which the beam failure has occurred corresponds to a CORESETPoolIndex value of 0, transmitting a PUSCH associated with a new beam candidate that corresponds to a CORESETPoolIndex value of 0. In this case, the PUSCH being transmitted may also correspond to a CORESETPoolIndex value of 0.

After receiving the PUSCH transmission from the terminal, the base station may change, based on pieces of information included in the PUSCH, the RS of the TCI state of the CORESET to be changed, by using a new beam candidate (indicated by reference numeral 13-45).

In another example, if the uplink physical channel associated with the determined new beam candidate is a PUCCH (indicated by reference numeral 13-50), the terminal may perform a BFRQ through a PUCCH transmission using the corresponding PUCCH resource. The terminal may include information on a scheduling request in the PUCCH transmission, and the scheduling request may be a request for scheduling the PUSCH or PDSCH transmission (indicated by reference numeral 13-55). In this case, a PUCCH format used by the terminal for the PUCCH transmission may be PUCCH format 0 or 1. Further, the above scheduling request may be configured separately for BFR purposes, and the scheduling request configuration for such BFR purposes may have a higher priority than the scheduling request configuration for non-BFR purposes. Further, in the case that a BFD RS set or group corresponds to each TRP, that is, in the case that the BFD RS set or group has been determined based on the CORESETPoolIndex, the terminal may transmit a scheduled PUCCH to the remaining TRPs except for the TRP corresponding to the CORESETPoolIndex of the BFD RS set or group. That is, the terminal may transmit the scheduled PUCCH to other TRPs (e.g., TRPs in which no beam failure occurs) except for the TRP in which the beam failure has occurred. On the other hand, as described above, in the case that the candidateBeamRSList to which the new beam candidate belongs corresponds to (or is associated with) a specific BFD RS set or BFD RS group, and that BFD RS set or BFD RS group corresponds to, for example, a CORESETPoolIndex value of 0, the new beam candidate may also correspond to a CORESETPoolIndex value of 0. Therefore, transmitting a scheduled PUCCH to a TRP other than the TRP in which the beam failure has occurred may be understood as, for example, in the case that the CORESET- PoolIndex value associated with the BFD RS set or BFD RS group in which the beam failure has occurred is zero, transmitting a PUCCH associated with a new beam candidate that corresponds to a CORESETPoolIndex value of 1. In this case, the PUCCH being transmitted may also correspond to a CORESETPoolIndex value of 1. Accordingly, the BFR between the TRP in which the beam failure has occurred and the terminal may be performed through the TRP in which no beam failure occurs. In addition, the terminal may perform PUCCH transmission to the TRP corresponding to the CORESETPoolIndex of the BFD RS set or group. That is, the terminal may transmit the scheduled PUCCH to the TRP in which the beam failure has occurred. On the other hand, as described above, in the case that the candidateBeamRSList to which the new beam candidate belongs corresponds to (or is associated with) a specific BFD RS set or BFD RS group, and that the BFD RS set or BFD RS group corresponds to, for example, a CORESETPoolIndex value of 0, the new beam candidate may also correspond to a CORESETPoolIndex value of 0. Therefore, transmitting a scheduled PUCCH to the TRP in which the beam failure has occurred may be understood as, for example, in the case that the BFD RS set or BFD RS group in which the beam failure has occurred corresponds to a CORESETPoolIndex value of 0, transmitting a PUCCH associated with a new beam candidate corresponding to a CORESETPoolIndex value of 0. In this case, the PUCCH being transmitted may also correspond to CORESETPoolIndex value 0.

After the base station receives the PUCCH transmission of the terminal, when the PUCCH transmission includes a PUSCH scheduling request (indicated by reference numeral 13-60), the base station transmits the corresponding DCI to schedule a PUSCH including a MAC-CE that activates the change of the TCI state of the CORESET (indicated by reference numeral 13-65), so as to allow the terminal to change the RS of the TCI state of the CORESET to be changed, by using a new candidate beam (indicated by reference numeral 13-70). Alternatively, after the base station receives the PUCCH transmission of the terminal, when the PUCCH transmission includes a PDSCH scheduling request (indicated by reference numeral 13-60), the base station transmits the corresponding DCI to schedule a PDSCH including a MAC-CE that activates the change of the TCI state of the CORESET so as to allow the terminal to change the RS of the TCI state of the CORESET to be changed, by using the new candidate beam (indicated by reference numeral 13-75).

On the other hand, the terminal may include a MAC-CE for partial BFR use in the PUSCH. The MAC-CE may include, for example, at least one of the following pieces of information.

Index(es) of TRPs each having a radio link quality lower than a given threshold for RSs within a BFD RS group or a BFD RS set corresponding to each TRP (or RSs in a BFD RS group or BFD RS set corresponding to each CORESETPoolIndex): for example, the index(es) of the BFD RS set, or the CORESETPoolIndex(es).

Whether or not a new beam candidate corresponding to the TRP index(es) (or CORESETPoolIndex) exists.

When a new beam candidate corresponding to the TRP (or CORESETPoolIndex) exists, the index(es) of the new beam candidate.

The terminal may receive, from the base station, DCI using the same hybrid automatic repeat request (HARM) process ID as that of DCI by which PUSCH transmission including the MAC-CE has been scheduled so as to receive scheduling of a new PUSCH transmission, and the terminal may perform an operation of receiving a CORESET by referring to the TRP index(es) in the MAC-CE (or the index(es) of the BFD RS set, CORESETPoolIndex(es)), after X symbols (e.g., X is a value related to a downlink reception beam change of the terminal, and may have a value of one of 7, 14, and 28). For example, in the case that a TRP index with a CORESETPoolIndex value of 0 is included in a MAC-CE, it may be assumed that all CORESETs with CORESETPoolIndex configured to have a value of 0 and a new beam candidate included in the MAC-CE are in a QCL relationship with each other, and the terminal may perform an operation of receiving the CORESET accordingly. In another example, in the case that a TRP index with a CORESETPoolIndex value of 1 is included in the MAC-CE, all CORESETs with CORESETPoolIndex configured to have a value of 1 and a new beam candidate included in the MAC-CE may be assumed to be in a QCL relationship with each other, and the terminal may perform an operation of receiving the CORESET accordingly.

Fifth Embodiment: Method for Changing a BFD RS Set/Group or Candidate Beam Set Configuration In an embodiment of the disclosure, a base station and a terminal may change the BFD RS set/group or candidate beam set configuration according to the first to third embodiments described above. For example, the base station and the terminal may transmit or receive signaling to each other about an addition/change/deletion of a BFD RS in the BFD RS set or group, or an addition/change/deletion of an associated uplink physical channel or a new candidate beam in a candidate beam set. For example, in the case that the base station configures a BFD RS set or group for the terminal via higher layer signaling, the terminal may request the base station to change the corresponding BFD RS in the case that the number of times that a specific BFD RS in the configured BFD RS set or group exceeds a reference value with respect to a hypothetical PDCCH reception BLER calculation is larger than a specific number of times. In this case, the method used by the terminal to request the base station to change may use an explicit method such as PUSCH-based MAC-CE activation or a PUCCH-based scheduling request method. According to the PUCCH-based scheduling request method, the terminal may request PDSCH scheduling from the base station, and thus the terminal may perform activation of a new BFD RS by receiving a downlink MAC-CE from the base station, or the terminal may request PUSCH scheduling from the base station, and transmit a PUSCH including a MAC-CE indicating activation of the new BFD RS. PUSCH-based MAC-CE activation relates to a method in which the terminal includes information about a BFD RS to be changed in an uplink MAC-CE and then includes the uplink MAC-CE in a PUSCH payload to transmit the same to the base station. When performing the PUCCH-based scheduling request method or the PUSCH-based MAC-CE activation, the information about the BFD RS to be added/changed/deleted and the information about the BFD RS group or set including the BFD RS to be added/changed/deleted may be included at least in the transmission from the terminal to the base station. In another example, when the base station changes the TCI state of the CORESET with respect to a case in which the base station establishes a BFD RS set or group for the terminal via higher layer signaling and a case in which the base station does not establish the same, if the RSs in the TCI state before the change are included in the BFD RS set or group, RSs in the changed TCI state may be added to the BFD RS set or group and RSs in the TCI state before the change may be deleted from the BFD RS set or group. At this time, an RS configured as QCL-TypeD among RSs in the changed TCI state may be preferentially configured. Similar to the addition/change/deletion of BFD RSs within a BFD RS set or group, the same approach may be applied to the addition/change/deletion of new candidate beams or associated uplink physical channels in a candidate beam set.

Figure 14:
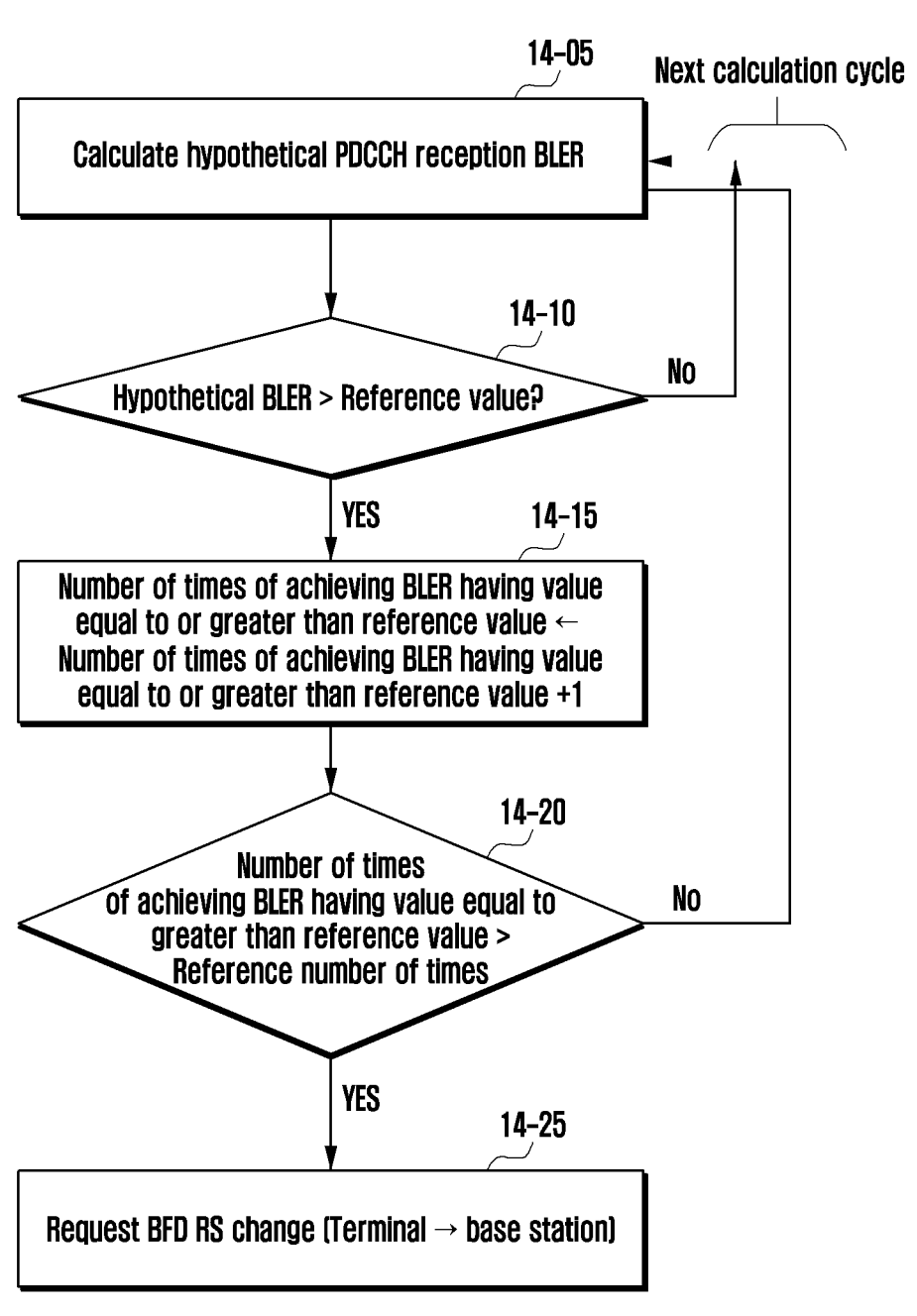
FIG. 14 is a sequence diagram illustrating a BFD RS change procedure according to an embodiment of the disclosure.

FIG. 14 illustrates a procedure for changing a BFD RS according to an embodiment of the disclosure.

The terminal calculates a hypothetical PDCCH reception BLER with respect to a specific BFD RS in a BFD RS set or group (indicated by reference numeral 14-05), compares the calculated hypothetical BLER value with a reference BLER value (indicated by reference numeral 14-10), and in the case that the hypothetical BLER value is not greater than the reference BLER value, calculates the hypothetical PDCCH reception BLER again in the next hypothetical BLER calculation cycle. If the hypothetical BLER is greater than the reference BLER value, the terminal increments, by one, the number of times of achieving the BLER having a value equal to or greater than the reference value (indicated by reference numeral 14-15). If the number of times of achieving the BLER having a value equal to or greater than the reference value is compared to the reference number of times (indicated by reference numeral 14-20), and the number of times of achieving the BLER is not greater than the reference number of times, the terminal calculates the hypothetical PDCCH reception BLER again in the next hypothetical BLER calculation cycle. If the number of times of achieving the BLER has a value greater than the reference number of times, the terminal may request the base station to perform a change to the corresponding BFD RS (indicated by reference numeral 14-25). The method requested by the terminal may use an explicit method such as PUSCH-based MAC-CE activation or PUCCH-based scheduling request method as described above.

Sixth Embodiment: Partial BFR Operation for Each TRP Group

In an embodiment of the disclosure, with respect to the partial BFR operation described according to the first to fifth embodiments above, the terminal may perform a partial BFR for each TRP group obtained by bounding several TRPs rather than performing a partial BFR for each TRP. Here, a TRP group is defined as BFD RS s corresponding to multiple TRPs belonging to a single BFD RS set, or to a BFD RS group defined within a BFD RS set.

For example, it may be assumed that a single BFD RS set includes BFD RS #1 and BFD RS #2, and here, BFD RS #1 corresponds to TRP #1 and BFD RS #2 corresponds to TRP #2. The correspondence between a BFD RS and a TRP may correspond to a case in which the BFD RS exists as a reference RS for the TCI state of a CORESET transmitted by a specific TRP, and in this case, the CORESET may be configured with a specific CORESETPoolIndex value. The correspondence between a BFD RS and a TRP may correspond to a case such that when the QCL assumption of a specific CORESET has multiple TCI states, the BFD RS exists as a reference RS with respect to one of the multiple TCI states. For example, the terminal may be configured with BFD RS set 1 including reference RSs of TCI states of CORESETs with CORESETPoolIndex values of 0 and 1 via higher layer signaling, and BFD RS set 2 including reference RSs of TCI states of CORESETs with CORESETPoolIndex values of 2 and 3 via higher layer signaling. Alternatively, when a BFD RS set is not configured via higher layer signaling, the terminal may configure a BFD RS set in a random manner.

In this case, the terminal may perform partial BFR operation for each of BFD RS sets 1 and 2. The terminal may calculate hypothetical PDCCH BLERs for all BFD RSs existing in BFD RS set 1, and in the case that all the hypothetical PDCCH BLER values are smaller than a reference value, the terminal may indicate BFD on a physical layer of the terminal via higher layer. The BFD process for partial BFR operation for each TRP group may be performed similarly to the second embodiment above.

Similar to the third embodiment above, the terminal may perform a process of replacing a beam by a new beam in order to overcome the beam failure for the partial BFR operation for each TRP group. The method of indicating a new beam candidate determined in this process may be defined as a new candidate beam indication. The terminal may receive a configuration of one or more candidateBeamRSLists from the base station via higher layer signaling. The one or more candidateBeamRSLists correspond to the above BFD RS set or the multiple groups of BFD RSs in the BFD RS set, respectively, and are defined as a list of new beam candidates that should be replaced due to the beam failure. Similar to the above BFD RS set or group for partial BFR operation for each TRP group, each candidateBeamRSList may include new beam candidates corresponding to the TRPs associated with the BFD RSs included in the corresponding BFD RS set or BFD RS group.

For example, in the above example, when the terminal has received configuration of BFD RS set 1 including reference RSs of TCI states of CORESETs with CORESETPoolIndex values of 0 and 1 and BFD RS set 2 including reference RSs of TCI states of CORESETs with CORESETPoolIndex values of 2 and 3 from the base station via higher layer signaling, or in the absence of such configuration, the terminal has configured a BFD RS set in a random manner, candidateBeamRSList#1 corresponding to BFD RS set 1 may include new beam candidates associated with TRPs for transmitting a CORESET with CORESEToolIndex values of 0 and 1, respectively, and candidateBeamRSList#2 corresponding to BFD RS set 2 may include new beam candidates associated with TRPs for transmitting a CORESET with CORESEToolIndex values of 2 and 3, respectively.

The terminal measures L1-RSRP of new beam candidates in the candidateBeamRSList and compares the measured L1-RSRP with the reference value, and the higher layer of the terminal selects some of the new beam candidates that have L1-RSRP greater than the reference value and transfers the selected new beam candidate to the physical layer of the terminal. The higher layer of the terminal may select one of the new beam candidates in order to change the beam for one TRP among all TRPs associated with the new beam candidates in the candidateBeamRSList, or may select at least one new beam candidate for all TRPs associated with the new beam candidates that have L1-RSRP greater than the reference value in order to change the beam for all TRPs associated with the new beam candidates in the candidateBeamRSList. For example, in the case that there are four new beam candidates in the candidateBeamRSList, new beam candidates #1 and #2 correspond to TRP #1, new beam candidates #3 and #4 correspond to TRP #2, and new beam candidates #1, #3, and #4 have L1-RSRP greater than a reference value, the terminal may randomly select only new beam candidate#1 among three new beam candidates, or may select new beam candidates#1 and #3 in order to select at least one new beam candidate corresponding to TRP#1 and TRP #2, respectively. The new beam candidates selected by the higher layer of the terminal are transferred to the physical layer, and the terminal transfers information about the new beam candidates to the base station through an uplink physical channel connected to the transferred new beam candidates.

Similar to the fourth embodiment above, in the case that a beam failure indication has reached the maximum value with respect to one of the multiple BFD RS sets or groups as described above, the terminal may notify a base station of a beam failure situation and transfer a determined new beam candidate to the base station so as to perform a beam failure recovery request (BFRQ) process for requesting a beam failure recovery. The terminal may determine a new beam candidate in a candidateBeamRSList associated with a BFD RS set or group that has reached the maximum value of the beam failure indication, and perform the BFRQ by using an uplink physical channel associated with the determined new beam candidate. Here, the subsequent base station response process may differ according to an uplink physical channel used by the terminal.

If there is one new beam candidate selected, the terminal and the base station may operate similarly to the fourth embodiment above with respect to the BFRQ process. In the case that there are multiple new beam candidates selected, a BFRQ process similar to the fourth embodiment above, but considering multiple beams to be changed, is performed. For example, if the uplink physical channel associated with the determined new beam candidate is a PRACH and the new beam candidate includes an SSB index, the terminal may perform a PRACH transmission on the RACH occasion associated with the SSB by using the preamble index configured in the PRACH transmission.

If the uplink physical channel associated with the determined new beam candidate is a PRACH and the new beam candidate includes CSI-RS resource index, the terminal performs PRACH transmission in the corresponding RACH occasion by using the preamble index and RACH occasion information configured in the PRACH transmission. In this case, in a case of a contention-free random access based BFR, RACH occasions corresponding to multiple new beam candidates are not expected to be identical to each other. That is, in a case of a contention-free random access based BFR, RACH occasions corresponding to multiple new beam candidates may be characterized as not being identical to each other (non-overlapping).

In addition, the terminal transmits a PRACH to a TRP corresponding to CORESETPoolIndex associated with each new beam candidate. That is, the terminal transmits a PRACH to the TRP in which the beam failure has occurred. After transmitting the PRACH, the base station establishes a recovery search space set, and the terminal monitors a PDCCH in the recovery search space set to receive scheduling of a PDSCH including a MAC-CE that changes the TCI state of the CORESET in which the beam failure has occurred. In this case, the base station established one recovery search space set in the terminal, and the terminal may assume that multiple PDCCHs monitored in the recovery search space set are QCLed with multiple new beam candidates. For example, in the case that new beam candidate#1 and new beam candidate#2 are selected and one recovery search space set is established, the terminal may assume that, with respect to the PDCCHs monitored in the recovery search space set, the first PDCCH is QCLed with new beam candidate#1 and the second PDCCH is QCLed with new beam candidate#2 in a sequence of transmission.

In another example, the base station may establish multiple recovery search space sets in the terminal, and each recovery search space set may be associated with each new beam candidate via higher layer signaling. For example, it may be assumed that a PDCCH monitored in recovery search space#1 is QCLed with new beam candidate#1, and a PDCCH monitored in recovery search space#2 is QCLed with new beam candidate#2. It may be assumed that a PDSCH scheduled by each PDCCH has also the same QCL relationship with a new beam candidate, which is in the QCL relationship with the PDCCH. The terminal that monitored the PDCCH in the recovery search space set receives the PDSCH scheduled by the PDCCH and changes the TCI state of the CORESET by using the TCI state activation MAC-CE in the PDSCH.

In another example, in the case that the uplink physical channel associated with the determined new beam candidate is an SRS (indicated by reference numeral 13-35), the terminal may perform a BFRQ via a PUSCH transmission referencing the corresponding SRS resource. In this case, the terminal may include, in the PUSCH transmission, information of a new beam candidate and a BFD RS set and group, and may transmit a MAC-CE activation signal indicating whether to change a reference RS of a TCI state of a CORESET. Further, in the case that a BFD RS set or group corresponds to each TRP, i.e., when the BFD RS set or group has been determined based on the CORESETPoolIndex, the terminal may transmit a scheduled PUSCH to the remaining TRPs except for a TRP corresponding to the CORESET-PoolIndex of the BFD RS set or group (indicated by reference numeral 13-40).

In addition, in the case that a BFD RS set or group corresponds to multiple TRPs, i.e., in the case that the BFD RS set or group has been determined based on multiple CORESETPoolIndexes, the terminal may transmit a scheduled PUSCH to the remaining TRPs except for a TRP corresponding to the CORESETPoolIndex of the BFD RS set or group. That is, the terminal performs BFR between a TRP in which a beam failure has occurred and the terminal through a TRP in which no beam failure occurs. In addition, the terminal may transmit a scheduled PUSCH to TRPs corresponding to one or multiple CORESETPoolIndexes of the BFD RS set or group (indicated by reference numeral 13-40). After receiving the PUSCH transmission from the terminal, the base station may, based on the information included in the PUSCH, change the RS in the TCI state of the CORESET to be changed, by using a new beam candidate (indicated by reference numeral 13-45).

In another example, if the uplink physical channel associated with the determined new beam candidate is a PUCCH (indicated by reference numeral 13-50), the terminal may perform a BFRQ via a PUCCH transmission using the PUCCH resource. Here, the terminal may include scheduling request information in the PUCCH transmission, and the scheduling request may be a scheduling request for a PUSCH or PDSCH transmission (indicated by reference numeral 13-55). In addition, in the case that a BFD RS set or group corresponds to each TRP, i.e., when the BFD RS set or group has been determined based on the CORESET-PoolIndex, the terminal may transmit a scheduled PUCCH to the remaining TRPs except for TRPs corresponding to the CORESETPoolIndex of the BFD RS set or group.

In addition, in the case that the BFD RS set or group corresponds to multiple TRPs, i.e., the BFD RS set or group has been determined based on multiple CORESETPoolIndexes, the terminal may transmit a scheduled PUCCH to the remaining TRPs except for TRPs corresponding to all CORESETPoolIndexes in the BFD RS set or group. That is, the terminal performs BFR between a TRP in which a beam failure has occurred and the terminal through a TRP in which no beam failure occurs. The terminal may also perform PUCCH transmission to TRPs corresponding to one or more CORESETPoolIndexes of a BFD RS set or group.

After the base station receives the PUCCH transmission of the terminal, in a case of a PDSCH scheduling request (indicated by reference numeral 13-60), the base station transmits the corresponding DCI to schedule a PDSCH including a MAC-CE that activates the change of the TCI state of the CORESET (indicated by reference numeral 13-65), so as to allow the terminal to change the RS of the TCI state of the CORESET to be changed, by using a new candidate beam (indicated by reference numeral 13-70). Alternatively, after the base station receives the PUCCH transmission of the terminal, when the PUCCH transmission includes a PDSCH scheduling request (indicated by reference numeral 13-60), the base station transmits the corresponding DCI to schedule a PDSCH including a MAC-CE that activates the change of the TCI state of the CORESET, so as to allow the terminal to change the RS of the TCI state of the CORESET to be changed, by using the new candidate beam (indicated by reference numeral 13-75).

The terminal may report to the base station that the terminal is capable of performing a partial BFR operation, via UE capability. For example, via UE capability reporting, the terminal may report that it is capable of partial BFR operation. In another example, the terminal may report, via UE capability reporting, the number of BFD RS sets, the maximum number of BFD RSs, the maximum number of BFD RSs for each BFD RS set, the number of TRPs associated with a BFD RS within each BFD RS set, the number of candidate beam sets, the number of TRPs associated with a candidate beam in a candidate beam set, the maximum number of candidate beams for each candidate beam set, and the like, which may be configured for the terminal for partial BFR operation.

Referring to UE capability reporting, the base station may configure, for the terminal, the number of BFD RS sets, the maximum number of BFD RSs, the maximum number of BFD RSs for each BFD RS set, the number of TRPs associated with a BFD RS within each BFD RS set, the number of candidate beam sets, the number of TRPs associated with a candidate beam in a candidate beam set, the maximum number of candidate beams for each candidate beam set, and the like via higher layer signaling. Further, the maximum number of BFD RS s or the number of candidate beams may be included within the number of SSB s, CSI-RS s, or CSI-IMs that may be used by the terminal within the entire subcarrier, depending on whether the type of candidate beam or BFD RS is SSB, CSI-RS, or CSI-IM.

Figure 15A:
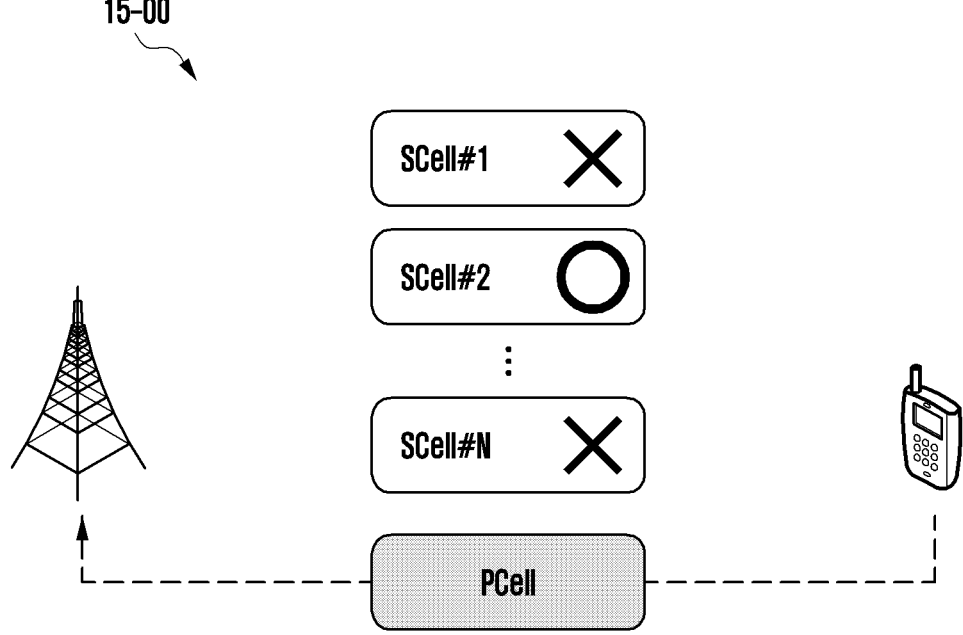
FIG. 15A illustrates a BFD for a secondary cell in a carrier aggregation configured with multiple CCs or cells according to an embodiment of the disclosure.
Figure 15B:
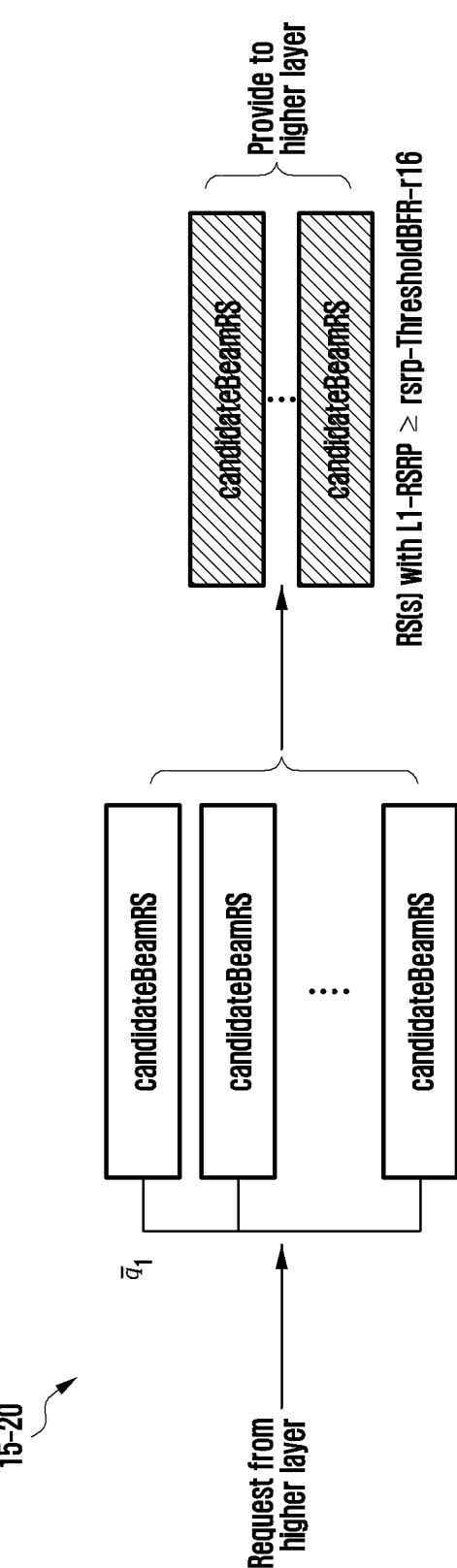
FIG. 15B illustrates a method in which a base station configures RS for a candidate beam for each cell for RS monitoring by a terminal according to an embodiment of the disclosure.
Figure 15C:
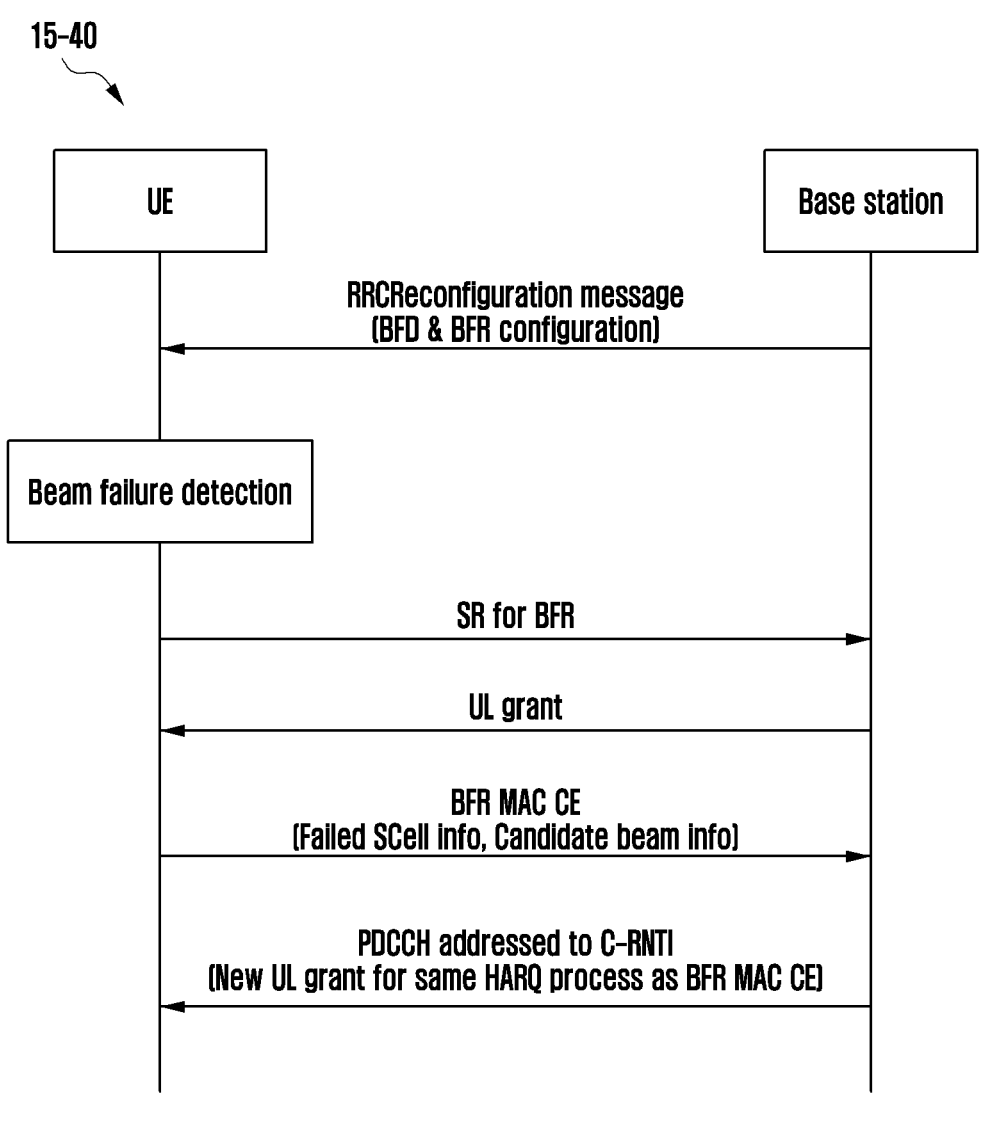
FIG. 15C is a sequence diagram illustrating a BFR procedure for determining the BFD of an SCell according to an embodiment of the disclosure.

FIGS. 15A to 15C illustrate a method of BFR for a secondary cell (SCell) in a carrier aggregation configured with multiple CCs or cells according to embodiments of the disclosure.

Reference numeral 15-00 illustrates a case in which at least one SCell is further established in a state where a base station and a terminal are connected to a PCell. When a PCell and N SCells are established, the terminal may monitor a link based on an RS configured for each cell.

Reference numeral 15-20 illustrates an RS configuration by the base station for a candidate beam for each cell for periodic RS monitoring by the terminal or RS monitoring based on a preconfigured condition. The base station may perform an RS configuration (e.g., $\overline{q_0}$) for periodic RS monitoring for BFD of the terminal via higher layer signaling (e.g., RRC signaling, candidateBeamRSListExt for PCell, candidateBeamRSSCellList for SCell) or an RS configuration (e.g., $\overline{q_1}$) for periodic or predetermined condition-based RS monitoring. Here, $\overline{q_1}$ denotes multiple candidate-beamRS(s), and the terminal may acquire a new beam for BFR based on a condition determined by the terminal and the base station among the candidatebeamRS(s). For example, the condition may be represented as RS(s) with L1-RSRP≥rsrpThresholdBFR-r16. Here, rsrpThreshold-BFR-r16 represents a threshold for selection of a new beam. The base station may configure up to 64 new beam indication RS(s) to support both PCell and SCell.

Reference numeral 15-40 illustrates a process of periodic RS monitoring of a terminal based on the aforementioned RS or pre-configured condition-based RS monitoring, a process of identifying the BFD of a specific SCell, and a process of recovering beam failure (BFR). While monitoring the RS, the terminal may determine the BFD based on the RS for beam failure detection, and may transmit a beam failure recovery request to the base station through the link of the PCell established in the terminal to recover the BFD based on the information of the SCell in which the BFD is identified. In this case, the beam failure recovery request operation of the terminal may include transmitting a link recovery request message by using a PUCCH resource (dedicated SR-like PUCCH) including an SR separately configured for BFR in the terminal. Here, the number of PUCCH resources for the BFR may include one per PUCCH group established in the terminal (step-1).

Thereafter, the base station may receive a PUCCH-SR request of the terminal, transmitted at a specific resource and timing. If the base station receives the PUCCH-SR signal or message, the base station may transmit a UL grant to the terminal. Upon receiving the UL grant, the terminal may transmit a BFR MAC CE message based on the PUSCH resources allocated by the base station. The information included in the BFR MAC CE may include at least the following information, such as failed SCell information with BFD identified, whether a new candidate beam exists, candidate beam information, or associated signal strength.

If the BFR MAC CE message transmitted by the terminal is successfully received, the base station may transmit a PDCCH scrambled by C-RNTI to the terminal. Here, DCI information included in the PDCCH transmitted to the terminal may be used to assign a new UL grant by using the same HARQ process information as the BFR MAC CE transmitted by the terminal (Step-2). The terminal may perform monitoring of the PDCCH in all CORESET(s) in the SCell from a symbol just after 28 symbols based on the time point of receiving the PDCCH scheduling the UL grant. The subcarrier spacing for the 28 symbols may be determined based on the smaller subcarrier spacing among the subcarrier spacing of the activated DL BWP receiving the PDCCH and the subcarrier spacing of the activated DL BWP in each failed SCell. Specifically, the SCell monitoring of the terminal may refer to an operation of identifying a new beam for recovery of a new link on behalf of a link for which beamforming has failed, and the terminal may perform beamforming by applying a spatial domain filter based on preconfigured $q_{new}$ related information to perform uplink control channel (e.g., PUCCH-SCell) or data channel transmission.

Seventh Embodiment: BFD and BFR Operation for Each TRP in Multiple TRPs

In the first through sixth embodiments described above, a terminal supporting beamforming capable of transmitting or receiving to or from multiple TRP(s) could determine BFD in units of TRP groups or all TRP(s) received by the terminal.

The following embodiments describe an operation in which a terminal supporting multiple TRPs determines or performs BFD in units of each TRP (e.g., one).

The terminal may configure each RS to identify and determine the BFD corresponding to each TRP among multiple TRPs. Each TRP may be associated with at least one BFD-RS resource or a resource set including a BFD-RS resource, and the BFD-RS resource (set) may be associated in terms of a QCL relation with at least one CORESET monitored by the terminal. Specifically, at least two sets of BFD-RS resources may be established for each BWP, and each set of BFD-RS resources may include up to N BFD-RS resources for each BWP. For example, the value of N has the maximum value determined by the UE capability, and the value of 2 to 64 may be configured by the base station or determined by the standard. Specifically, each TRP and BFD-RS may be configured explicitly by the RRC layer and MAC layer, or may be configured implicitly by DCI information or the promise between the base station and the terminal.

FIG. 16A illustrate various embodiments in which BFD-RS is established.

First, a base station may configure, for a terminal, the BFD-RS so that cell-specific BFR and per-TRP BFR (TRP specific BFR) are not supported simultaneously in one specific CC among multiple CCs. For example, the terminal may support only cell-specific BFR in a specific CC among multiple CCs and support per-TRP BFR (TRP specific BFR) in other CCs.

Second, the base station may configure for the terminal to simultaneously support the cell-specific BFR and per-TRP BFR (TRP specific BFR) in one specific CC among the multiple CCs. For example, the base station and the terminal may configure both a BFD-RS resource (set) for cell-specific BFR and a BFD-RS resource (set) for per-TRP resource (set) in a specific CC among the multiple CCs. The base station may configure the BFD-RS for cell-specific BFR and the BFD-RS resource (set) for per-TRP BFR (TRP specific BFR) independently or in a combination for the above simultaneous support.

Alt-1: The base station may configure BFD-RS resource set-1 for the first TRP, configure BFD-RS resource set-2 for the second TRP, and configure BFD-RS resource set-3 for specific cell-based BFR (e.g., cells configuring the first TRP and second TRP), as shown in reference numeral 16-00. Each of BFD-RS resource set-1, BFD-RS resource set-2, and BFD-RS resource set-3 may include at least one BFD-RS resource. For example, the BFD-RS resources of BFD-RS resource set-1 may include CSI-RS #1 and CSI-RS #2, the BFD-RS resource of BFD-RS resource set-2 may include CSI-RS #3 and CSI-RS #4, and the BFD-RS resource of BFD-RS resource set-3 may include overlapping BFD-RS resources (e.g., CSI-RS #1 and CSI-RS #4) to each include at least one RS configured in set-1 and set-2.

In addition, the configuration for the NBI-RS (set) to identify a new beam may be similarly configured for cell-specific BFR and per-TRP BFR as the configuration for the BFD-RS (set) described above, and the BFD-RS (set) and NBI-RS (set) may be configured in association with each other to have a one-to-one correspondence, a many-to-one correspondence, or a many-to-many correspondence.

Alt-2: The base station may configure BFD-RS resource set-1 for the first TRP, configure BFD-RS resource set-2 for the second TRP, and configure BFD-RS resource set-3 for specific cell-based BFRs (e.g., cells configuring the first TRP and second TRP), as shown in reference numeral 16-20. Each of BFD-RS resource set-1, BFD-RS resource set-2, and BFD-RS resource set-3 may include at least one BFD-RS resource. For example, the BFD-RS resource of BFD-RS resource set-1 may include CSI-RS #1 and CSI-RS #2, the BFD-RS resource of BFD-RS resource set-2 may include CSI-RS #3 and CSI-RS #4, and the BFD-RS resource of BFD-RS resource set-3 may include a BFD-RS resource (e.g.: CSI-RS #5, CSI-RS #6) that is mutually exclusive with at least one RS configured in set-1 and set-2.

In addition, the configuration for the NBI-RS (set) for determining a new beam may be similarly configured for cell-specific BFR and per-TRP BFR as the configuration for the BFD-RS (set) described above, and the BFD-RS (set) and the NBI-RS (set) may be configured in association with each other to have a one-to-one correspondence, a many-to-one correspondence, or a many-to-many correspondence.

The terminal may configure an RS (e.g., new beam identification RS (NBI-RS) corresponding to each TRP to identify and determine a new transmission or reception beam from each TRP after a BFD identification operation corresponding to each TRP in the multiple TRPs. Here, each TRP may be associated with at least one NBI-RS resource or a resource set including the NBI-RS resource, and the NBI-RS may be associated in terms of a QCL relation with at least one CORESET monitored by the terminal. For example, at least two sets of NBI-RS resources may be established for each BWP, and each NBI-RS resource set may include the maximum M NBI-RS resources for each BWP. Further, the value of M has the maximum value determined by the UE capability, and the value of 4 to 64 may be configured by the base station or determined by the standard. Specifically, each TRP and NBI-RS may be configured explicitly by the RRC layer and MAC layer, or may be configured implicitly by DCI information or the promise between the base station and the terminal.

In addition, the association between the BFD-RS and the NBI-RS may be mapped in a 1 to 1 correspondence. Specifically, each TRP may be associated so that the BFD-RS and NBI-RS correspond 1:1, for example, the BFD-RS setting configured for the first TRP may be configured to correspond 1 to 1 with the NBI-RS for the first TRP, and the BFD-RS setting configured for the second TRP may be configured to correspond 1 to 1 with the NBI-RS for the second TRP. In another example, the BFD-RS setting configured for the first TRP may be configured to correspond 1 to 1 with the NBI-RS for the second TRP, and the BFD-RS setting configured for the second TRP may be configured to correspond 1 to 1 with the NBI-RS for the first TRP.

In addition, the condition of detecting and identifying a new beam based on the NBI-RS may be considered as performing the operation described in the third embodiment or the first or fourth embodiment independently for each TRP among multiple TRPs. In addition, the TRP-specific BFD counter and timer operations may also be considered as performing the operation described in the second embodiment independently for each TRP among the multiple TRPs.

Figure 16B:
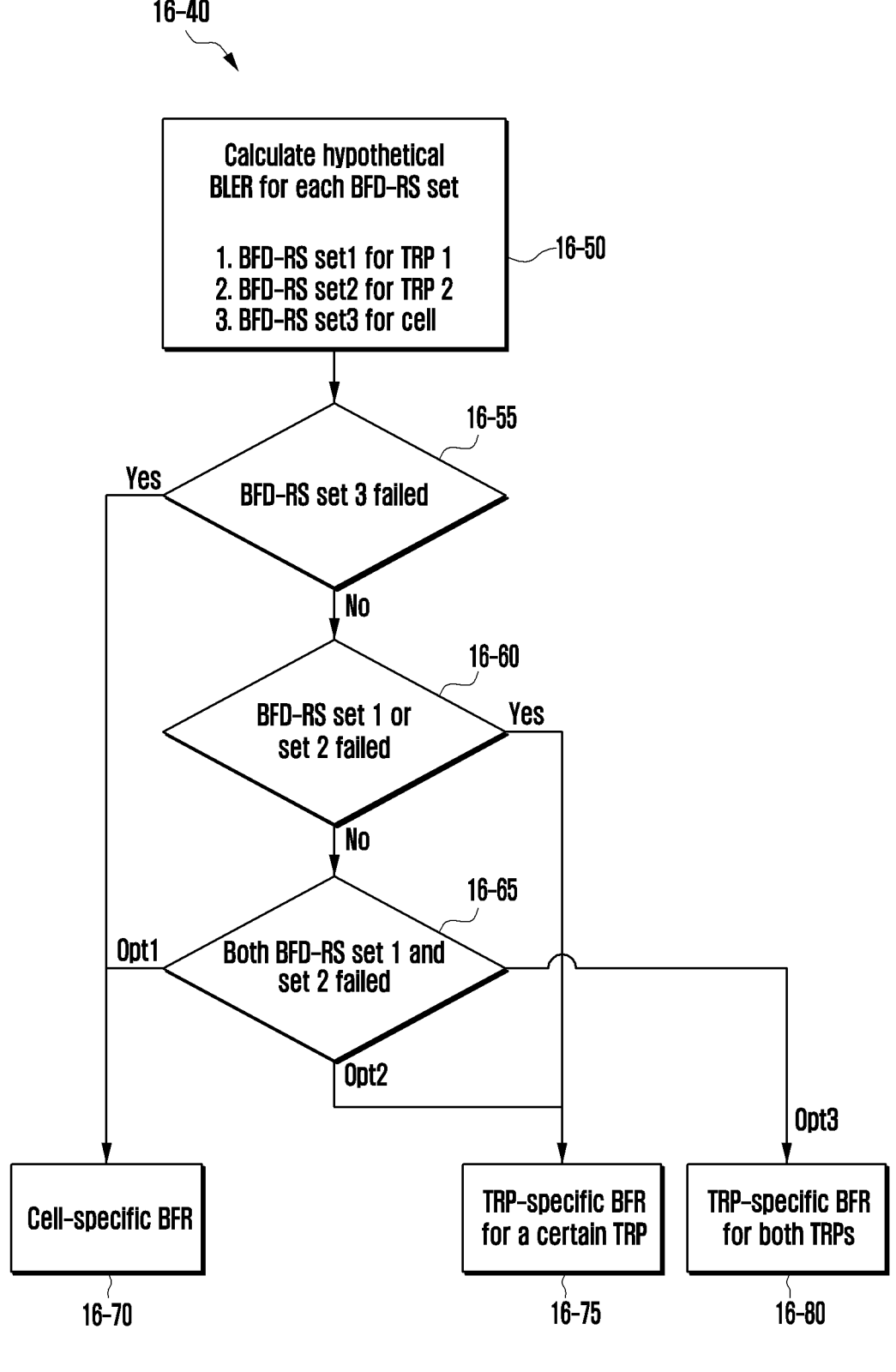
FIG. 16B is a sequence diagram illustrating a method in which a terminal configured with cell-specific BFR and/or per-TRP BFR detects a beam failure and performs a BFR operation according to embodiments of the disclosure.

FIG. 16B is a sequence diagram illustrating a method in which a terminal configured with cell-specific BFR and/or per-TRP BFR detects a beam failure and performs BFR operations according to embodiments of the disclosure.

Reference numeral 16-40 illustrates an embodiment in which a terminal configured with the previously described cell-specific BFR and/or per-TRP BFR in a specific CC detects a beam failure and performs a BFR operation based on the previously described BFD-RS and NBI-RS.

A terminal configured with BFD-RS as shown in reference numerals 16-00 and 16-20 may determine whether there is a beam failure for a first TRP by using BFD-RS resource set-1, determine whether there is a beam failure for a second TRP by using BFD-RS resource set-2, and determine whether there is a beam failure for a specific CC or a specific cell by using BFD-RS resource set-3 (operation 16-50).

The terminal may identify whether a beam failure occurs for each TRP (TRP-specific BFR) or for each cell (Cell-specific BFR).

For example, when the terminal determines whether a beam failure has occurred, based on CSR-RS #1 and CSR-RS #4 configured in BFD-RS resource set-3, so as to identify the beam failure, the terminal may perform Cell-specific BFR (operation 16-55). As another example, when the terminal determines whether a beam failure has occurred, based on CSR-RS #5 and CSR-RS #6 configured in BFD-RS resource set-3, so as to identify the beam failure, the terminal may perform cell-specific BFR (operation 16-55).

In the case that a beam failure has not occurred for BFD-RS resource set-3, when determines whether a beam failure has occurred based on (CSR-RS #1, CSR-RS #2) or (CSR-RS #3, CSR-RS #4) configured in one of BFD-BFD-RS resource set-1 and BFD-RS resource set-2 to identify the beam failure, the terminal may perform TRP-specific BFR (e.g., a first TRP or second TRP) for a specific TRP (e.g., a first TRP or second TRP) based on the RS (operation 16-60).

In the case that a beam failure occurs for both BFD-RS resource set-1 and BFD-RS resource set-2, the terminal may operate as follows.

Option-1: Cell-specific BFR (Fallback to Rel-15 BFR) may be performed (operation 16-70).

With regard to cell-specific BFR, in the case that a cell identified due to the occurrence of BFD is a PCell, the terminal may perform BFR by using a PRACH signal according to the uplink resource setting of the PCell, and in the case that a cell identified due to the occurrence of BFD is an SCell, the terminal may perform BFR by using a PUCCH-SR signal according to the uplink resource setting of the SCell.

Option-2: TRP-specific BFR may be performed for only one of the two TRP(s) in which BFD has occurred (operation 16-75). In this case, the terminal may perform TRP-specific BFR for only one TRP corresponding to the lower BFD-RS resource set, or may perform TRP-specific BFR for only the TRP corresponding to the index of a specific BFD-RS resource set since the index of the BFD-RS resource set is configured via higher layer signaling.

With regard to TRP-specific BFR, in the case that a cell identified due to the occurrence of BFD is a PCell, the terminal may perform BFR by using a PUCCH-SR signal according to the uplink resource setting of the SCell. In addition, with regard to TRP-specific BFR, in the case that a cell identified due to the occurrence of BFD is an SCell, the terminal may perform BFR by using a PUCCH-SR signal according to the uplink resource setting of SCell.

Option-3: TRP-specific BFR may be performed for all of the two TRP(s) in which BFD occurs (operation 16-80).

With regard to TRP-specific BFR, in the case that all the cells identified due to the occurrence of BFD are PC cells, the terminal may perform BFR by using a PUCCH-SR signal according to the uplink resource setting of the PC cell (or (or the uplink resource setting of the SC cell). In addition, with regard to TRP-specific BFR, in the case that all the cells identified due to the occurrence of BFD are SCells, the terminal may perform BFR by using a PUCCH- SR signal according to the uplink resource setting of the PC cell (or the uplink resource setting of the SC cell). In addition, with regard to TRP-specific BFR, in the case that one cell among cells identified due to the occurrence of BFD is a PCell and the other is an SCell, the terminal may perform BFR by using a PUCCH-SR signal according to the uplink resource setting of the PCell (or uplink of the SCell), or may perform BFR by using a PRACH signal according to the uplink resource setting of the PCell.

A new capability of the terminal may be determined for the TRP-specific BFR operation and cell-specific BFR operation described above. The UE capability may include the BFD RS, whether or not RSs of the NBI are configured, the number of RSs of the NBI, and information indicating whether the terminal supports TRP-specific BFR or cell-specific BFR. In addition, the capability items of the terminal may include whether option 1 to option 3 are supported and whether alt-1 or alt-2 is supported.

While the above description relating to reference numeral 16-40 has been made by preferentially performing operations 16-55, 16-60, and 16-65 as a sequential procedure, the priority of operation may change, and may be configured to be determined in parallel or simultaneously according to various embodiments of the disclosure.

The following embodiments briefly describe an operation in which a terminal supporting multiple TRPs performs a BFRQ and a BFRQ response for each TRP unit (e.g., one TRP or two TRPs), based on the previously described BFD determination operation.

After determining the BFD for each TRP, the terminal may perform the TRP-specific BFR operation for beam link recovery. Here, the TRP-specific BFR may basically include two steps as described above.

The terminal may determine the BFD based on RS for beam failure detection while monitoring the RS, and identify candidatebeamRS associated with the BFD, and may transmit the identified candidatebeamRS to the base station via the link of the PCell or the associated SCell, based on the spatial QCL satisfying a condition. At this time, during the beam failure recovery request operation process (step-1), the terminal may transmit a link recovery request message to the CC or TRP corresponding to at least one of the information of failed CC, other/non-failed CC, failed TRP, and other/non-failed TRP by using the PUCCH resource (dedicated SR-like PUCCH) including an SR separately configured for the terminal for BFR. Here, at least one PUCCH resource for the BFR may be included for each PUCCH group established in the terminal.

The following embodiments specifically describe an operation in which a terminal supporting multiple TRPs performs a BFRQ and a BFRQ response for each TRP unit (e.g., one TRP or two TRPs), based on a BFD determination operation in at least one cell.

Figure 17A:
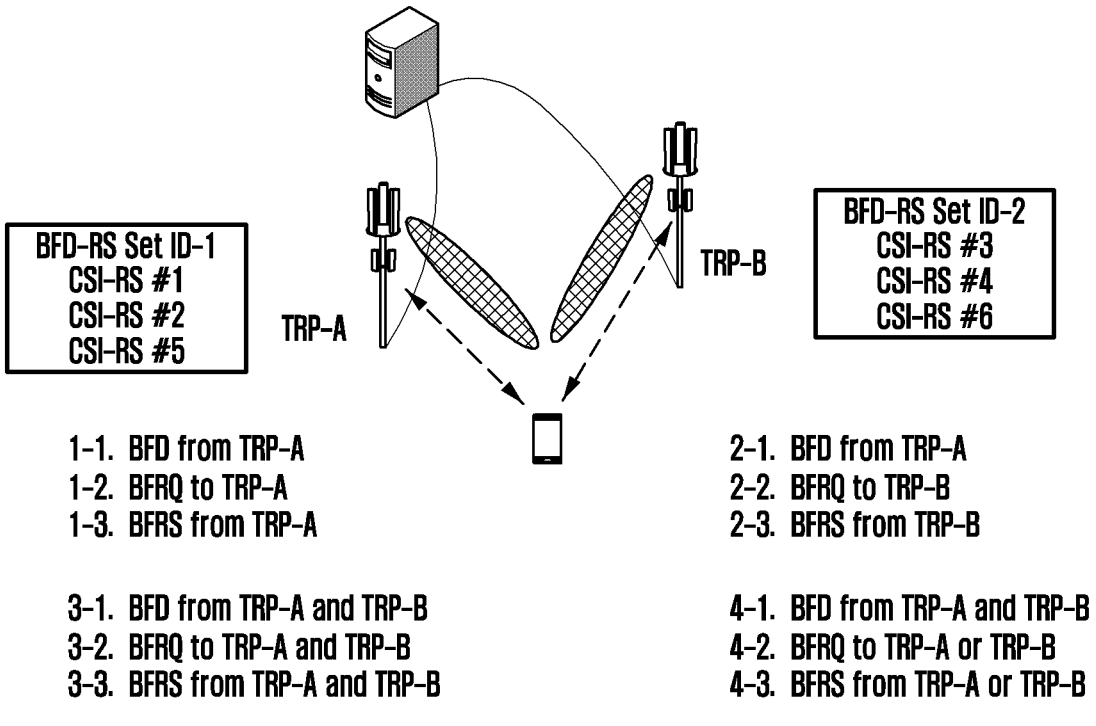
FIG. 17A illustrates an operation in which a terminal performs a TRP-specific BFR or Cell-specific BFRQ and BFRS procedure according to an embodiment of the disclosure.
Figure 17B:
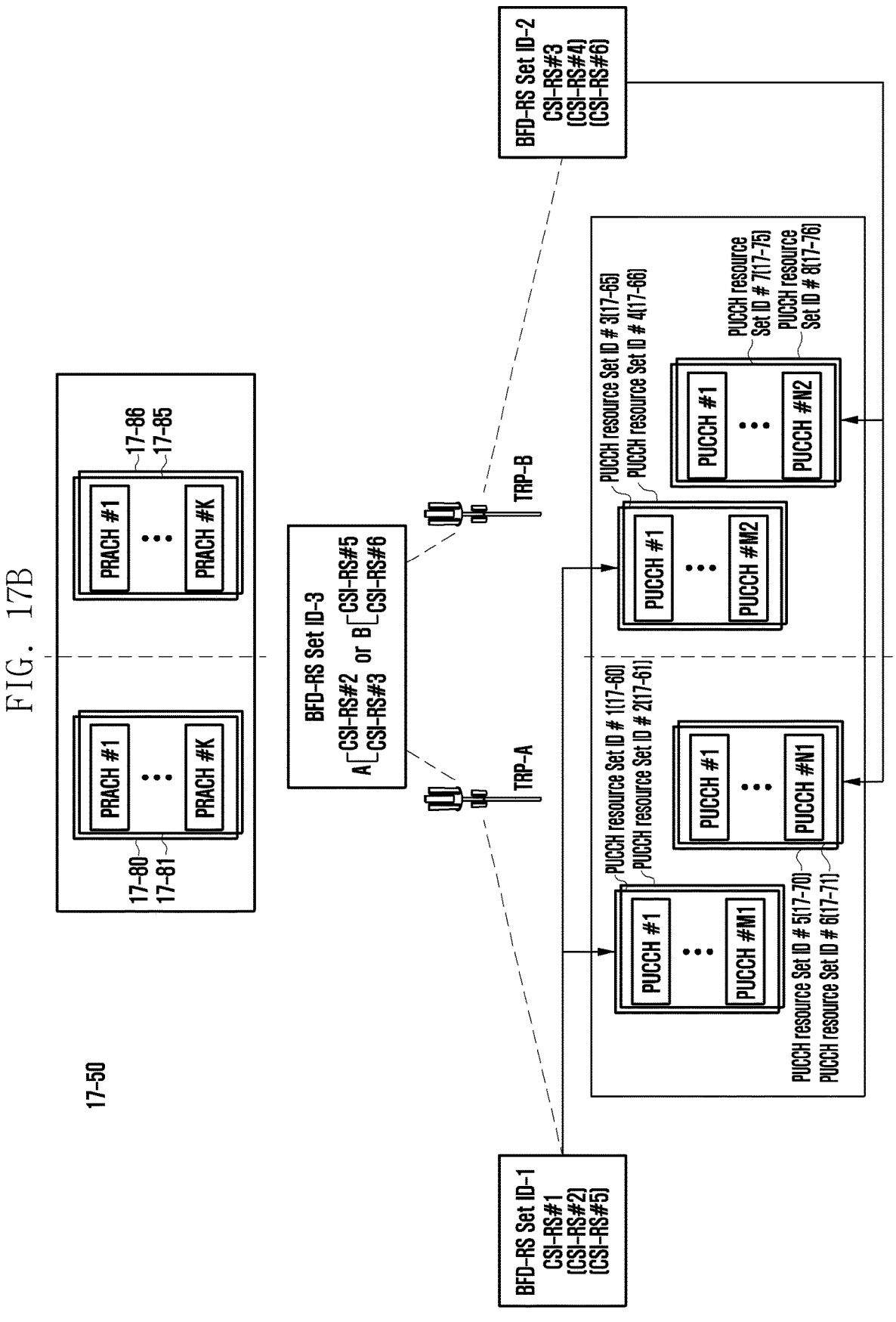
FIG. 17B illustrates an operation in which a terminal detects a TRP-specific BFR or Cell-specific BFRQ and selects an uplink resource, so as to perform a BFRS procedure according to an embodiment of the disclosure.

FIGS. 17A and 17B illustrate operations in which a terminal that has identified BFD performs TRP-specific BFR or cell-specific BFRQ, and beam failure request response (BFRS) depending on the number of associated CCs.

Method A

In the case that a beam failure is detected for one CC in at least one BFD-RS set(s) established in one CC, the terminal may perform the following operations.

Hereinafter, in the method A, the terminal assumes that CSI-RS #1 has been configured for BFD of a first TRP in a PCell, CSI-RS #4 has been configured for BFD of a second TRP, and (CSI-RS #2, CSI-RS #3) has been configured for cell-specific BFD of the PCell.

A-1) In the case that a terminal is configured with only one CC, when a TRP-specific beam failure is identified in a PCell of the terminal, the terminal may transmit a BFRQ based on a PUCCH-SR resource associated with a failed BFD-RS set of the PCell.

For example, when the terminal identifies a BFD based on monitoring of CSI-RS #1 from a first TRP (TRP-A) in the PCell (operation 1-1), the terminal may transmit a BFRQ to the first TRP (TRP-A) by using the SR resource of the PUCCH (e.g., indicated by reference numeral 17-60) established in the PCell (operation 1-2), and the terminal may receive a response message of the BFRQ from the first TRP (TRP-A) in the PCell (operation 1-3). In another example, when the terminal identifies the BFD for both a first TRP (TRP-A) and a second TRP (TRP-B) based on the monitoring of CSI-RS #1 and CSI-RS #4 from the first TRP (TRP-A) and the second TRP (TRP-B) in the PCell (operation 3-1), the terminal may transmit the BFRQ to the first TRP (TRP-A) by using the SR resource of the PUCCH (e.g., indicated by reference numeral 17-60 or 17-70) established in the PCell, and the terminal may transmit the BFRQ to the second TRP (TRP-B) by using the SR resource of the PUCCH (e.g., indicated by reference numeral 17-65 or 17-75) established in the PCell (operation 3-2). The terminal may receive the response message of the BFRQ from the first TRP (TRP-A) and the second TRP (TRP-B) in the PCell (operation 3-3).

In still another example, when the terminal identifies the BFD for both a first TRP (TRP-A) and a second TRP (TRP-B) based on the monitoring of CSI-RS #1 and CSI-RS #4 from the first TRP (TRP-A) and the second TRP (TRP-B) in the PCell (operation 4-1), the terminal may transmit the BFRQ to the first TRP (TRP-A) by using the SR resource of the PUCCH (e.g., indicated by reference numeral 17-60 or 17-70) established in the PCell, or the terminal may transmit the BFRQ to the second TRP (TRP-B) by using the SR resource of the PUCCH (e.g., indicated by reference numeral 17-65 or 17-75) established in the PCell (operation 4-2). The terminal may expect to receive a response message of the BFRQ from at least one of the first TRP (TRP-A) and the second TRP (TRP-B) (e.g., the first TRP or the second TRP) in the PCell (operation 4-3).

A-2) In the case that a terminal is configured with only one CC, when a TRP-specific beam failure is identified in a PCell of the terminal, the terminal may transmit a BFRQ based on the PUCCH-SR resource associated with a non-failed BFD-RS set of the PCell.

For example, when the terminal identifies BFD based on the monitoring of CSI-RS #1 from the first TRP (TRP-A) in the PCell (operation 2-1), the terminal may transmit a BFRQ to the second TRP (TRP-B) by using the SR resource of the PUCCH (e.g., reference numeral 17-65) established in the PCell (operation 2-2), and the terminal may receive a response message of the BFRQ from the second TRP (TRP-B) in the PCell (operation 2-3).

A-3) In the case that the terminal is configured with only one CC, when a cell-specific beam failure is identified in the PCell of the terminal, the terminal may transmit a BFRQ based on the PRACH resource associated with the failed BFD-RS set of the PCell.

For example, when the terminal identifies the BFD based on the monitoring of CSI-RS #2 from the first TRP (TRP-A) in the PCell and identifies the BFD based on the monitoring of CSI-RS #3 from the second TRP (TRP-B), the terminal may transmit a BFRQ to the first TRP (TRP-A) or the second TRP (TRP-B) by using a PRACH resource (reference numeral 17-80 or 17-85) configured in the PCell, and the terminal may receive a response message of the BFRQ from the first TPR (TRP-A) or the second TRP (TRP-B) in the PCell. The BFRQ transmitted by the terminal may select one of the resources indicated by reference numerals 17-80 and 17-85, or both, by an implementation of the terminal.

Method B

When a beam failure is detected for one CC in the at least one BFD-RS set(s) established in two or more CCs, a terminal may perform an operation as follows.

In Methods B-1 to B-3 below, the terminal assumes that (CSI-RS #1, CSI-RS #5) has been configured for the BFD of a first TRP and (CSI-RS #3, CSI-RS #6) has been configured for the BFD of a second TRP in a PCell, that CSI-RS #2 has been configured for the BFD of the first TRP and CSI-RS #4 has been configured for the BFD of the second TRP in the SCell, and that (CSI-RS #5, CSI-RS #6) is configured for cell-specific BFD of the PCell and (CSI-RS #2, CSI-RS #4) is configured for cell-specific BFD of the SCell.

B-1) In the case that a terminal is configured with multiple CCs, when a TRP-specific beam failure occurs in a PCell of the terminal, the terminal may transmit a BFRQ based on a PUCCH-SR resource associated with a failed BFD-RS set of the PCell.

For example, when the terminal identifies a TRP-specific BFD for a first TRP (TRP-A) based on the monitoring of (CSI-RS #1, CSI-RS #5) from the first TRP (TRP-A) in the PCell (operation 1-1), the terminal may transmit a BFRQ to the first TRP (TRP-A) by using the SR resource of the PUCCH (e.g., indicated by reference numeral 17-60 or 17-61) established in the PCell or SCell (operation 1-2), and the terminal may receive a response message of the BFRQ from the first TRP (TRP-A) in the PCell or SCell (operation 1-3).

In another example, when the terminal identifies TRP-specific BFDs for both a first TRP (TRP-A) and a second TRP (TRP-B) from the first TRP (TRP-A) and the second TRP (TRP-B) in the PCell based on monitoring of (CSI-RS #1, CSI-RS #5) and (CSI-RS #3, CSI-RS #6) (operation 3-1), the terminal may transmit the BFRQ to the first TRP (TRP-A) and the second TRP (TRP-B) by using the SR resources of the PUCCH (e.g., indicated by reference numerals 17-60, 17-61, 17-65, 17-66, 17-70, 17-71, 17-75, or 17-76) established in the PCell or SCell (operation 3-2), and the terminal may receive a response message of the BFRQ from the first TRP (TRP-A) and the second TRP (TRP-B) in the PCell or SCell (operation 3-3).

In still another example, when the terminal identifies TRP-specific BFDs for both a first TRP (TRP-A) and a second TRP (TRP-B) based on the monitoring of (CSI-RS #1, CSI-RS #5) and (CSI-RS #3, CSI-RS #6)) from the first TRP (TRP-A) and the second TRP (TRP-B) in the PCell (operation 4-1), the terminal may select one of the first TRP (TRP-A) and the second TRP (TRP-B) and transmit the BFRQ to the selected TRP, by using the SR resources of the PUCCH (e.g., indicated by reference numerals 17-60, 17-61, 17-65, 17-66, 17-70, 17-71, 17-75, or 17-76) established in the PCell or SCell (operation 4-2), and the terminal may expect to receive a response message of the BFRQ from at least one of the first TRP (TRP-A) and second TRP (TRP-B) (e.g., first TRP or second TRP) in the PCell or SCell (operation 4-3).

B-2) In the case that a terminal is configured with multiple CCs, when a TRP-specific beam failure occurs in a PCell of the terminal, the terminal may transmit a BFRQ based on a PUCCH-SR resource associated with a non-failed BFD-RS set of PCell.

For example, when the terminal identifies TRP-specific BFD for a first TRP (TRP-A) based on the monitoring of (CSI-RS #1, CSI-RS #5) from the first TRP (TRP-A) in a PCell (operation 2-1), the terminal may transmit a BFRQ to the second TRP (TRP-B) (operation 2-2) by using the SR resource of the PUCCH established in the PCell or SCell (e.g., reference numeral 17-65 or 17-66), and the terminal may receive a response message of the BFRQ from the second TRP (TRP-B) in the PCell or SCell (operation 2-3).

B-3) In the case that a terminal is configured with multiple CCs, when a cell-specific beam failure is identified in a PCell of the terminal, the terminal may transmit a BFRQ based on a PRACH resource associated with a failed BFD-RS set of the PCell.

For example, when the terminal identifies a cell-specific BFD for the PCell based on the monitoring of CSI-RS #5 from the first TRP (TRP-A) and CSI-RS #6 from the second TRP (TRP-B) in the PCell, the terminal may transmit a BFRQ to the first TRP (TRP-B) or the second TRP (TRP-B) by using the PRACH resource 17-80 or 17-85 established in the PCell, and the terminal may receive a response message of the BFRQ from the first TPR (TRP-A) or the second TRP (TRP-B) in the PCell. The BFRQ transmitted by the terminal may select one of the resources indicated by reference numerals 17-80 and 17-85, or both, by an implementation of the terminal.

In methods B-4 to B-6 below, it is assumed that CSI-RS #1 is configured for BFD of the first TRP and CSI-RS #3 is configured for the BFD of the second TRP in the PCell, that (CSI-RS #2, CSI-RS #5) is configured for the BFD of the first TRP and (CSI-RS #4, CSI-RS #6) is configured for the BFD of the second TRP in the SCell, and that (CSI-RS #1, CSI-RS #3) is configured for the cell-specific BFD of the PCell and (CSI-RS #5, CSI-RS #6) is configured for the cell-specific BFD of the SCell.

B-4) In the case that a terminal is configured with multiple CCs, when a TRP-specific beam failure occurs in at least one SCell of the terminal, the terminal may transmit a BFRQ based on a PUCCH-SR resource of a PCell associated with the failed BFD-RS set of the SCell. For example, when the terminal identifies a TRP-specific BFD for a first TRP (TRP-A) based on monitoring of (CSI-RS #2, CSI-RS #5) from the first TRP (TRP-A) in the SCell (operation 1-1), the terminal may transmit a BFRQ by using the SR resource of the PUCCH configured in the PCell directly or indirectly associated with (CSI-RS #2, CSI-RS #5) of the SCell (e.g., reference numeral 17-60), the terminal may transmit a BFRQ including information about the at least one failed SCell to the first TRP (operation 1-2), and the terminal may receive a response message of the BFRQ from the TRP-A in the PCell (operation 1-3).

As another example, in the case that the terminal identifies TRP-specific BFDs for both a first TRP (TRP-A) and a second TRP (TRP-B) based on the monitoring of (CSI-RS #2, CSI-RS #5) and (CSI-RS #4, CSI-RS #6) from the first TRP (TRP-A) and the second TRP (TRP-B) in the SCell (operation 3-1), the terminal may transmit a BFRQ including information about the at least one failed SCell to the first TRP (TRP-A) and the second TRP (TRP-B), by using the SR resources of the PUCCH (e.g., reference numerals 17-60, 17-65, 17-70, or 17-75) established in the PCell directly or indirectly associated with (CSI-RS #2, CSI-RS #5) or (CSI-RS #4, CSI-RS #6) of the SCell (operation 3-2), and the terminal may receive a response message of the BFRQ from the first TRP (TRP-A) and the second TRP (TRP-B) in the PCell (operation 3-3).

In another example, in the case that the terminal identifies TRP-specific BFDs for both a first TRP (TRP-A) and a second TRP (TRP-B) based on the monitoring of (CSI-RS #2, CSI-RS #5) and (CSI-RS #4, CSI-RS #6) from the first TRP (TRP-A) and the second TRP (TRP-B) in the SCell (operation 4-1), the terminal may select one of the first TRP (TRP-A) and the second TRP (TRP-B) and transmit the BFRQ including information about the at least one failed SCell to the selected TRP, by using the SR resources of the PUCCH (e.g., indicated by reference numerals 17-60, 17-65, 17-70, or 17-75) established in the PCell directly or indirectly associated with (CSI-RS #2, CSI-RS #5) or (CSI-RS #4, CSI-RS #6) of the SCell (operation 4-2), and the terminal may expect to receive a response message of the BFRQ from at least one of the first TRP (TRP-A) and second TRP (TRP-B) (e.g., first TRP or second TRP) in the PCell (operation 4-3).

B-5) In the case that a terminal is configured with multiple CCs, when a TRP-specific beam failure occurs in a SCell of the terminal, the terminal may transmit a BFRQ based on a PUCCH-SR resource of the PCell associated with a non-failed BFD-RS set of the SCell.

For example, when the terminal identifies TRP-specific BFD for a first TRP (TRP-A) based on the monitoring of (CSI-RS #2, CSI-RS #5) from the first TRP (TRP-A) in the SCell (operation 2-1), the terminal may transmit a BFRQ including information about the at least one failed SCell to the second TRP (TRP-B) by using the SR resources of the PUCCH (e.g., indicated by reference numeral 17-65) established in the PCell directly or indirectly associated with (CSI-RS #2, CSI-RS #5) of the SCell (operation 2-2), and the terminal may receive a response message of the BFRQ from the second TRP (TRP-B) in the PCell (operation 2-3).

B-6) In the case that a terminal is configured with multiple CCs, when a cell-specific beam failure is identified in at least one SCell of the terminal, the terminal may transmit a BFRQ based on a PRACH resource of the PCell or SCell associated with a failed BFD-RS set of the SCell.

For example, when the terminal identifies BFD based on the monitoring of CSI-RS #5 from a first TRP (TRP-A) in the SCell and identifies a cell-specific BFD for the SCell based on the monitoring of CSI-RS #6 from a second TRP (TRP-B), the terminal may transmit a BFRQ to the first TRP (TRP-B) or the second TRP (TRP-B) by using a PRACH resource 17-80 or 17-85 established in the PCell and a PRACH resource 17-81 or 17-86 established in the SCell, and the terminal may receive a response message of the BFRQ from the first TPR (TRP-A) or the second TRP (TRP-B) in the PCell or SCell. The BFRQ transmitted by the terminal may select one of the resources indicated by reference numerals 17-80, 17-81, 17-85, and 17-86, or both, by an implementation of the terminal.

In addition, each of the configurations or operations may be optionally coupled/combined among the embodiments and methods described above in the disclosure. Furthermore, depending on the configurations and/or definitions in the system, the operations described above are not necessarily all included, and some operations may be omitted.

Figure 18:
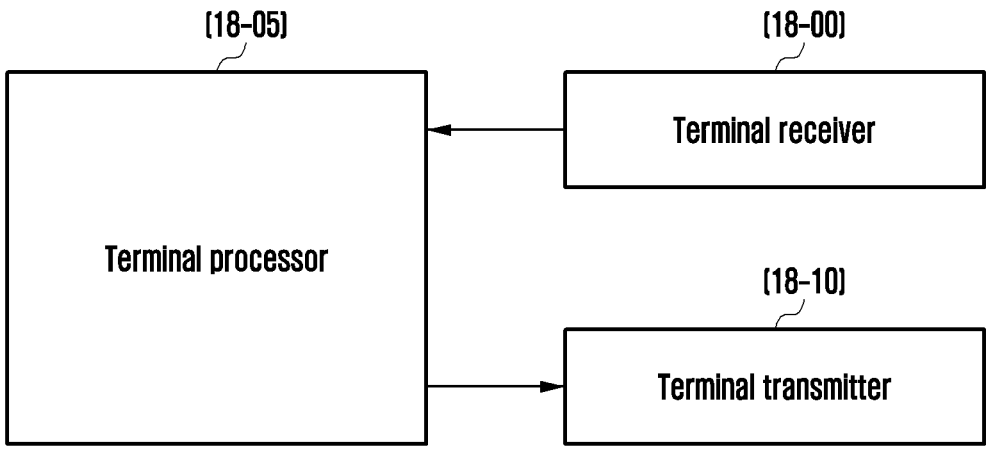
FIG. 18 is a block diagram illustrating a terminal structure according to an embodiment of the disclosure.

FIG. 18 is a block diagram illustrating a structure of a terminal according to an embodiment of the disclosure.

Referring to FIG. 18, the terminal may include a transceiver including a receiver 18-00 and a transmitter 18-10 and a processor (or controller) 18-05 including a memory and a processor. The transceiver including the receiver 18-00 and the transmitter 18-10 and the processor 18-05 of the terminal may operate according to the foregoing communication method by the terminal. However, elements of the terminal are not limited to the aforementioned examples. For example, the terminal may include more elements or fewer elements than the aforementioned elements. In addition, the transceiver 18-00 and 18-10 and the processor 18-05 may be configured as a single chip.

The transceiver including the receiver 18-00 and the transmitter 18-10 may transmit and receive a signal to and from a base station (or TRP). Here, the signal may include control information and data. To this end, the transceiver including the receiver 18-00 and the transmitter 18-10 may include an RF transmitter configured to upconvert and amplify the frequency of a transmitted signal and an RF receiver configured to perform low-noise amplification of a received signal and to down-convert the frequency of the received signal. However, this is only an embodiment of the transceiver including the receiver 18-00 and the transmitter 18-10, and elements of the transceiver including the receiver 18-00 and the transmitter 18-10 are not limited to the RF transmitter and the RF receiver.

In addition, the transceiver including the receiver 18-00 and the transmitter 18-10 may receive a signal through a radio channel to output the signal to the processor 18-05 and may transmit a signal output from the processor 18-05 through the radio channel.

The processor 18-05 may store a program and data necessary for the operation of the terminal. The processor 18-05 may be implemented as at least one processor. Further, the processor 18-05 may store control information or data included in a signal obtained by the terminal. The processor 18-05 may include a memory configured as a storage medium, such as a read only memory (ROM), a random access memory (RAM), a hard disk, a CD-ROM, and a DVD, or a combination of storage media.

In addition, the processor 18-05 may control a series of processes such that the terminal may operate according to the foregoing embodiments. According to some embodiments, the processor 18-05 may control elements of the terminal to receive pieces of DCI consisting of two layers, thus simultaneously receive multiple PDSCHs. For example, the processor 18-05 may obtain information about at least one reference signal for beam failure detection, identify whether a beam failure is detected for each of a first reference signal set, a second reference signal set, and a third reference signal set, which are included in the at least one reference signal, and in the case that the beam failure is detected for at least one of the first reference signal set, the second reference signal set, and the third reference signal set, control the transceiver including the receiver 18-00 and the transmitter 18-10 to transmit beam failure recovery request information for the reference signal set for which the beam failure is detected. Here, the first reference signal set may correspond to a first control resource set (CORESET) pool, the second reference signal set may correspond to a second CORESET pool, and the third reference signal set may correspond to cells associated with the first CORESET pool and the second CORESET pool.

Figure 19:
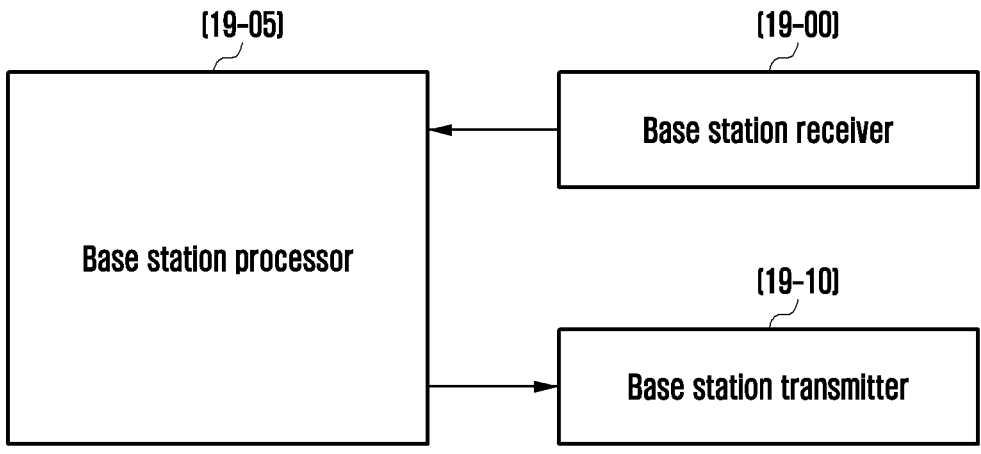
FIG. 19 is a block diagram illustrating a base station structure according to an embodiment of the disclosure.

FIG. 19 is a block diagram illustrating the structure of a base station (TRP) according to an embodiment of the disclosure.

Referring to FIG. 19, the base station (TRP) may include a transceiver including a receiver 19-00 and a transmitter 19-10 and a processor (or controller) 19-05 including a memory and a processor. The transceiver including the receiver 19-00 and the transmitter 19-10 and the processor 19-05 of the base station (or TRP) may operate according to the foregoing communication method of the base station (TRP). However, elements of the base station (TRP) are not limited to the aforementioned examples. For example, the base station (TRP) may include more elements or fewer elements than the aforementioned elements. In addition, the transceiver including the receiver 19-00 and the transmitter 19-10 and the processor 19-05 may be configured as a single chip.

The transceiver including the receiver 19-00 and the transmitter 19-10 may transmit and receive a signal to and from a terminal. Here, the signal may include control information and data. To this end, the transceiver including the receiver 19-00 and the transmitter 19-10 may include an RF transmitter to upconvert and amplify the frequency of a transmitted signal and an RF receiver to perform low-noise amplification of a received signal and to down-convert the frequency of the received signal. However, this is only an embodiment of the transceiver including the receiver 19-00 and the transmitter 19-10, and elements of the transceiver including the receiver 19-00 and the transmitter 19-10 are not limited to the RF transmitter and the RF receiver.

In addition, the transceiver including the receiver 19-00 and the transmitter 19-10 may receive a signal through a radio channel to output the signal to the processor 19-05, and may transmit a signal output from the processor 19-05 through the radio channel.

The processor 19-05 may store a program and data necessary for the operation of the base station (TRP). The processor 19-05 may be implemented as at least one processor. Further, the processor 19-05 may store control information or data included in a signal obtained by the base station (TRP). The processor 19-05 may include a memory configured as a storage medium, such as a ROM, a RAM, a hard disk, a CD-ROM, and a DVD, or a combination of storage media.

The processor 19-05 may control a series of processes such that the base station (TRP) may operate according to the foregoing embodiments. According to some embodiments, the processor 19-05 may control each element of the base station (TRP) to configure DCI including allocation information about a PDSCH and to transmit the DCI. For example, the processor 19-05 may control the transceiver including the receiver 19-00 and the transmitter 19-10 to transmit information about at least one reference signal for beam failure detection to the terminal, and in the case that the beam failure is detected for at least one of the first reference signal set, the second reference signal set, and the third reference signal set, which are included in the at least one reference signal, control the transceiver including the receiver 19-00 and the transmitter 19-10 to transmit beam failure recovery request information for the reference signal set for which the beam failure is detected. Here, the first reference signal set may correspond to a first control resource set (CORESET) pool, the second reference signal set may correspond to a second CORESET pool, and the third reference signal set may correspond to cells associated with the first CORESET pool and the second CORESET pool.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Furthermore, the above respective embodiments may be employed in combination, as necessary. For example, a part of embodiment 1 of the disclosure may be combined with a part of embodiment 7 to operate a base station and a terminal.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method by a terminal in a wireless communication system, the method comprising:

obtaining information about at least one reference signal for beam failure detection;

determining whether a beam failure is detected with respect to the at least one reference signal, the at least one reference signal including a first reference signal set, a second reference signal set and a third reference signal set; and in a case that the beam failure is detected with respect to at least one of the first reference signal set, the second reference signal set, and the third reference signal set, transmitting beam failure recovery request information including information indicating at least one of the first reference signal set, the second reference signal set, and the third reference signal set with respect to which the beam failure is detected, wherein the first reference signal set corresponds to a first control resource set (CORESET) pool, the second reference signal set corresponds to a second CORESET pool, and the third reference signal set corresponds to a cell associated with the first CORESET pool and the second CORESET pool.

2. The method of claim 1, wherein in a case that the beam failure is detected with respect to the first reference signal set, the beam failure recovery request information is transmitted using a first physical uplink control channel (PUCCH) resource set associated with the first CORESET pool, and in a case that the beam failure is detected with respect to the second reference signal set, the beam failure recovery request information is transmitted using a second PUCCH resource set associated with the second CORESET pool.

3. The method of claim 1, wherein in a case that the beam failure is detected with respect to the first reference signal set, the beam failure recovery request information is transmitted using a third physical uplink control channel (PUCCH) resource set associated with the second CORESET pool, and in a case that the beam failure is detected with respect to the second reference signal set, the beam failure recovery request information is transmitted using a fourth PUCCH resource set associated with the first CORESET pool.

4. The method of claim 1, further comprising:

as a response to the transmission of the beam failure recovery request information, receiving an uplink grant; and transmitting, as a response to the uplink grant, a control message including information related to the detected beam failure, wherein the beam failure recovery request information is transmitted using a physical random access channel (PRACH) resource associated with the cell in a case that the beam failure is detected with respect to the third reference signal set.

5. The method of claim 1, wherein detection of the beam failure indicated by the first reference signal set is for a partial beam failure at a first transmission reception point;

wherein detection of the beam failure indicated by the second reference signal set is for a partial beam failure at a second transmission reception point; and wherein detection of the beam failure indicated by the third reference signal set is for a full beam failure at the cell associated with the first CORESET pool and the second CORESET pool.

6. A method by a base station in a wireless communication system, the method comprising:

transmitting information about at least one reference signal for beam failure detection to a terminal; and in a case that a beam failure is detected with respect to at least one of a first reference signal set, a second reference signal set, and a third reference signal set included in the at least one reference signal, receiving, from the terminal, beam failure recovery request information including information indicating at least one of the first reference signal set, the second reference signal set, and the third reference signal set with respect to which the beam failure is detected, wherein the first reference signal set corresponds to a first control resource set (CORESET) pool, the second reference signal set corresponds to a second CORESET pool, and the third reference signal set corresponds to a cell associated with the first CORESET pool and the second CORESET pool.

7. The method of claim 6, further comprising:

in response to the reception of the beam failure recovery request information, transmitting an uplink grant to the terminal; and receiving, as a response to the uplink grant, a control message including information related to the detected beam failure from the terminal, wherein the beam failure recovery request information is received using a physical random access channel (PRACH) resource associated with the cell in a case that the beam failure is detected with respect to the third reference signal set.

8. The method of claim 6, wherein in a case that the beam failure is detected with respect to the first reference signal set, the beam failure recovery request information is received using a first physical uplink control channel (PUCCH) resource set associated with the first CORESET pool, and in a case that the beam failure is detected with respect to the second reference signal set, the beam failure recovery request information is received using a second PUCCH resource set associated with the second CORESET pool, or wherein in the case that the beam failure is detected with respect to the first reference signal set, the beam failure recovery request information is received using a third physical uplink control channel (PUCCH) resource set associated with the second CORESET pool, and in the case that the beam failure is detected with respect to the second reference signal set, the beam failure recovery request information is received using a fourth PUCCH resource set associated with the first CORESET pool.

9. The method of claim 6, wherein detection of the beam failure indicated by the first reference signal set is for a partial beam failure at a first transmission reception point;

wherein detection of the beam failure indicated by the second reference signal set is for a partial beam failure at a second transmission reception point; and wherein detection of the beam failure indicated by the third reference signal set is for a full beam failure at the cell associated with the first CORESET pool and the second CORESET pool.

10. A terminal in a wireless communication system, the terminal comprising:

a transceiver; and at least one processor comprising processing circuitry configured individually and/or collectively, to;

obtain information about at least one reference signal for beam failure detection, determine whether a beam failure is detected with respect to the at least one reference signal, the at least one reference signal including a first reference signal set, a second reference signal set and a third reference signal set; and in a case that the beam failure is detected with respect to at least one of the first reference signal set, the second reference signal set, and the third reference signal set, transmit, using the transceiver, beam failure recovery request information including information indicating at least one of the first reference signal set, the second reference signal set, and the third reference signal set with respect to which the beam failure is detected, wherein the first reference signal set corresponds to a first control resource set (CORESET) pool, the second reference signal set corresponds to a second CORESET pool, and the third reference signal set corresponds to a cell associated with the first CORESET pool and the second CORESET pool.

11. The terminal of claim 10, wherein the at least one processor is configured, individually and/or collectively, to control the transceiver to receive an uplink grant as a response to the transmission of the beam failure recovery request information, and control the transceiver to transmit, based on the uplink grant, a control message including information related to the detected beam failure, wherein the beam failure recovery request information is transmitted using a physical random access channel (PRACH) resource associated with the cell in a case that the beam failure is detected with respect to the third reference signal set.

12. The terminal of claim 10, wherein in a case that the beam failure is detected with respect to the first reference signal set, the beam failure recovery request information is transmitted using a first physical uplink control channel (PUCCH) resource set associated with the first CORESET pool, and in a case that the beam failure is detected with respect to the second reference signal set, the beam failure recovery request information is transmitted using a second PUCCH resource set associated with the second CORESET pool.

13. The terminal of claim 10, wherein in a case that the beam failure is detected with respect to the first reference signal set, the beam failure recovery request information is transmitted using a third physical uplink control channel (PUCCH) resource set associated with the second CORE-SET pool, and in a case that the beam failure is detected with respect to the second reference signal set, the beam failure recovery request information is transmitted using a fourth PUCCH resource set associated with the first CORESET pool.

14. The terminal of claim 10, wherein detection of the beam failure indicated by the first reference signal set is for a partial beam failure at a first transmission reception point;

wherein detection of the beam failure indicated by the second reference signal set is for a partial beam failure at a second transmission reception point; and wherein detection of the beam failure indicated by the third reference signal set is for a full beam failure at the cell associated with the first CORESET pool and the second CORESET pool.

15. A base station in a wireless communication system, the base station comprising:

a transceiver; and at least one processor comprising processing circuitry, the at least one processor being configured, individually and/or collectively, to:

control the transceiver to transmit information about at least one reference signal for beam failure detection to a terminal, and control the transceiver to, in a case that a beam failure is detected with respect to the at least one reference signal, the at least one reference signal including at least one of a first reference signal set, a second reference signal set, and a third reference signal set, receive, from the terminal, beam failure recovery request information including information indicating at least one of the first reference signal set, the second reference signal set, and the third reference signal set with respect to which the beam failure is detected, wherein the first reference signal set corresponds to a first control resource set (CORESET) pool, the second reference signal set corresponds to a second CORESET pool, and the third reference signal set corresponds to a cell associated with the first CORESET pool and the second CORESET pool.

16. The base station of claim 15, wherein in a case that the beam failure is detected with respect to the first reference signal set, the beam failure recovery request information is received using a first physical uplink control channel (PUCCH) resource set associated with the first CORESET pool, and in a case that the beam failure is detected with respect to the second reference signal set, the beam failure recovery request information is received using a second PUCCH resource set associated with the second CORESET pool.

17. The base station of claim 15, wherein in a case that the beam failure is detected with respect to the first reference signal set, the beam failure recovery request information is received using a third physical uplink control channel (PUCCH) resource set associated with the second CORE-SET pool, and in a case that the beam failure is detected with respect to the second reference signal set, the beam failure recovery request information is received using a fourth PUCCH resource set associated with the first CORESET pool.

18. The base station of claim 15, wherein the at least one processor is configured, individually and/or collectively, to transmit, using the transceiver, an uplink grant to the terminal as a response to the reception of the beam failure recovery request information, and control the transceiver to receive, as a response to the uplink grant, a control message including information related to the detected beam failure from the terminal, wherein the beam failure recovery request information is received using a physical random access channel (PRACH) resource associated with the cell in a case that beam failure is detected with respect to the third reference signal set.

19. The base station of claim 15, wherein detection of the beam failure indicated by the first reference signal set is for a partial beam failure at a first transmission reception point;

wherein detection of the beam failure indicated by the second reference signal set is for a partial beam failure at a second transmission reception point; and wherein detection of the beam failure indicated by the third reference signal set is for a full beam failure at the cell associated with the first CORESET pool and the second CORESET pool.

\* \* \* \* \*